(12) United States Patent
Takahara et al.

(10) Patent No.: US 7,389,049 B2
(45) Date of Patent: Jun. 17, 2008

(54) CHROMATIC DISPERSION COMPENSATION CONTROLLING SYSTEM

(75) Inventors: Tomoo Takahara, Kawasaki (JP); Hiroki Ooi, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 688 days.

(21) Appl. No.: 10/784,989

(22) Filed: Feb. 25, 2004

(65) Prior Publication Data

US 2004/0213578 A1     Oct. 28, 2004

(30) Foreign Application Priority Data

Mar. 31, 2003  (JP) .............................. 2003-095715

(51) Int. Cl.
*H04J 14/02* (2006.01)
(52) U.S. Cl. .............................. 398/81; 398/29; 398/27; 398/147; 398/192
(58) Field of Classification Search ................ 398/147, 398/29, 158, 159, 81, 192, 27
See application file for complete search history.

(56) References Cited

U.S. PATENT DOCUMENTS

| | | | | |
|---|---|---|---|---|
| 5,999,289 | A * | 12/1999 | Ihara et al. ................... | 398/147 |
| 6,229,631 | B1 * | 5/2001 | Sato et al. ...................... | 398/30 |
| 6,252,692 | B1 * | 6/2001 | Roberts ........................ | 398/147 |
| 6,320,687 | B1 | 11/2001 | Ishikawa | |
| 6,498,886 | B1 * | 12/2002 | Sobiski et al. .............. | 385/122 |
| 6,718,138 | B1 * | 4/2004 | Sugawara ....................... | 398/9 |
| 6,798,500 | B2 * | 9/2004 | Wilson et al. .............. | 356/73.1 |
| 6,862,413 | B2 * | 3/2005 | Bessios ....................... | 398/208 |
| 6,871,024 | B2 * | 3/2005 | Nishimoto et al. .......... | 398/159 |
| 6,968,134 | B1 * | 11/2005 | Wiesmann et al. .......... | 398/183 |
| 7,123,846 | B2 * | 10/2006 | Tateyama et al. ........... | 398/209 |

(Continued)

FOREIGN PATENT DOCUMENTS

JP          64-044176          2/1989

(Continued)

OTHER PUBLICATIONS

M. Shirasaki et al., "Variable Dispersion Compensator Using the Virtually Imaged Phased Array (VIPA) for 40-Gbit/s WDM Transmission Systems".

(Continued)

*Primary Examiner*—Kenneth Vanderpuye
*Assistant Examiner*—Thi Le
(74) *Attorney, Agent, or Firm*—Staas & Halsey LLP

(57) ABSTRACT

The dispersion monitoring device of the present invention detects a change in dispersion caused in a system by performing the decision process of a received signal using a data flip-flop in which required decision phase and decision threshold are set, averaging the output signal of the data flip-flop using an integration circuit and determining a received waveform, based on a change in a level of an output signal from the integration circuit. In another preferred embodiment, a signal is inputted to a chromatic dispersion change sign monitor. If a chirping parameter is correctly set, residual chromatic dispersion shifts in the negative direction when the peak value of a received signal is large, and it shifts in the positive direction when the peak value of a received signal is small. Using this fact, optimum dispersion compensation is conducted.

2 Claims, 55 Drawing Sheets

U.S. PATENT DOCUMENTS

| | | | |
|---|---|---|---|
| 2002/0015207 A1* | 2/2002 | Ooi et al. | 359/161 |
| 2002/0122220 A1* | 9/2002 | Robinson et al. | 359/110 |
| 2003/0039013 A1* | 2/2003 | Jones et al. | 359/161 |
| 2004/0037569 A1* | 2/2004 | Kamalov et al. | 398/162 |
| 2004/0161243 A1* | 8/2004 | Ooi et al. | 398/152 |
| 2004/0208606 A1* | 10/2004 | Graves | 398/147 |

FOREIGN PATENT DOCUMENTS

| | | |
|---|---|---|
| JP | 04-054043 | 2/1992 |
| JP | 05-30865 | 11/1993 |
| JP | 08-046568 | 2/1996 |
| JP | 11-8590 | 1/1999 |
| JP | 11-088260 | 3/1999 |
| JP | 11-344620 | 12/1999 |
| JP | 2001-217880 | 8/2001 |
| JP | 2001-320329 | 11/2001 |
| JP | 2002-208892 | 7/2002 |
| JP | 2002-374208 | 12/2002 |
| JP | 2003046443 | 2/2003 |

OTHER PUBLICATIONS

F. Horst et al., "Tunable Ring Resonator Dispersion Compensators Realized High-Refractive-Index Contrast SiON Technology".

J.A. J. Fells et al., "Twin Fibre Grating Adjustable Dispersion Compensator for 40 GBIT/S".

Henning Bulow, "Equalization of Bit Distortion Induced by Polarization Mode Dispersion", IOS Press, 1977.

T. Ono et al., "10 Gb/s PMD compensation field experiment over 452 km using Principal State Transmission Method", OFC 2000 PD, PD44-1~PD44-3.

T. Takahashi et al., Automatic compensation technique for timewise fluctuating polarisation mode dispersion in in-line amplifier systems, Electronics Letters, vol. 30, No. 4.

T. Ono et al., "Polarization Control for Suppressing Polarization Mode Dispersion Influence in Optical Transmission Systems", Journal of Lightwave Technology, vol. 12, No. 5.

Y. Akiyama et al., "Automatic Dispersion Equalization in 40 Gbit/s Transmission by Seamless-Switching Between Multiple Signal Wavelengths", ECOC '99 26-30.

S. Kuwahara et al., "Dispersion Fluctuation Supervisory Method applied to Adaptive Dispersion Equalization", IEICE B-10-152.

Japanese Office Action mailed Jun. 19, 2007 in corresponding Japanese Application No. 2002-291420.

Japanese Office Action mailed Aug. 31, 2007 in corresponding Japanese Application No. 2003-095715.

* cited by examiner

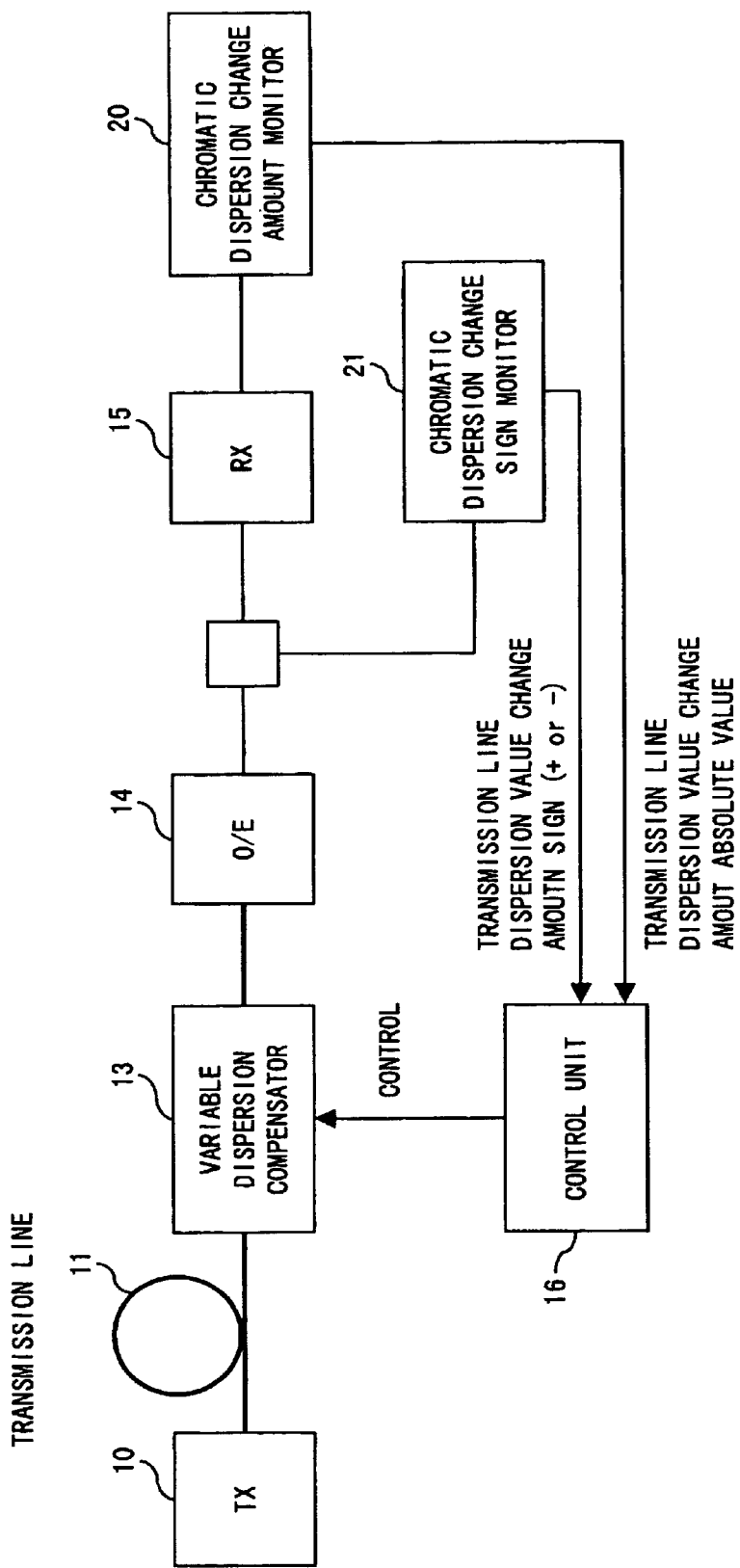
F I G. 36

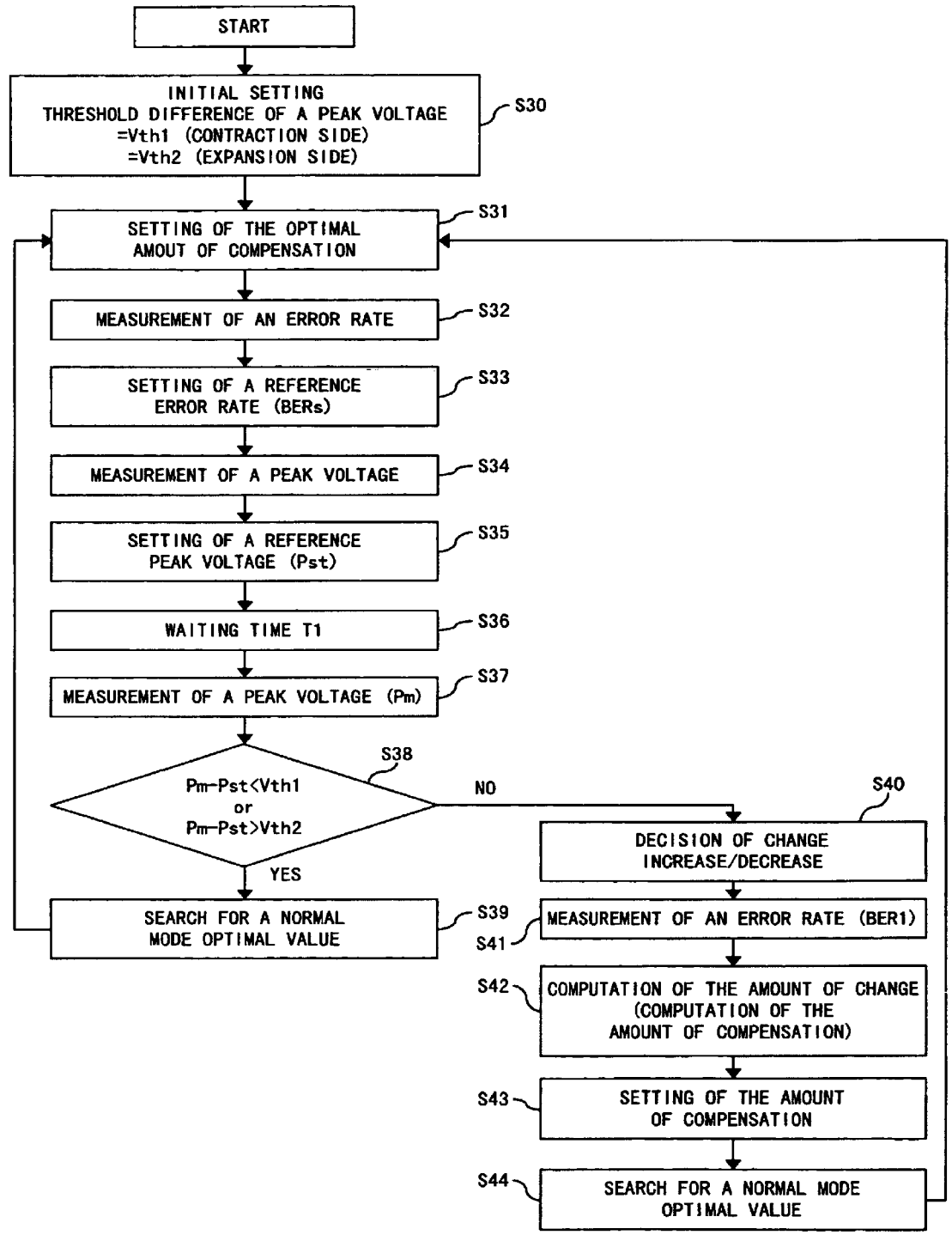
F I G. 4 8

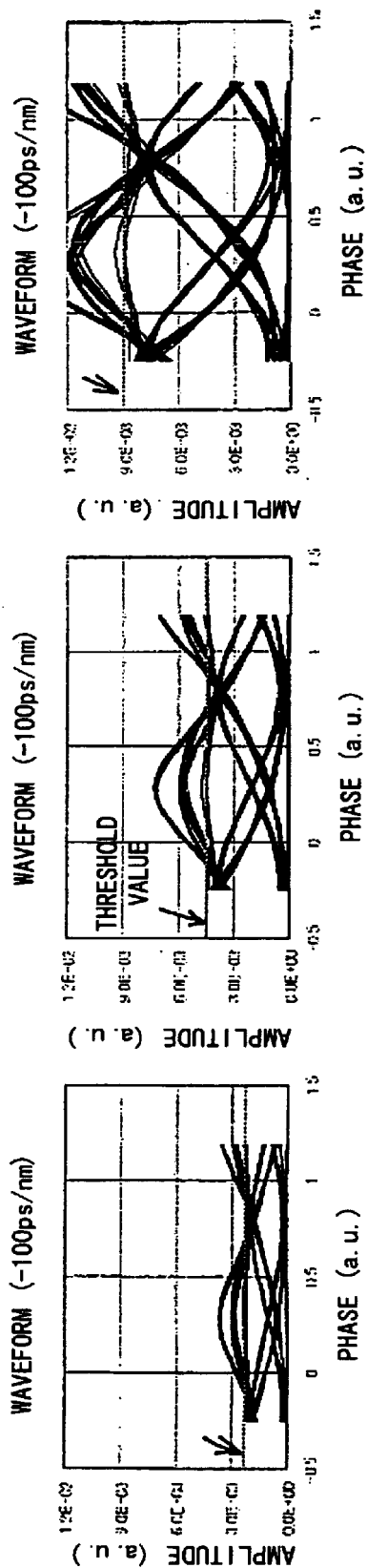
F I G. 51A
F I G. 51B
F I G. 51C

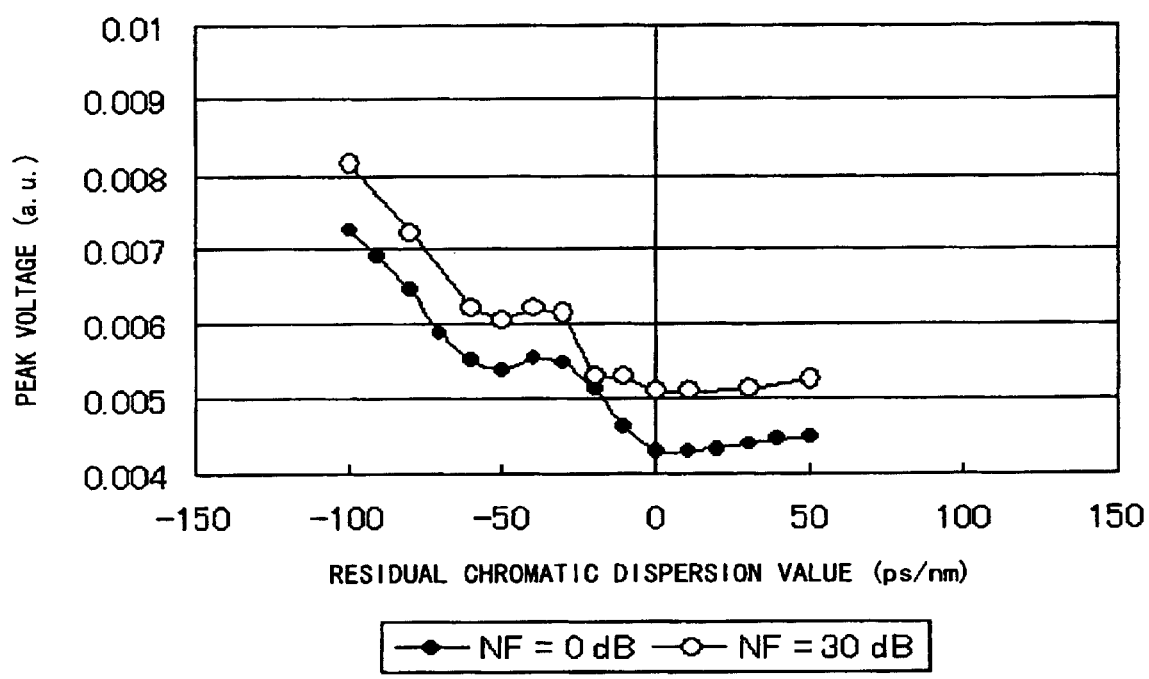
F I G. 53

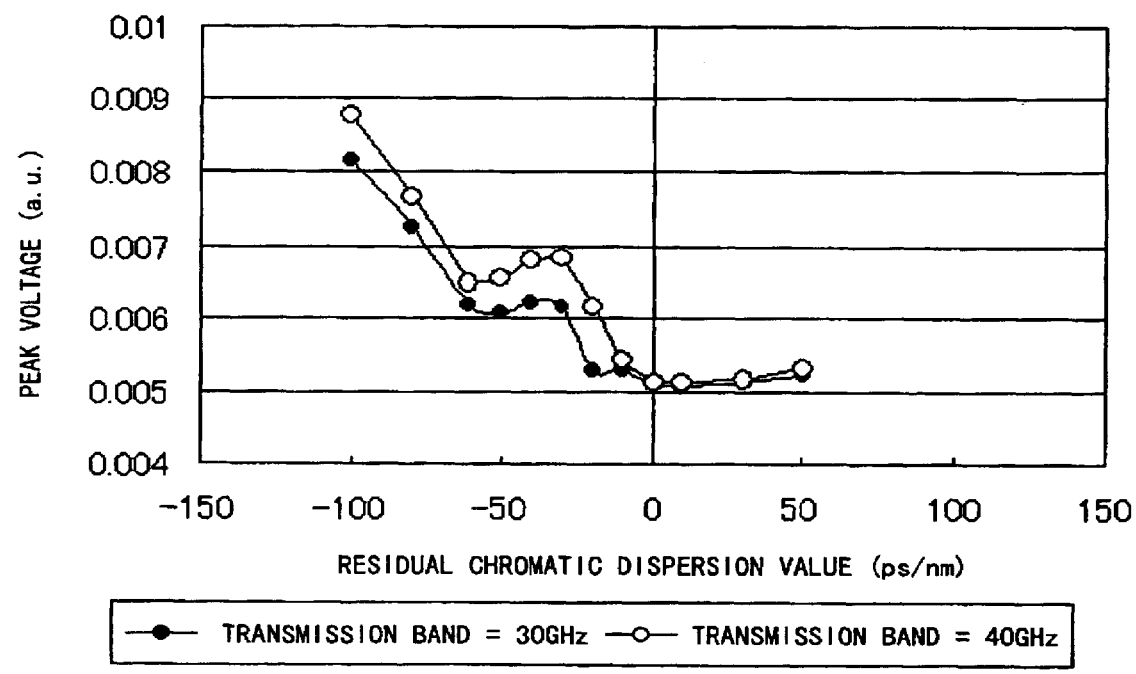
F I G. 5 4

CHROMATIC DISPERSION COMPENSATION CONTROLLING SYSTEM

BACKGROUND OF THE INVENTION

1. Field of the Invention

The present invention relates to a chromatic dispersion compensation controlling system in an optical communication system.

2. Description of the Related Art

Along with the recent rapid increase of the amount of communication, a larger network capacity has been demanded. Currently, a wavelength-division multiplexing (WDM) transmission system with a transmission capacity per channel of 10 Gb/s (gigabit/second) has been put into practical use. However, a far larger capacity will be needed in the future, and if the efficiency in use of frequency, equipment cost, etc., are taken into consideration, the realization of a super-high speed optical transmission system with a transmission capacity per channel of 40 Gb/s or more is expected.

However, since in such a super-high speed optical transmission system, the influence on transmission quality of waveform degradation due to chromatic dispersion, polarization mode dispersion, etc., increases, the transmission distance of optical signal is restricted, which is a problem. Therefore, in order to realize a super-high-speed optical system, an automatic dispersion compensating system for detecting a change in chromatic dispersion and polarization mode dispersion and compensating for them with high accuracy is needed.

Generally, the factor which causes the degradation of transmission quality in an optical communication system, for example, as shown in FIG. 1, is largely classified into two categories; the degradation of an optical signal-to-noise ratio (OSNR) due to the attenuation of signal power or the increase of noise power, and the degradation of the shape itself of a waveform. Furthermore, as the factors of the latter waveform degradation, there are-chromatic dispersion, polarization mode dispersion (PMD), a non-linear effect and the like.

Here, chromatic dispersion is described in detail. In an optical communication system with a transfer rate of 10 Gb/s or over, tolerance to chromatic dispersion is remarkably small. For example, chromatic dispersion tolerance in a system in which 40 Gb/s NZR optical signal is transmitted, is 100 ps/nm or less. Generally, the distance of the repeater span of an optical communication system is not constant. Therefore, for example, in the case of a system using 1.3 μm zero-dispersion single mode fiber (SMF) with a chromatic dispersion value of 17 ps/nm/km, the above mentioned chromatic dispersion tolerance deviates even if there is a difference of several km in the length of repeater span.

However, since the distance of each repeater span and chromatic dispersion value of an optical fiber transmission line possessed by a communication carrier are not accurately known, in many cases, it is difficult to realize chromatic dispersion compensation with high accuracy by a fixed dispersion compensating method using a dispersion compensating fiber (DCF). Furthermore, since a chromatic dispersion value varies under the influences of the temperature, stress, etc., of an optical fiber as time elapses, the chromatic dispersion value must be optimally adjusted not only at the time of the operation commencement but also during the operation of the system by strictly measuring chromatic dispersion.

For example, the chromatic dispersion value of a 500 km transmission line using a DCF as an optical fiber, that is caused when temperature change is 100° C. is as follows:

(Chromatic dispersion)=(temperature dependence of zero-dispersion wavelength)×(temperature change of transmission line)×(dispersion slope of transmission line)×(transmission distance)=0.03 nm/° C.×100° C.×0.07 ps/nm$^2$/km×500 km=105 ps/nm The above-mentioned chromatic dispersion value is almost the same as the chromatic dispersion tolerance obtained when 40 Gb/s NZR optical signal is transmitted. Therefore, the automatic chromatic dispersion compensating system controlling the amount of chromatic dispersion compensation by always monitoring the chromatic dispersion characteristic of a transmission line is indispensable not only in a system using an SMF for a transmission line but also in a system using a 1.55 μm zero-dispersion shifted fiber DSF or a non-zero dispersion shifted fiber (NZ-DSF) for a transmission line.

Next, polarization mode dispersion is described in detail. Polarization mode dispersion is caused by a difference in a propagation delay time between the polarization components of an optical signal (for example, two axes, one is called slow axis and the other is called fast axis), which can be caused in all optical fibers. Generally, the higher the transfer rate of an optical signal is and the longer the transmission distance is, the greater is the influence of this polarization mode dispersion, which cannot be neglected.

There is an optical fiber with a polarization mode dispersion value of over 1 ps/km$^{1/2}$ (pico-second/kilometer$^{1/2}$) per unit length in optical fibers constituting old optical transmission lines laid outside Japan. If, for example, 50 km short-distance transmission is conducted using such an optical fiber, light delay difference Δτ that occurs between the two polarization components of transmitted light is 7 ps or more although one corresponding to one time slot of 40 Gb/s NRZ optical signal is 25 ps. Therefore, as in the case of the chromatic dispersion described earlier, transmission distance is restricted by the influence of polarization mode dispersion. Actually, since materials that cause polarization mode dispersion, such as an optical amplifier, chromatic dispersion compensator, etc., must be used in the transmission line of an optical communication system, there is a possibility that the transmission line of optical signal may be further restricted. Besides, since polarization mode dispersion indicates a change with the lapse of time due to a change in stress or temperature applied to an optical fiber, the polarization mode dispersion of the transmission line must be monitored not only at the time of installation but also during operation, and must be dynamically compensated.

As described above, both chromatic dispersion and polarization mode dispersion are major factors that restrict the performance of an optical communication system, and in order to improve the performance of the optical communication system, a system for dynamically compensating for these segments of dispersion, that is, an automatic dispersion compensating system, is needed. Three key technologies for realizing the automatic dispersion compensation are summarized as follows:

(a) Realization of a variable dispersion compensator
(b) Realization of monitoring the dispersion value of a transmission line
(c) Realization of a feedback control method for optimizing the amount of compensation by a variable dispersion compensator As to the variable dispersion compensator mentioned in (a) above, there are a virtually imaged phased array (VIPA) disclosed in non-patent document 1, a tunable ring resonator disclosed in non-patent document 2, and a fiber bragg grating (FBG) disclosed in non-patent document 3, all of which are listed up as a prior art reference later.

As to the polarization mode dispersion compensator, a polarization mode dispersion compensator provided with a polarization controller (PC) at the transmitting end of an optical signal, feeding back a transmission characteristic from the receiving end and controlling so as to make the split ratio γ of light intensity into to two polarization modes 0 or 1 is disclosed in non-patent document 4, is so far proposed. A polarization mode dispersion compensator provided with a polarization controller and a polarization maintaining fiber (PMF) at the receiving end of an optical signal, giving the delay difference with an opposite sign to an optical transmission line between two polarization modes is also disclosed in non-patent document 5. Furthermore, a polarization mode dispersion compensator provided with a polarization controller, a polarization beam splitter (PBS), photo-diodes each receiving one of the two optical signal components split by this polarization bean splitter and a variable delay element that gives a delay difference between two electric signals obtained by these photo-diodes, controlling the polarization controller and the variable delay element is in non-patent document 6.

As to monitoring a dispersion value mentioned in (b) above, as a conventional measuring method of a chromatic dispersion value, a pulse method and a phase method for inputting a plurality of segments of light each with a different wavelength and measuring a group delay between a plurality of segments of output light and a phase difference, respectively, are proposed. However, in order to always measure chromatic dispersion without degrading communication quality during system operation using these measuring methods, one set of chromatic dispersion measurement equipment must be provided for each repeater span, and also measurement channel with a wavelength different from that of a data signal must be wavelength-division multiplexed, which are problems. Therefore, such measuring methods are not practical from the viewpoint of economy and equipment size.

As to a chromatic dispersion monitoring method, a method for monitoring chromatic dispersion using the intensity of a specific frequency component in a received base-band signal, utilizing its property that the intensity of a specific frequency component varies depending on waveform distortion is disclosed in non-patent document 7 in order to solve the problems. A method for monitoring chromatic dispersion, based on a bit error rate that is detected by an optical receiver, etc., is also disclosed in parent documents 1 and 2. Furthermore, there is a method for providing comparison DEC in addition to a DEC (DFF) performing the decision process of a main signal and detecting a change in chromatic dispersion is disclosed in non-patent document 8.

As to a monitoring method of polarization mode dispersion, for example, an extinction method (Senarmone method), a rotational analyzer method, a rotational phase-shifter method and a phase modulation method are known. As the representation (expression) method of a polarized state, methods using Poincaré sphere, Jones' vector, Stokes' vector, etc., are proposed (for example, see non-patent document 9). Specifically, a measuring method of polarization mode dispersion using Jones' vector and its device are disclosed in patent document 3.

Prior art technical documents related to the present invention are introduced below.

Patent document 1: Japanese Patent laid-open No. 2001-77756

Patent document 2: Japanese Patent laid-open No. 9-326755

Patent document 3: Japanese Patent laid-open No. 9-72827

Non-patent document 1: M. Shirasaki et al., "Variable Dispersion Compensator using the Virtually Imaged Phased Array (VIPA) for 40 Gbit/s WDM transmission System", ECOC2000, PD Topic 2, 2.3

Non-patent document 2: F. Horst et al., "Tunable Ring Resonator Dispersion Compensator realized in High Refractive-index Contrast Technology", ECOC2000, PD Topic2, 2.2

Non-patent document 3: J. A. J. Fells et al., "Twin Fiber Grating Adjustable Dispersion Compensator for 40 Gbit/s", ECOC2000, PD Topic2, 2.4

Non-patent document 4: T. Ono et al., "10 Gb/s PMD Compensation Field Experiment over 452 km using Principal State transmission Method", OFC2000, PD44

Non-patent document 5: Takahashi et al., "Automatic Compensation Technique for Timewise Fluctuating Polarization mode Dispersion in In-line AmplifierSystems", Electro. Lett., Vol.30, No.4 (1994), pp. 348-349

Non-patent document 6: Takahashi et al., "Polarization Control Method for Suppressing Polarization Mode Dispersion Influence in Optical Transmission Systems", J of Lightwave Tecnol., Vol.12, No. 5(1994), pp. 891-898

Non-patent document 7: Y. Akiyama et al., "Automatic Dispersion Equalization in 40 Gbit/s Transmission by Seamless-switching between Multiple Signal Wavelengths", ECOC'99, pp. I-150-151

Non-patent document 8: S. Kuwabara et al., "Study on Dispersion Fluctuation Monitoring Method applied to Adapted Dispersion Equalization", Journal of Comprehensive Meeting of The Institute of Electronic Information and Communications Engineers, B-10-152 (1997)

Non-patent document 9: "Representation Method and Measuring Method of Polarized State", OPTRONICS (1997), No.5, pp.109-117

However, the above-mentioned conventional dispersion monitoring technologies have the following problems. Specifically, as shown in FIG. 2, a method for detecting the intensity of a specific frequency component in a received base-band signal and monitoring chromatic dispersion, disclosed in Non-patent document 7, etc., so called a clock monitoring method, includes a wide-band photo-diode (PD) and a clock amplifier corresponding to a 40 GHz frequency band, etc., and needs a configuration close to a main signal system optical receiver unit (O/E). Since particularly in order to separately compensate for dispersion for each channel in a WDM system, a clock monitor corresponding to each channel is needed, cost and size increase, which is a problem. In order to solve this problem, the integration of a main signal system and a monitoring system is effective. However, since it is very difficult to realize a high-accuracy band-pass filter (BSP) extracting a clock component from a received base-band signal in an integrated circuit, it is not practical, which is also a problem.

Since in the case of a SONET/SDH signal, dispersion monitoring can be realized by using a supervisory byte included in a section overhead, such as a byte B1, etc., without adding a new configuration to an existing system, and since in the case of a system adopting forward error correction, dispersion can be realized by using the correction information of FEC-IC, without adding a new configuration to an existing system, a method using a parameter indicating transmission quality, such as the error rate, Q factor, etc., disclosed in Patent documents 1 and 2 for the monitor of chromatic dispersion, has a great advantage in cost and size. However, as shown in FIG. 1, since the parameter, such as an error rate, etc., is affected by both waveform degradation and OSNR degradation, it is difficult to detect a change in a factor that causes waveform degradation, such as chromatic dispersion with high accuracy, which is also a problem.

Furthermore, since the method for detecting a change in chromatic dispersion using the DEC (DFF) disclosed in Non-parent document 8, etc., needs a high-speed circuit as fast as a main signal system circuit as a monitor system circuit, it is difficult to realize such a circuit and to ensure a desired monitor characteristic, which is also a problem. Specifically, as shown in FIG. 3, in a system adopting the above-mentioned monitoring method, comparison DECs 101 and 102 detecting a change in chromatic dispersion are added in addition to a main signal DEC100, and a decision voltage Vm (=Vth+ΔV) shifted from an optimal decision threshold Vth to a mark signal side and a decision voltage Vs (=Vth−ΔV) shifted to a space mark side are set in the comparison DECs 101 and 102, respectively. In the detection of a change in chromatic dispersion during system operation, firstly, a received main optical signal is amplified after optical/electric conversion and is distributed to each DEC in which each decision voltage is set. Then, the exclusive OR of the respective data outputs of the main signal DEC100 and comparison DEC101 is computed by an EXOR 103, and the exclusive OR of the respective data outputs of the main signal DEC100 and comparison DEC102 is computed by an EXOR 104. The EXORs 103 and 104 generate pulse outputs if two inputted data do not coincide. The respective pulse outputs from the EXORs 103 and 104 are counted in counters 105 and 106, respectively, and by monitoring the counted numbers by a controller 107, the direction of change of chromatic dispersion is detected. Therefore, all the circuits of the comparison DECs 101 and 102, EXORs 103 and 104, and counters 105 and 106 need a high-speed circuit as fast as the main signal system circuit, thus causing the problems described earlier.

Typical communication speed per wave in a current wavelength division multiplexing system is 10 Gb/s. However, aiming at the further increase of communication capacity, an attempt is being made to realize a communication speed per wave of 40 Gb/s. In the course of the development of a wavelength-division multiplexing optical communication system with communication speed per wave of 40 Gb/s, it is found that in order to realize the wavelength-division multiplexing optical communication system with communication speed per wave of 40 Gb/s, the management of chromatic dispersion must be controlled more strictly than ever.

A method for performing the feedback control of a variable dispersion compensator using transmission quality information, such as an error rate, a Q factor, etc., has been so far proposed. Particularly, a method using information similar to an error rate is considered to be advantageous in cost.

FIG. 4 shows a configuration using an error rate as a chromatic dispersion monitor as one example of conventional configurations. FIG. 5 shows its operation.

In the conventional chromatic dispersion compensation controlling system shown in FIG. 4, an optical signal transmitted from a transmitter 100 is transmitted through a transmission line 110, is amplified by an optical amplifier 120 and is inputted to a variable dispersion compensator 130. The chromatic dispersion of the optical signal is compensated by a variable dispersion compensator 130. Then, the optical signal is converted into an electric signal by an optical/electric converter 140, and is received by a receiver 150. In the receiver 150, the error rate or similar information of the received signal is computed, and is transmitted to the control circuit 160 of the variable dispersion compensator 130. The control circuit 160 controls the amount of dispersion compensation of the variable dispersion compensator 130, etc., based on this error rate or similar information. In this case, the error information detecting function of the receiver 150 acts as a chromatic dispersion monitor.

If chromatic dispersion changes due to a change in some condition, the conventional chromatic dispersion monitor searches for the optimal chromatic dispersion point using an algorithm, such as a dithering method or a down-hill method, since there is no means for determining whether the amount of chromatic dispersion compensation is excessive or insufficient. For the dithering method, see Patent document 4, and for the down-hill method, see Non-patent document 10.

For example, if an optimal point is searched from the starting point (O: point 2) shown in FIG. 5 by the down-hill method, there is no method for determining which to select, points 1 or 3 as a subsequent amount of compensation. Thus, point 1 is selected, and as a result, there is a possibility that there may be a heavy penalty. Therefore, in order to reduce the error rate, it is determined that the error rate of this point 1 is too high and point 3 is newly selected. Thus, the optimal point is gradually searched.

Next, the larger the variable amount of chromatic dispersion compensation of the variable chromatic dispersion compensator is, the shorter time is needed to optimize the amount of chromatic dispersion compensation (in FIG. 6, change units). However, a change unit is increased, the penalty caused when the amount of chromatic dispersion compensation is wrongly determined to be excessive or insufficient, also increases. Therefore, in order to compensate for chromatic dispersion with high accuracy, conventionally the change unit is set to a small value. Therefore, the prior art has an advantage of following the change with low speed (that is, a small width of change) with high accuracy, but it does not suite to follow a change with high speed (that is, a large width of change) at high speed.

The situation where the high-speed control of a wave dispersion compensator is required and its speed required then are considered below. Here, two changes; (1) a change in the chromatic dispersion value of a transmission line accompanying the switch of a route or a wavelength, and (2) a change in a transmission line chromatic dispersion value due to the change of PCD (polarization dependent chromatic dispersion) accompanying the change of higher-order PMD (polarization mode dispersion), are considered. In the case (1) above, generally, a protection time of 50 msec is a required reference control speed. Specifically, the process proceeds as follows:

Occurrence of a failure→detection of the failure→notification of the failure (=Tp≡20 msec)→switch of a route (Ts≡several msec)→main signal transmission delay (=Td)→completion of restoration and it must be as follows:

$$Tp+Ts+Td<50\ \mathrm{msec}$$

Thus, a time allocated to the main signal transmission delay (Td) is 20-30 msec, and this must include the control time of a variable chromatic dispersion compensator as well as the control time of EDFA. Therefore, an allowable control time including the control time of EDFA and the control time of a variable chromatic dispersion compensator is at maximum approximately 20 msec. As to case (2) above, since there is no system restriction, the control time must be at maximum 20 msec.

Next, the tunable dispersion range of the amount of chromatic dispersion compensation required by the variable chromatic dispersion compensator is considered. The automatic chromatic dispersion compensating system also compensates for the transmission line chromatic dispersion caused as time elapses. However, since the main factor of the timewise change is a change in ambient temperature in an installation environment, and its change speed is slow, the compensation for the transmission line chromatic dispersion caused as time elapses is omitted here.

Change in the chromatic dispersion of a transmission line accompanying the switch of a route or a wavelength.

Chromatic dispersion is compensated for each span, using a DCF (dispersion compensating fiber), and it is the main object of the variable chromatic dispersion compensator to compensate for the influence of its dispersion slope at the receiving end. If it is assumed that the system conditions are as follows:

One span: 100 km
Dispersion slope: 0.08 ps/nm$^2$/km
Wavelength width to be used: 35 nm and the remaining influence of dispersion slope is 20%, the change width Dv of a chromatic dispersion value handled by the variable chromatic dispersion compensator is at maximum as follows:

$$Dv = 0.2 \times 0.08 \times 35 \times 100$$
$$= 56 \text{ ps/nm}$$

Change in a transmission line chromatic dispersion due to a change in PCD accompanying in a change in higher-order PMD.

Since PCD, being one element of higher-order PMD, varies depending on input polarization, a change in PCD is a phenomenon in which the chromatic dispersion of a transmission line varies. It is considered that PCD changes at high speed by fiber touch (stress is applied by touching an optical fiber by hand or blowing it). The speed of this change is generally in order of kHz, and compensation must be made at a speed of several msec.

FIG. 6 shows the experimental result of a change in the optimal amount of dispersion in a system whose overall average PMD is 8 ps (that is, 0.33 ps/4 km) and which has six spans of 100 km (100 km×6) (#1 through #7 indicate different polarized states). As shown in FIG. 6, it is observed that the optical amount of chromatic dispersion compensation changes by maximum 50 ps/nm. It is reported that the typical PMD value of an existing SMF (single mode fiber) is 0.2 ps/√km, and that the grater the influence of the first order PMD is, the greater the influence of higher-order PMD is (see Non-document 11). Therefore, it is considered that the influence of PCD in a general system is at maximum approximately 50 ps/nm.

Patent document 4: Japanese Patent Laid-open No. 2002-33701

Non-patent document 10: M. Nagaoka, "Knowledge and Prediction", Iwanami seminar, Software science 14, Iwanami Bookstore (1988), pp.114-120

Non-patent document 11: G. Shtengel, E. Ibragimov, M. Rivera, S. suh, "Statistical Dependance between First and Second-order PMD", No. 3, OCF2001

As a result, the following is specified:
Request for control speed: Several msec or less
Request for control range: Up to 60 ps/nm Furthermore, if it is assumed that the allowable penalty of a chromatic dispersion compensator is 0.5 dB, and a system has the chromatic dispersion tolerance characteristic shown in FIG. 6, the adjustment accuracy is specified as follows:

±10 ps/nm

Its control method must have a chromatic dispersion monitor that can determine whether chromatic dispersion increases or decreases and further roughly can compute its amount instead of optimizing by repeatedly determining whether chromatic dispersion increases or decreases as in the down-hill method, and also has a function to control the amount of chromatic dispersion compensation as soon as a change occurs in chromatic dispersion.

SUMMARY OF THE INVENTION

It is an object of the present invention to provide a dispersion monitoring device and method for easily monitoring a change in the dispersion characteristic of an optical communication system with high accuracy and simultaneously to provide an automatic dispersion compensating system using them.

It is another object of the present invention to provide a chromatic dispersion controlling system for controlling the amount of chromatic dispersion compensation at high speed.

In order to achieve the above-mentioned objectives, the dispersion monitoring device of the present invention monitors the dispersion characteristic of an optical communication system. The dispersion monitoring device comprises a data flip-flop determining whether an input signal is at a high or low level by setting a decision phase and a decision threshold when a received signal obtained by optically/electrically converting optical signal transmitted through the optical communication system is inputted, and outputting the result of the decision as a logical value, an integration circuit averaging logical values outputted from the data flip-flop and a dispersion detection unit detecting a change in dispersion caused in the optical communication system.

In the dispersion monitoring device having such a configuration, the data flip-flop determines whether the level of a received signal is higher or lower than the threshold, in timing synchronous with the phase, and outputs the logical value indicating the decision result to the integration circuit. The integration circuit timewise integrates the logical values from the data flip-flop and outputs the result to the dispersion detection unit. The dispersion detection unit determines a change in a received waveform, based on the change in level of the signal outputted from the integration circuit and detects a change in dispersion caused in the optical communication system. Thus, a dispersion monitoring device can be configured using a circuit with lower speed than the transfer rate of the optical signal, thus detecting a change in dispersion caused in the optical communication system with high accuracy.

The automatic dispersion compensating system adopts the above-mentioned dispersion monitoring device. The automatic dispersion compensating system comprises a variable dispersion compensator placed in a transmission line and a control circuit automatically compensating for dispersion caused in optical signal transmitted through the transmission line by feedback-controlling the amount of dispersion compensation of the variable dispersion compensator so as to reduce the change, based on a change in dispersion, detected by the dispersion monitoring device disposed on the received side, before the variable dispersion compensator.

According to the automatic dispersion compensating system having such a configuration, dispersion caused in the optical signal transmitted through the transmission line can be automatically and surely compensated by feedback-controlling the amount of dispersion compensation of the variable dispersion compensator, based on a change in dispersion monitored with high accuracy by the earlier-mentioned dispersion monitoring device.

The chromatic dispersion compensation controlling system of the present invention is used to compensate for chromatic dispersion caused when transmitting an optical signal through a transmission line. The chromatic dispersion compensation controlling system comprises a peak detection unit detecting the peak value of a received signal and a control unit determining whether chromatic dispersion caused in an optical signal is excessive in a positive or negative direction, by comparing the peak value with a predetermined threshold and supplying a control signal to the variable chromatic dispersion compensator.

According to the chromatic dispersion compensation controlling system, since whether the sign of the excessive chromatic dispersion caused in a received optical signal is positive or negative can be detected at high speed, the influence of chromatic dispersion that changes at high speed can be followed and compensated.

BRIEF DESCRIPTION OF THE DRAWINGS

FIG. 36 shows the basic configuration of a chromatic dispersion compensation controlling system according to the preferred embodiment of the present invention;

FIG. 39 shows the configuration of a receiving unit according to the preferred embodiment of the present invention;

FIG. 48 is a flowchart of the basic operation of the chromatic dispersion compensation controlling system according to the preferred embodiment of the present invention (no. 2);

FIGS. 51a, 51b and 51c show the configuration of another preferred embodiment of the chromatic dispersion compensation controlling system of the present invention.

FIG. 53 shows the simulation for confirming the effectiveness of the preferred embodiment of the chromatic dispersion compensation controlling system of the present invention (No. 2);

FIG. 54 shows the simulation for confirming the effectiveness of the preferred embodiment of the chromatic dispersion compensation controlling system of the present invention (No. 3);

DESCRIPTION OF THE PREFERRED EMBODIMENTS

The preferred embodiments of the present invention are described below with reference to the drawings.

Figure 1:
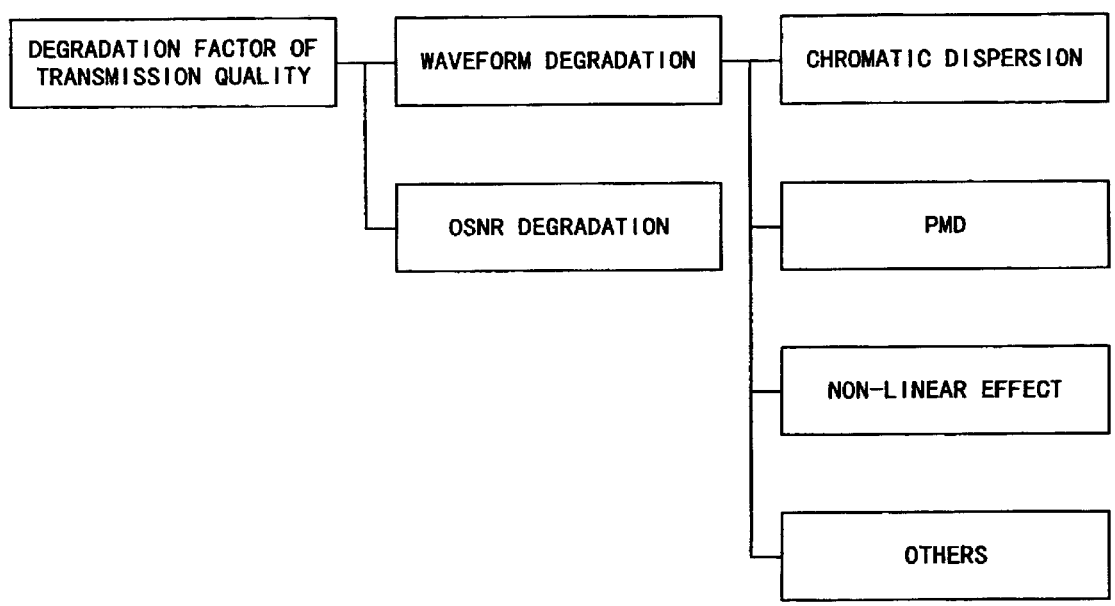
FIG. 1 shows factors to the degradation of transmission quality in a general optical communication system.
Figure 2:
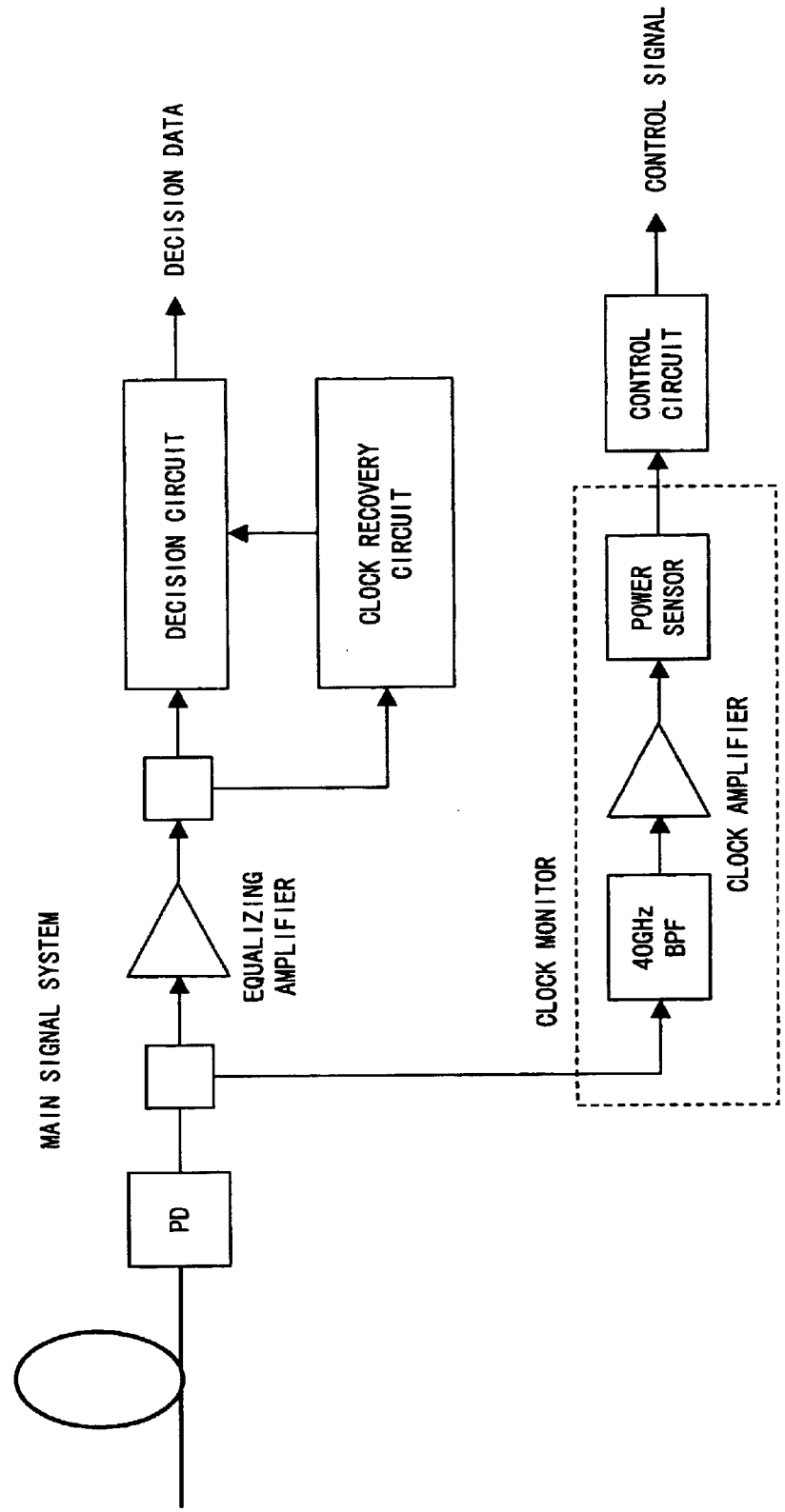
FIG. 2 shows the configuration of a 40 Gb/s optical communication system adopting a conventional clock monitoring method.
Figure 3:
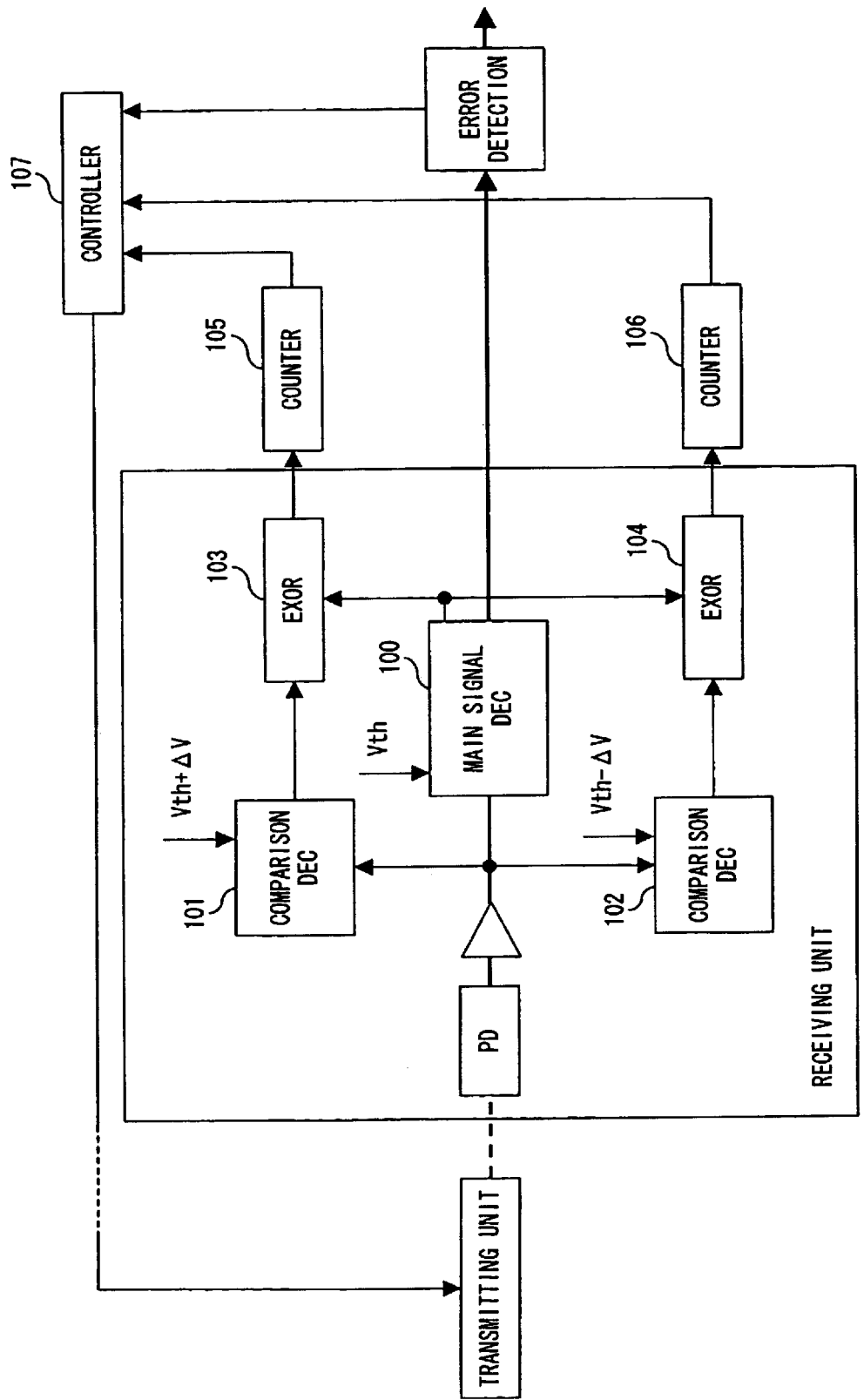
FIG. 3 shows the configuration of an optical communication system adopting a monitoring method for detecting a change in chromatic dispersion using a conventional DEC (DFF)
Figure 4:
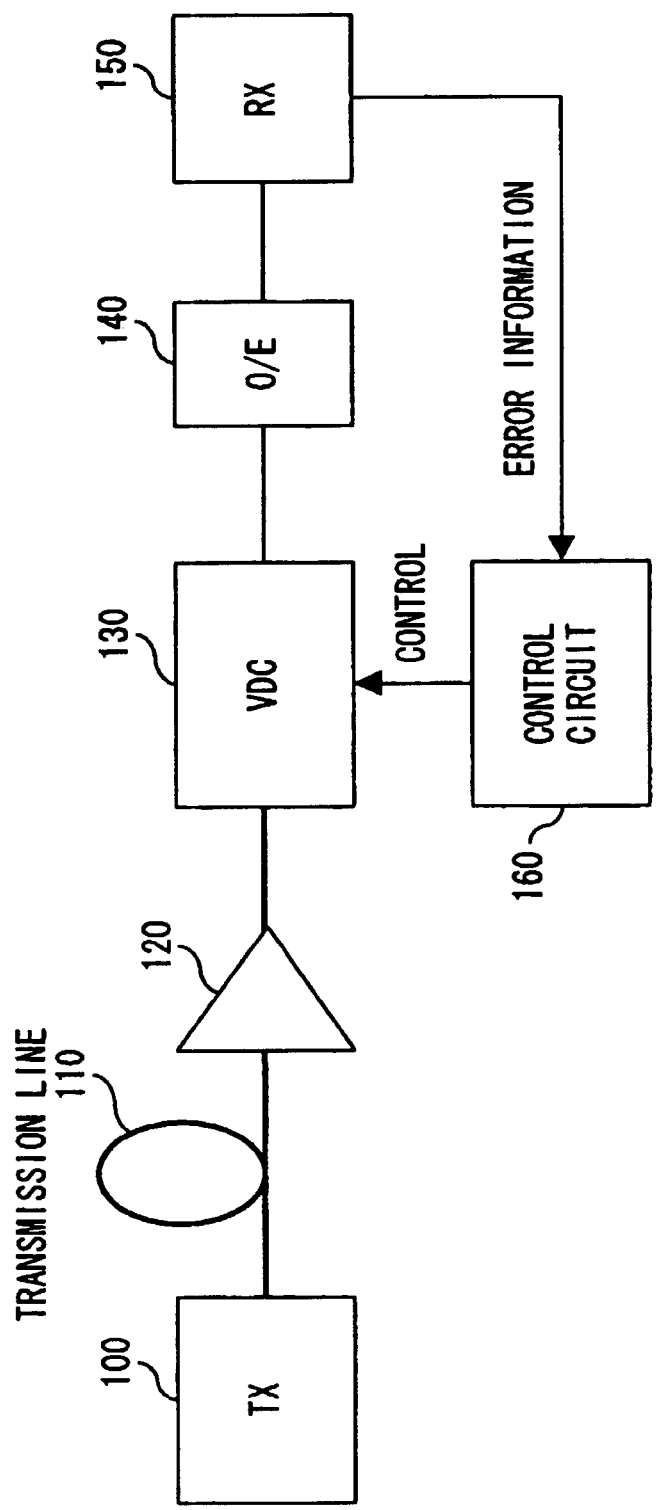
FIG. 4 shows a configuration using a conventional error rate as a chromatic dispersion monitor.
Figure 5:
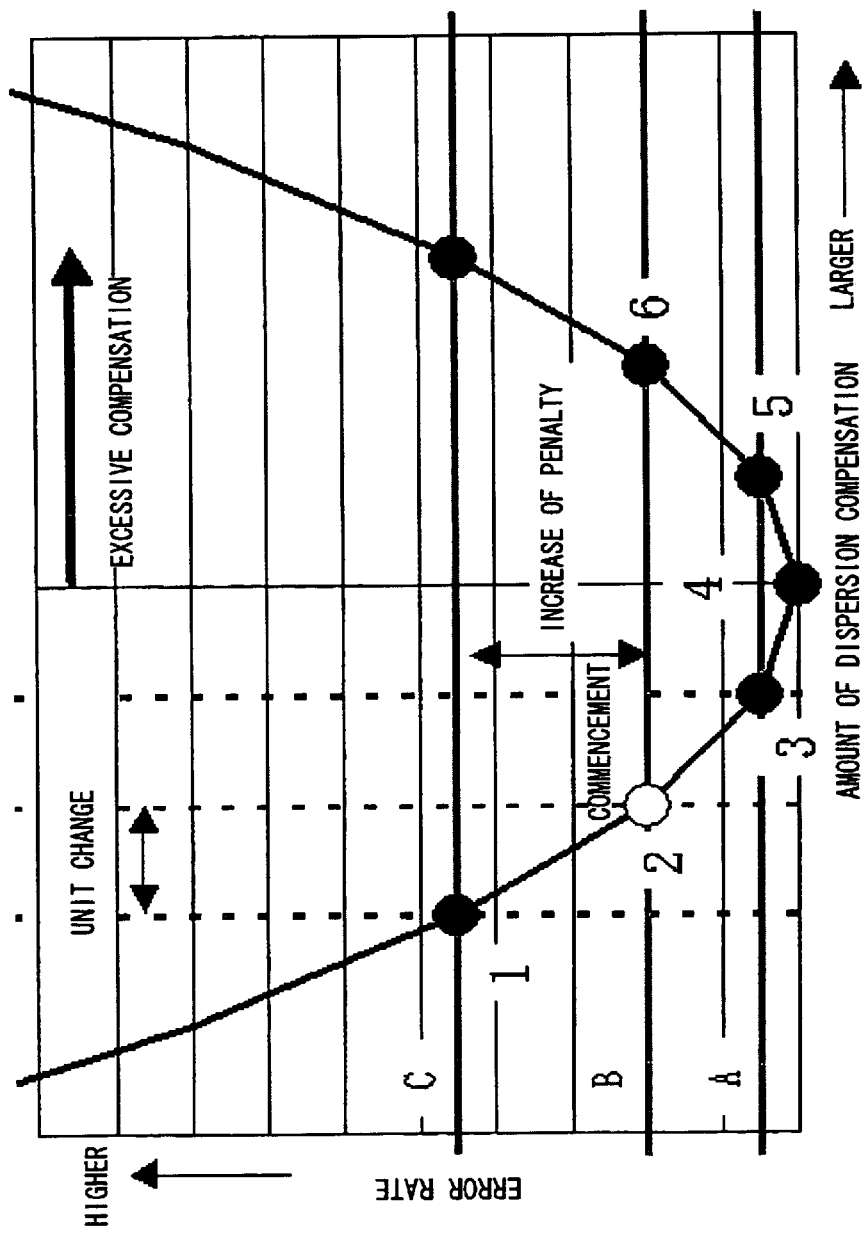
FIG. 5 shows a conventional operation.
Figure 6:
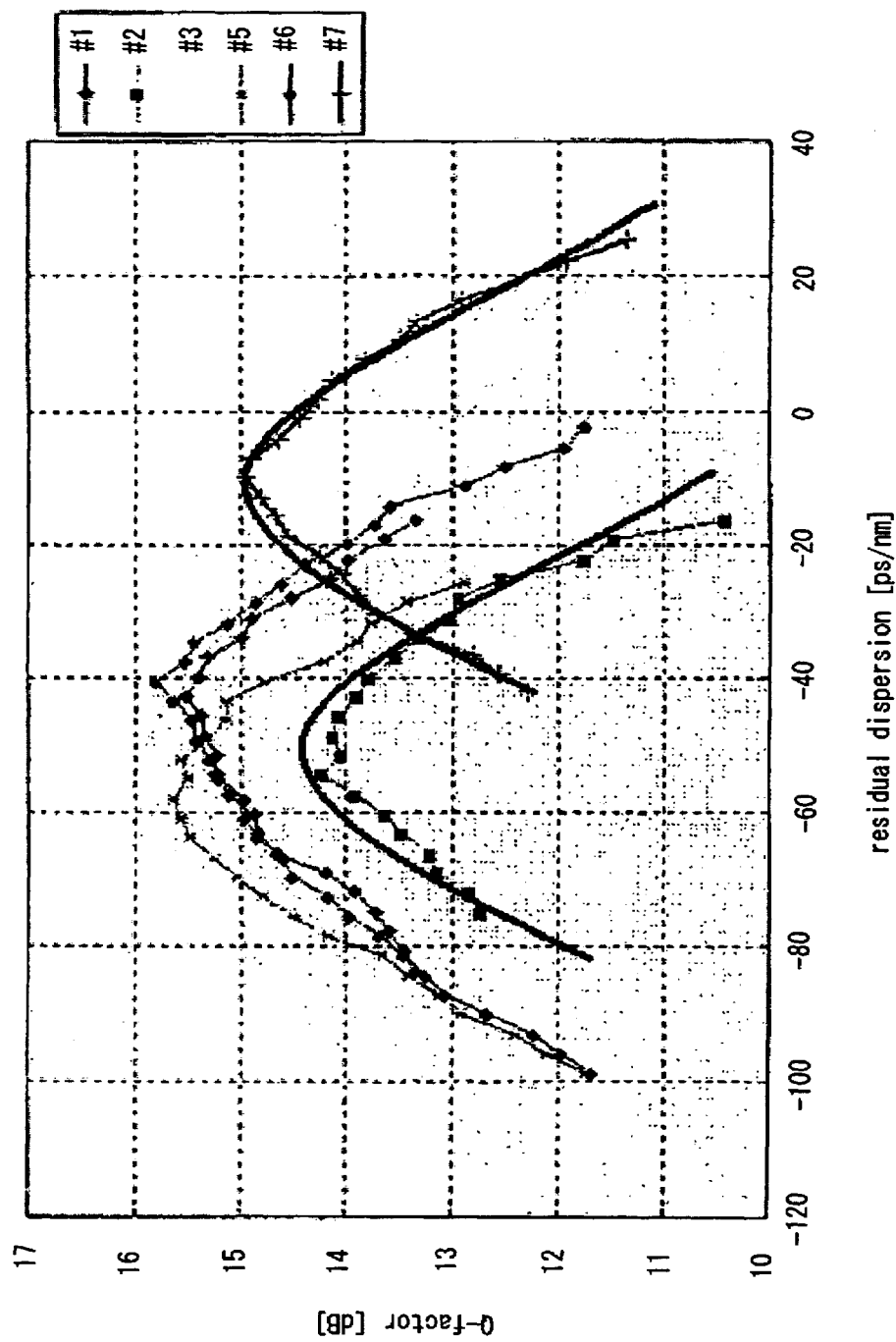
FIG. 6 shows the experimental result of a change in the optical amount of dispersion in a system whose overall average PMD is 8 ps (that is, 0.33 ps/km) and which has six spans of 100 km.
Figure 7:
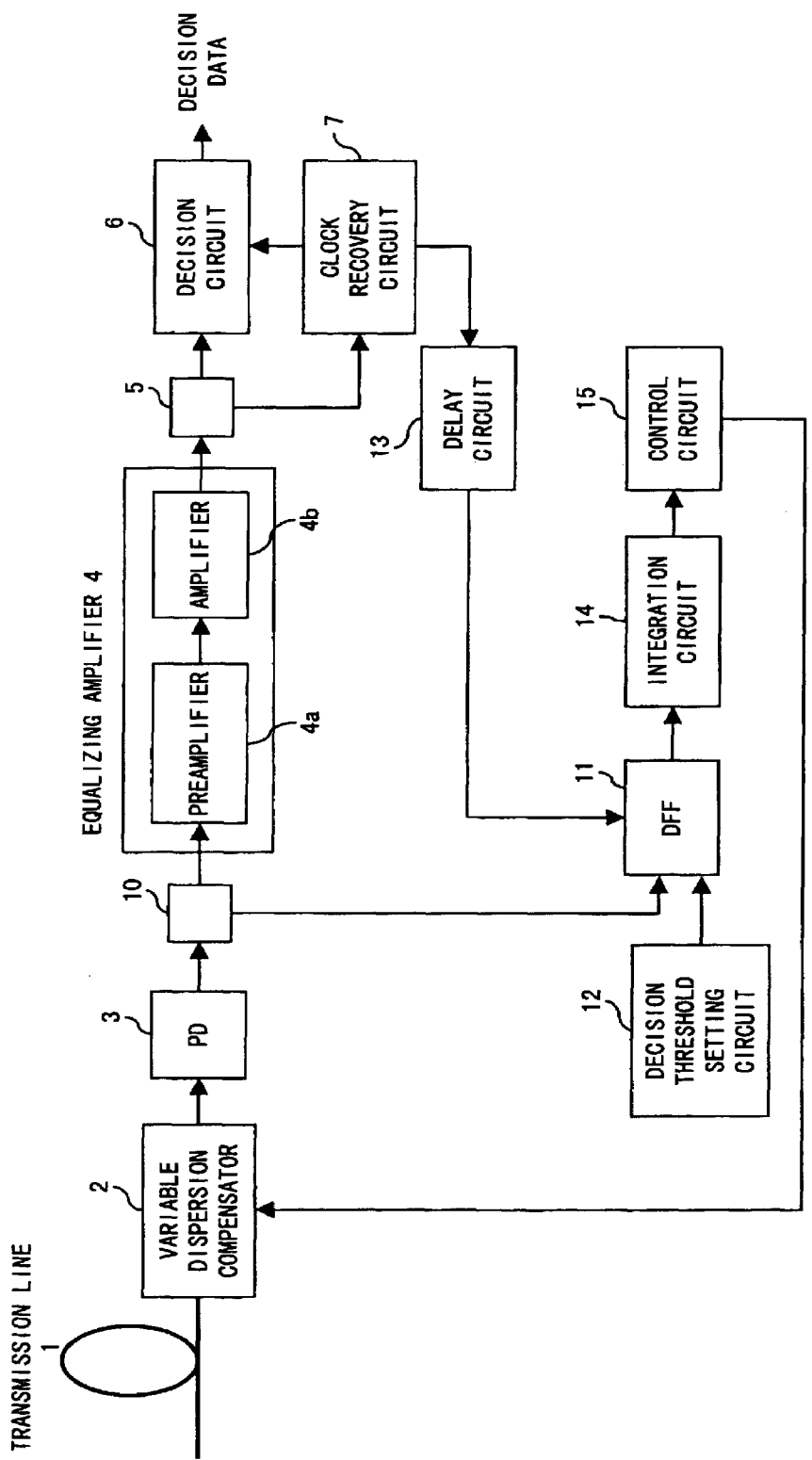
FIG. 7 shows the configuration of the first preferred embodiment of the automatic dispersion compensating system of the present invention.

FIG. 7 shows the operation of the first preferred embodiment of the automatic dispersion compensating system of the present invention.

In FIG. 7, in the automatic dispersion compensating system, a optical receiver unit is provided with a publicly known variable dispersion compensator 2 that generates chromatic dispersion which is the reversal of one caused in a transmission line 1, between the transmission line 1 and a photo-diode 3, and when compensating for dispersion, the amount of dispersion compensation in the variable dispersion compensator 2 is feedback controlled by a monitor system adopting the dispersion monitor technology of the present invention.

The monitor system comprises, for example, a demultiplexer 10, a data flip-flop (DFF) 11, a decision threshold setting circuit 12, a delay circuit 13, an integration circuit 14 and a control circuit 15. The demultiplexer 10 extracts a part of an electric signal transmitted from a photo-diode 3 to an equalizing amplifier 4 as a monitor signal and transmits it to a DFF 11. The DFF 11 compares the level of the monitor signal from the demultiplexer 10 with a decision threshold set by the decision threshold setting circuit 12 in timing synchronous with a clock signal received from a clock recovery circuit 7 through the delay circuit 14, and outputs the result of the comparison to the integration circuit 13 as a logical value. The integration circuit 13 averages logical values outputted from the DFF 11 by timewise integrating them and outputs the result to the control circuit 15. The control circuit 15 detects a change in chromatic dispersion, caused in the transmission line 1, based on the level of an output signal from the integration circuit 13 as described later, and feedback controls the amount of dispersion compensation in a variable dispersion compensator 2 so as to bring the chromatic dispersion close to zero, by reducing the change. In this case, the above-mentioned control circuit 15 is provided with the functions of a dispersion detection unit and a control unit.

In the above-mentioned optical receiver unit, the equalizing amplifier 4 is connected in series to a preamplifier 4a and an amplifier 4b. A part of the receiving signal amplified by the equalizing amplifier 4 is demultiplexed by the demultiplexer 5 and is transmitted to the clock recovery circuit 7. Then, a decision circuit 6 performs the data decision process of the receiving data, based on a clock signal extracted by the clock recovery circuit 7. However, the configuration of the optical receiver unit, to which the present invention is applicable, is not limited to the above-mentioned one. Although the variable dispersion compensator 2 is disposed between the transmission line 1 and the photo-diode 3, for example, the monitor system can also feedback-control the amount of compensation of the variable dispersion compensator by combining a dispersion compensator whose amount of compensation is fixed with a variable dispersion compensator whose amount of compensation can be finely adjusted.

Next, the operation of this automatic dispersion compensating system is described.

Firstly, the basic principle of a dispersion monitoring method according to the present invention is described in detail with reference to the simulation results of a receiving waveform shown in FIGS. 8 through 10. The simulation results shown in FIGS. 8 through 10 show respective receiving waveforms obtained, for example, by changing a chromatic dispersion value to 0 ps/nm, −10 ps/nm and −20 ps/nm under the conditions of a optical signal transfer rate of −40

Gb/s and a negative parameter α (α=−1). In this simulation, neither non-linear effect nor polarization mode dispersion is taken into consideration.

Figure 8:
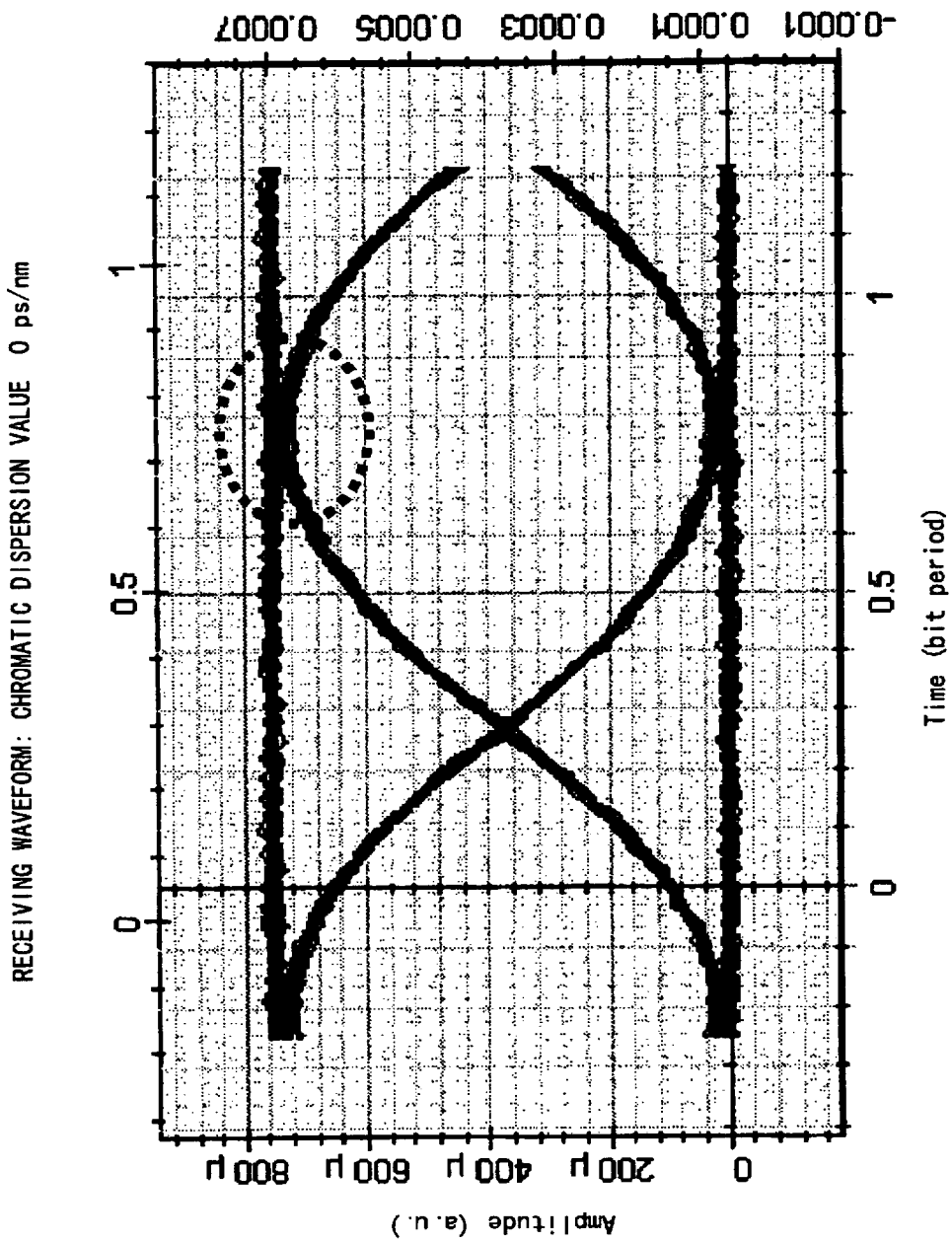
FIG. 8 shows how a waveform distortion is caused by chromatic dispersion, and shows the simulation result of a received waveform obtained when a chromatic dispersion value is 0 ps/nm.
Figure 9:
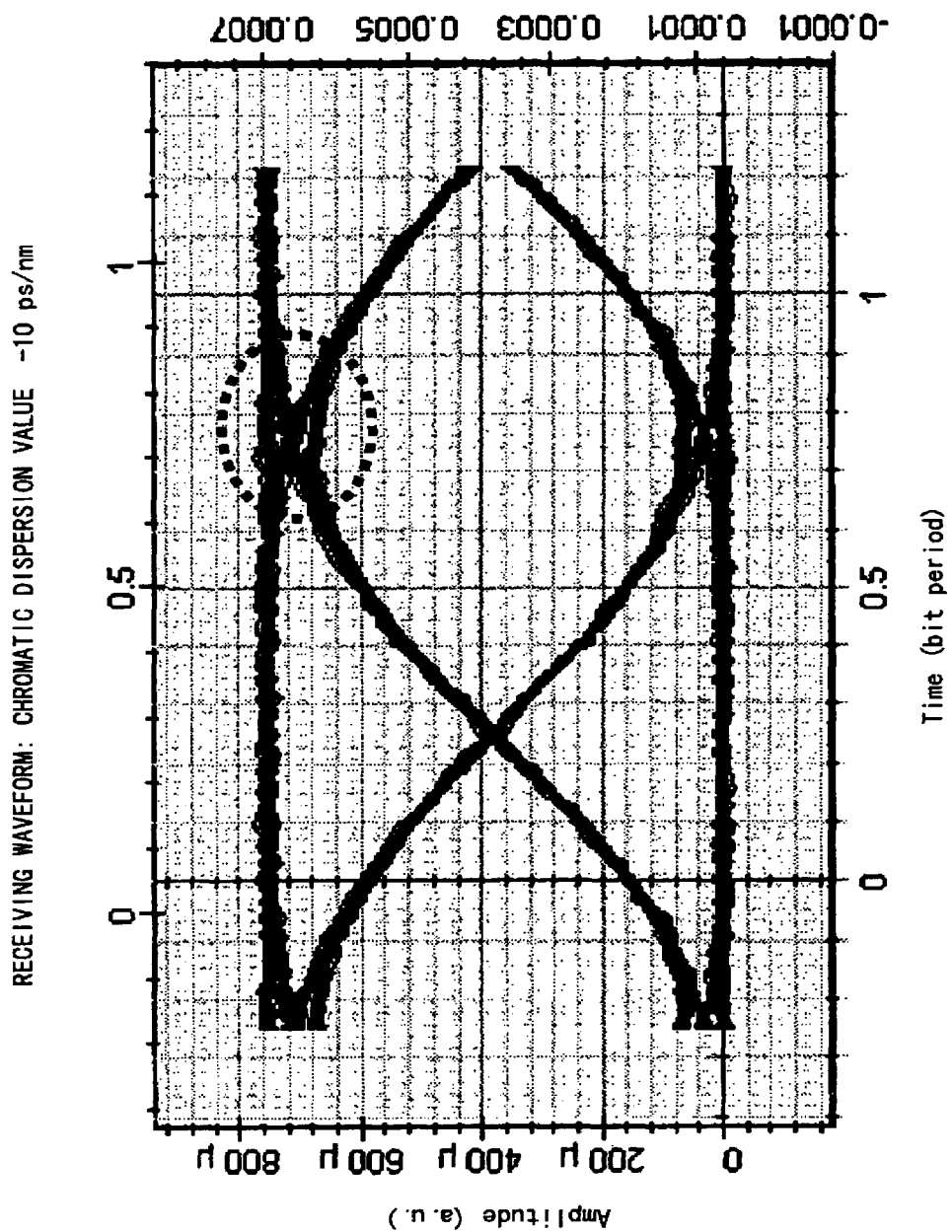
FIG. 9 shows how a waveform distortion is caused by chromatic dispersion, and shows the simulation result of a received waveform obtained when a chromatic dispersion value is −10 ps/nm.
Figure 10:
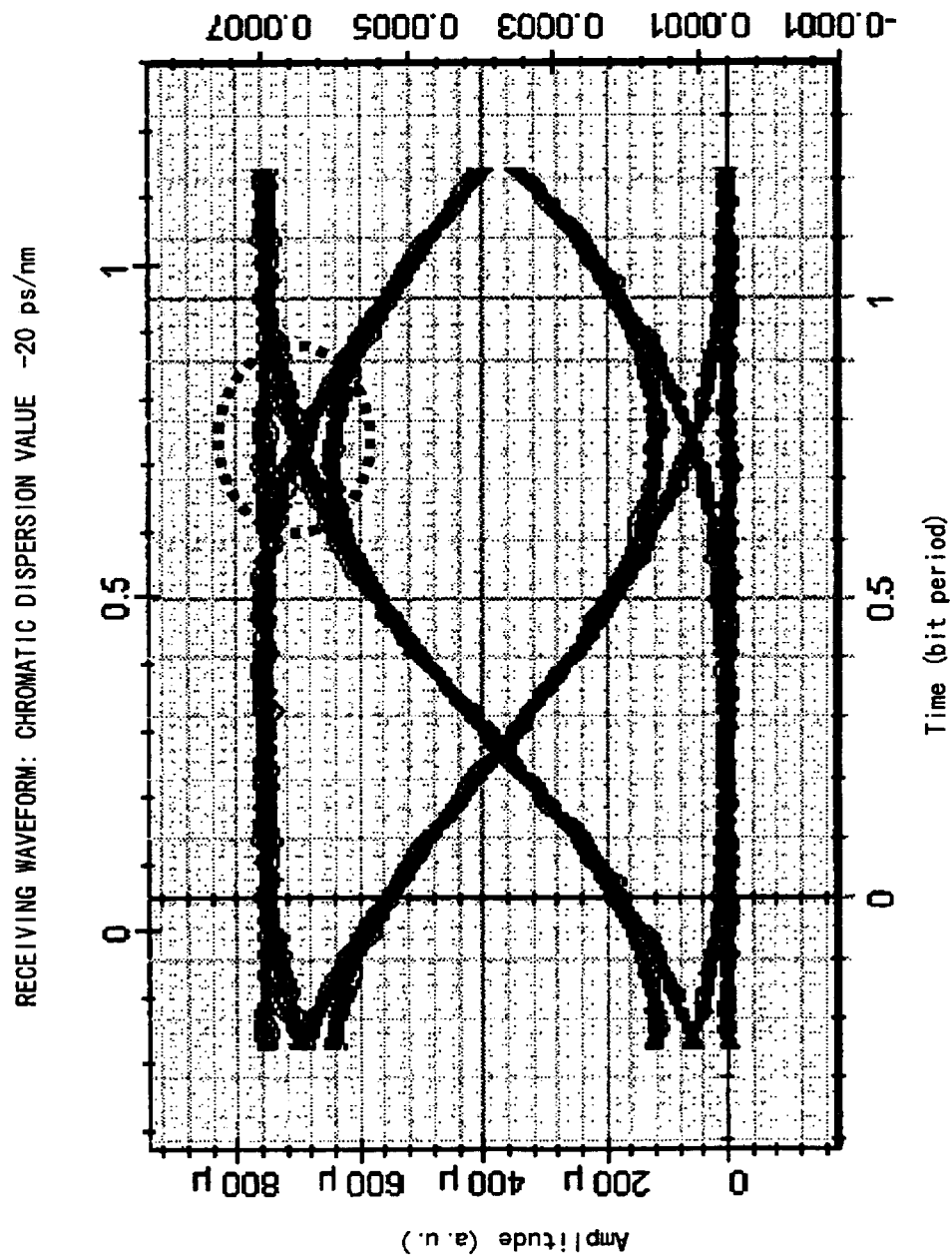
FIG. 10 shows how a waveform distortion is caused by chromatic dispersion, and shows the simulation result of a received waveform obtained when a chromatic dispersion value is −20 ps/nm.

It is known from the respective waveforms shown in FIGS. 8 through 10 that they expand as the negative chromatic dispersion decreases (the absolute value of the chromatic dispersion increases). This dispersion monitoring method detects a change in chromatic dispersion by utilizing the property that a receiving waveform varies with a chromatic dispersion value as described above. Specifically, attention is paid to a level "1" in a pattern of 0, 1, 0, . . . in the receiving waveform, particularly in its bit string. It is known that the high level of a receiving waveform corresponding to this "1" does not completely rise and falls. Therefore, this dispersion monitoring method can determine by detecting such a change in a received waveform, using the DFF 11 and integration circuit 14 shown in FIG. 7.

Figure 11:
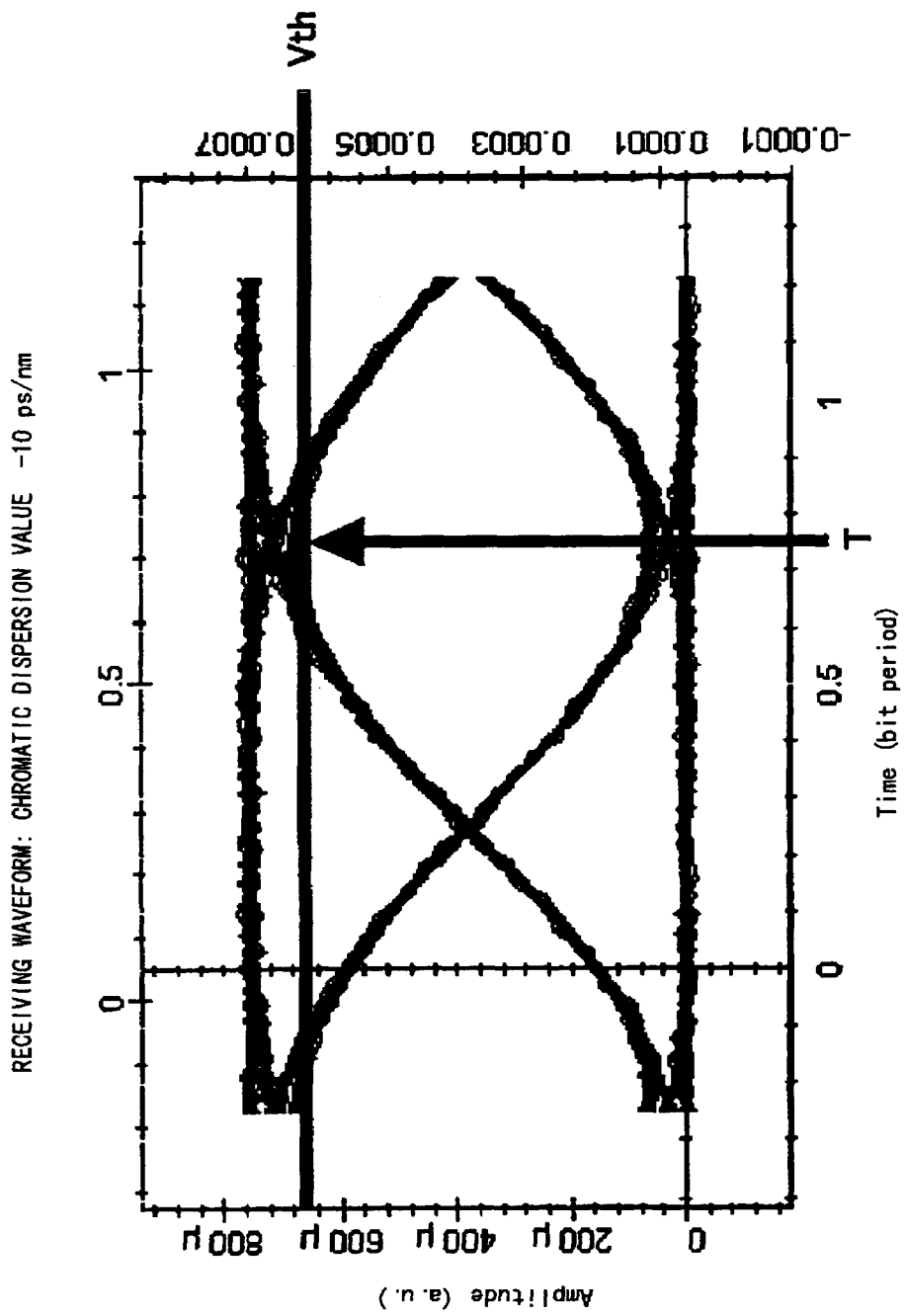
FIG. 11 shows a relationship between the decision threshold and decision phase of the received waveform shown in FIG. 9, that are set in a DFF in the first preferred embodiment.
Figure 12:
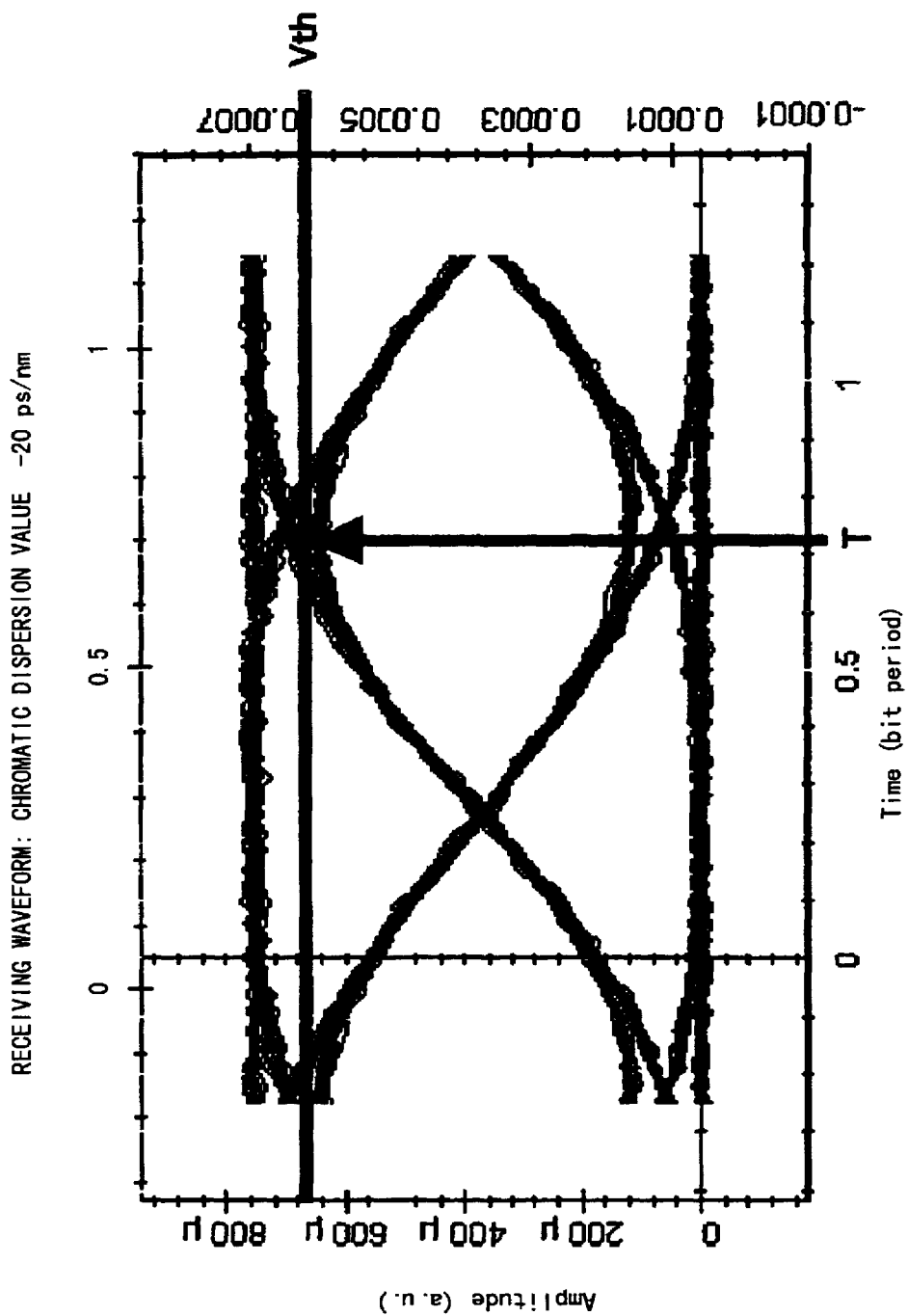
FIG. 12 shows a relationship between a decision threshold and a decision phase of the received waveform shown in FIG. 10, that is set in a DFF in the first preferred embodiment.

FIGS. 11 and 12 show the relationship between a decision threshold Vth and a decision phase T of the received waveform shown in FIGS. 9 and 10, that are set in the DFF 11 shown in FIG. 7. If the decision process of a received waveform is performed based on the relationship between decision threshold Vth and decision phase T shown in FIGS. 11 and 12, the received waveform is determined to be "high" when its chromatic dispersion value is −10 ps/nm (FIG. 11), and it is determined to be "low" when the chromatic dispersion value is −20 ps/nm (FIG. 12). Therefore, the output level of the integration circuit 14, obtained by timewise integrating a logical value outputted from the DFF 11 decreases as the chromatic dispersion value changes from −10 ps/nm to −20 ps/nm. Since the output level of the integration circuit 14 varies depending on a change in chromatic dispersion thus, the control circuit 15 can determine a change in chromatic dispersion caused in the transmission line 1, based on the change in an output level of the integration circuit 14. By feedback-controlling the amount of dispersion compensation in the variable dispersion compensator 2 so as to bring the chromatic dispersion value, determined by the control circuit 15, close to zero by reducing the change, chromatic dispersion caused in the transmitted optical signal can be automatically and surely compensated.

As described above, according to the first preferred embodiment of the automatic dispersion compensating system, by detecting a change in a received waveform due to a change in chromatic dispersion using the DFF 11 and integration circuit 14, a monitor system can be easily configured using a circuit with lower speed than that of a main signal system, thus automatically and surely compensating for chromatic dispersion by detecting a change in the chromatic dispersion characteristic of a transmission line by such a monitor system and feedback-controlling the variable dispersion compensator 2.

Next, the second automatic dispersion compensating system of the present invention is described below.

Figure 13:
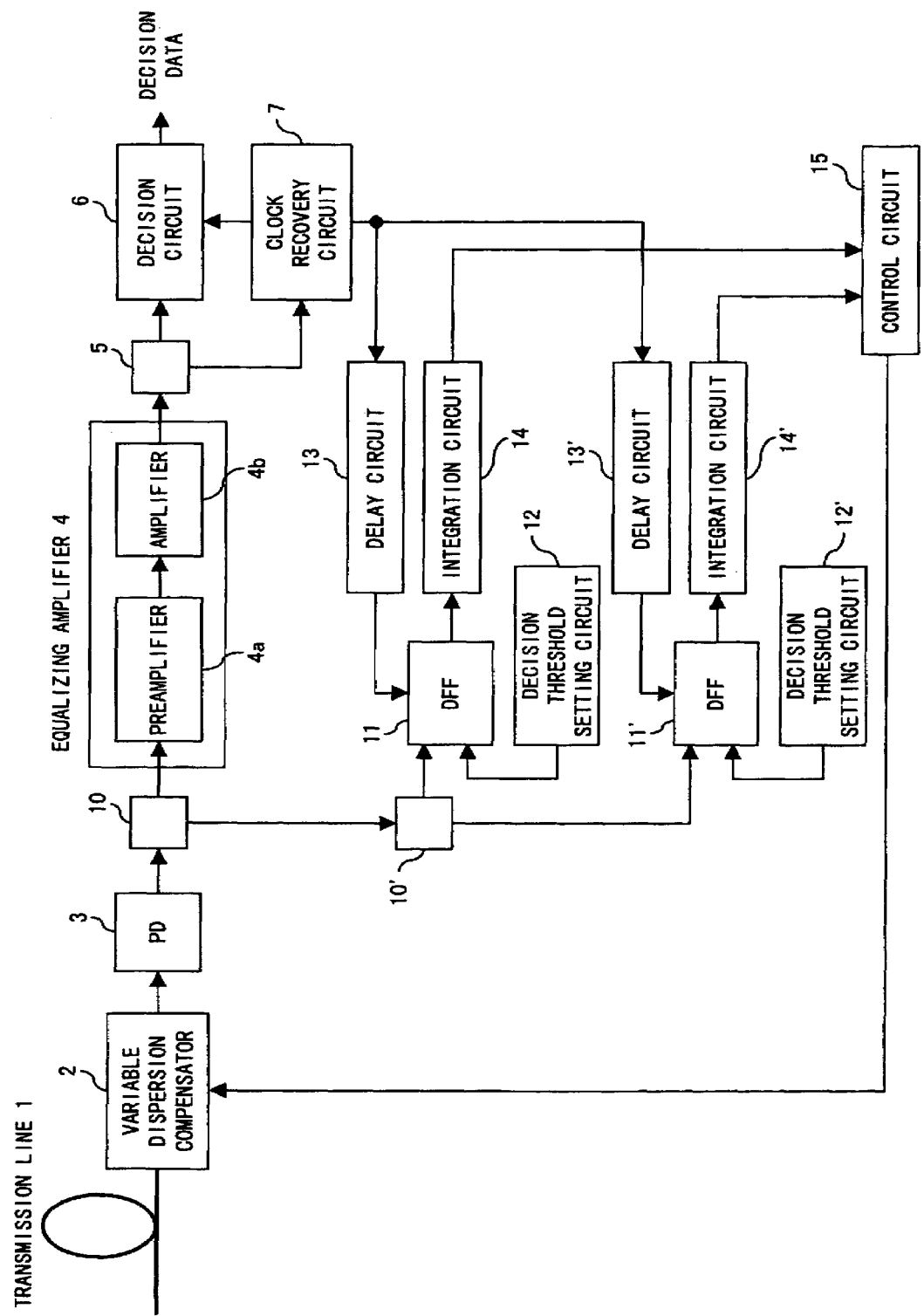
FIG. 13 shows the operation of the second preferred embodiment of the automatic dispersion compensating system of the present invention.

FIG. 13 shows the configuration of the automatic dispersion compensating system in the second preferred embodiment. In FIG. 13, the same reference numerals are attached to the same components as those of the first embodiment shown in FIG. 7. This is true with other preferred embodiments described later.

The automatic dispersion compensating system in the second preferred embodiment differs in a configuration from that of the first preferred embodiment only in that chromatic dispersion is detected by two monitoring systems provided in parallel. Its remaining configuration is the same as the configuration of the first preferred embodiment.

Specifically, a monitor signal demultiplexed by the demultiplexer 10 is further demultiplexed into two by a demultiplexer 10', and the two demultiplexed monitor signals are transmitted to DFFs 11 and 11'. The DFF 11 performs the decision process of the monitor signal from the demultiplexer 10', based on a decision threshold Vth1 set by the decision threshold setting circuit 12 and a decision phase T1 synchronous with a clock signal transmitted from the clock recovery circuit 7 through the delay circuit 13, and outputs a logical value indicating the result to the integration circuit 14. The DFF 11' performs the decision process of the monitor signal from the demultiplexer 10', based on a decision threshold Vth2 (≠Vth1) set by the decision threshold setting circuit 12' and a decision phase T2 (≠T1) synchronous with a clock signal transmitted from the clock recovery circuit 7 through the delay circuit 13', and outputs a logical value indicating the result to the integration circuit 14'. The integration circuits 14 and 14' timewise integrate the logical values outputted from the DFFs 11 and 11', respectively, and output them to the control circuit 15. The control circuit 15 determines changes in chromatic dispersion caused in the transmission line 1, based on the levels of the output signals from the integration circuits 14 and 14', as described later, and feedback-controls the amount of compensation by the variable dispersion compensator 2 so as to bring the chromatic dispersion value close to zero by reducing the change.

In an automatic dispersion compensating system having the above-mentioned configuration, the decrease/increase of chromatic dispersion caused in the transmission line 1 can be detected and the chromatic dispersion can be automatically compensated. Specifically, as in the configuration in which one set of monitor systems performs the decision process, as in the above-mentioned first preferred embodiment, the decrease of the chromatic dispersion value can be detected if a waveform is expanded by the combination of a negative parameter a and a negative chromatic dispersion value. However, as the received waveforms in FIGS. 14 and 15 show, for example, if a waveform is compressed by the combination of a negative parameter α and a positive chromatic dispersion value, the increase of chromatic dispersion cannot be detected.

Figure 14:
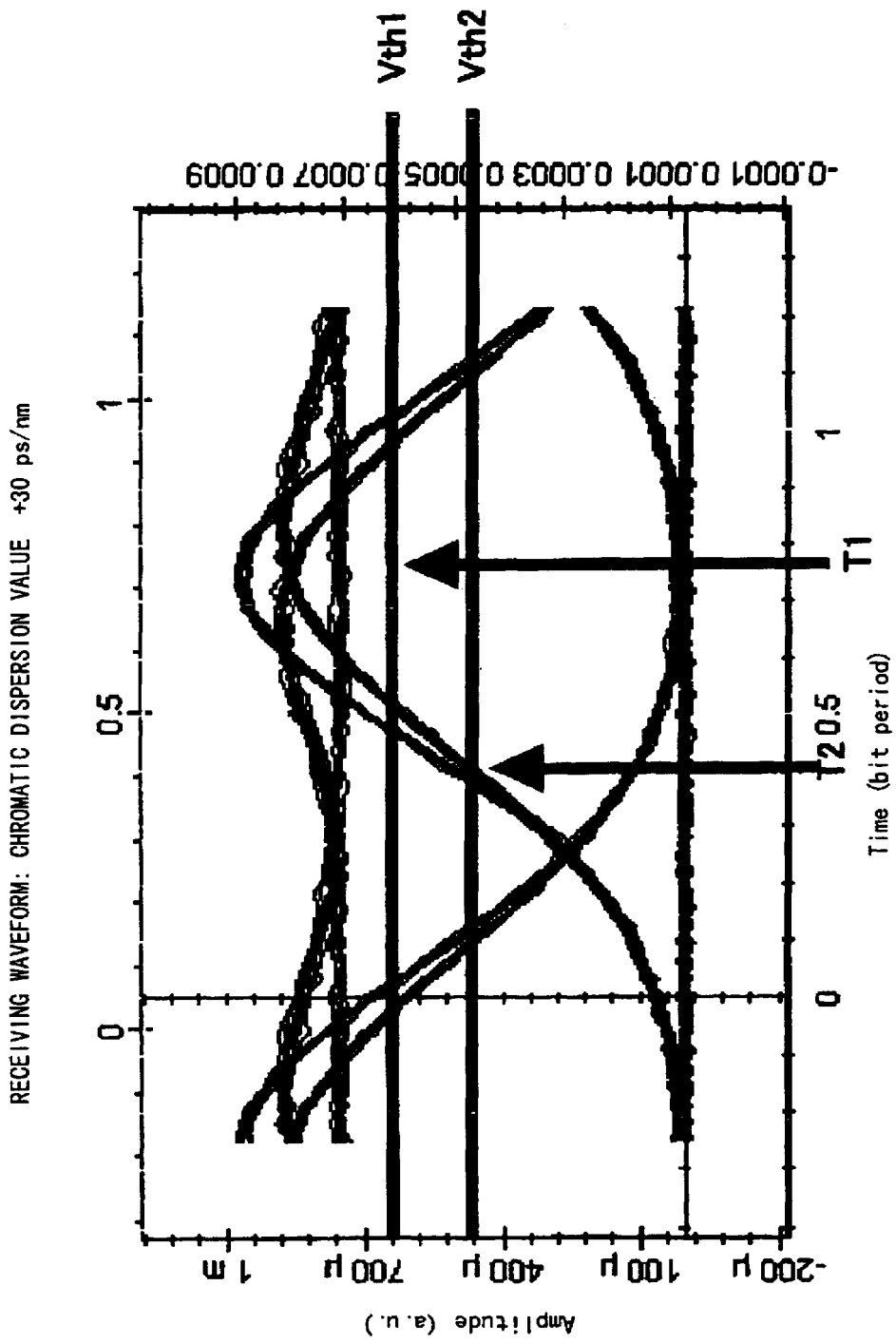
FIG. 14 shows a relationship between a decision threshold and a decision phase of the received waveform whose chromatic dispersion value is +30 ps/nm, that are set in a DFF in the second preferred embodiment.
Figure 15:
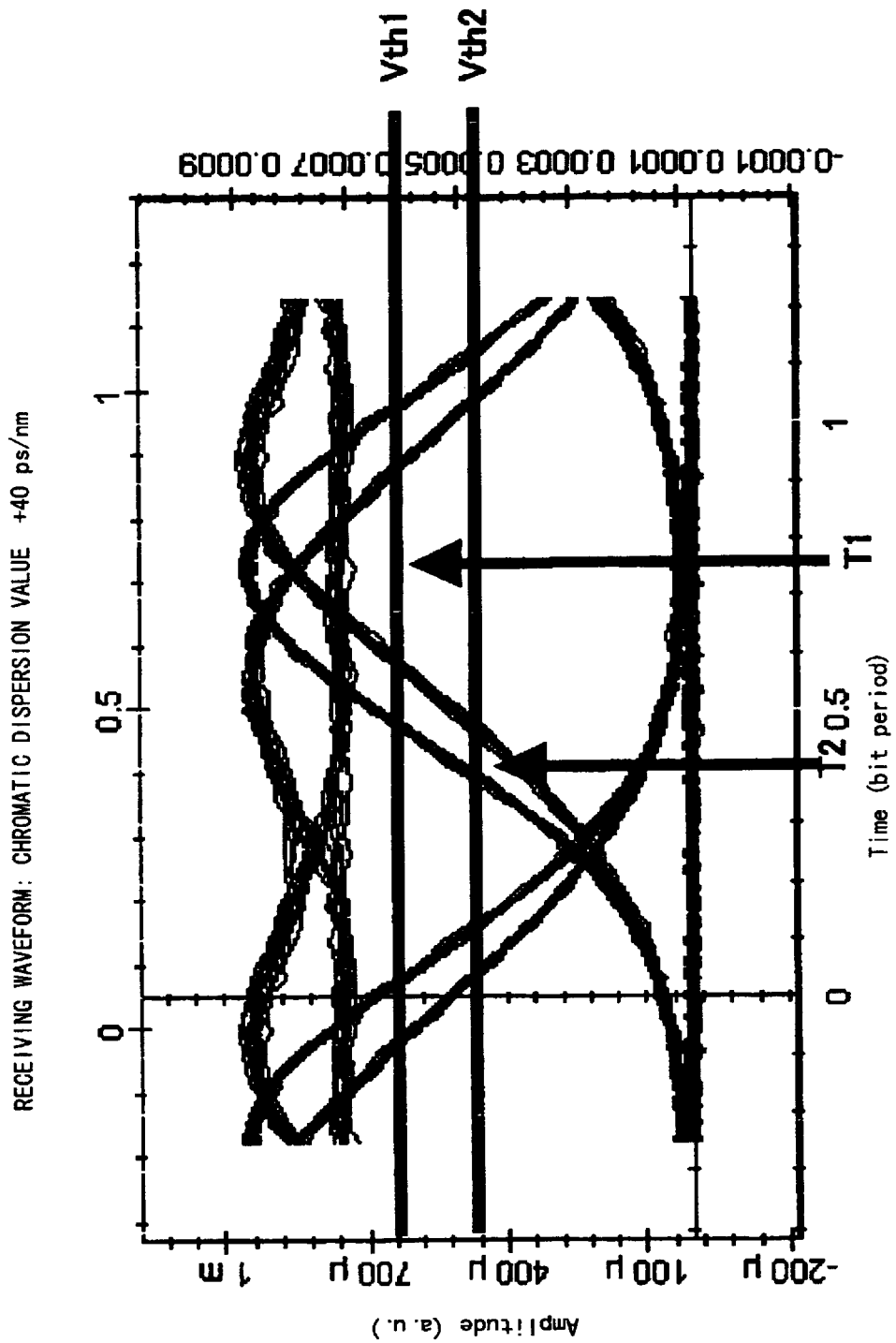
FIG. 15 shows a relationship between a decision threshold and a decision phase of the received waveform whose chromatic dispersion value is +50 ps/nm, that are set in a DFF in the second preferred embodiment.

Therefore, in the automatic dispersion compensating system in this preferred embodiment, the increase of the chromatic dispersion can be detected by providing two sets of monitor systems and setting the relationship between decision threshold Vth1 and decision phase T1 in one set of monitor systems and the relationship between decision threshold Vth2 and decision phase T2 in the other set of monitor systems as shown by the thick lines in FIGS. 14 and 15, respectively, when the waveform is compressed. Specifically, decision threshold Vth1 and decision phase T1 are set as in the first preferred embodiment, and decision threshold Vth2 and decision phase T2 are set, for example, so that level decision can be made in the rising part of a pulse, level "1" in a bit string . . . 0, 1, . . . . In this case, although if the chromatic dispersion value is +30 ps/nm (FIG. 14) or +50 ps/nm (FIG. 15), there is no change in the decision result by the combination of decision threshold Vth1 and decision phase T1, there is a difference in the decision result by decision threshold Vth2 and decision phase T2. Therefore, the increase of chromatic dispersion can be detected when a waveform is compressed. If a waveform is expanded, the decrease of chromatic dispersion can be detected, based on the decision result by the combination of decision threshold Vth1 and decision phase T1, as in the first preferred embodiment.

As described above, according to the automatic dispersion compensating system in the second preferred embodiment, by detecting the waveform change of a monitor signal using two sets of the DFFs 11 and 11' and integration circuits 13 and 13', not only the decrease of chromatic dispersion caused in the transmission line 1, but its increase can also be detected with high accuracy, thus realizing the automatic compensation of a wide range of chromatic dispersion.

In the above-mentioned second preferred embodiment, chromatic dispersion is monitored by providing two sets of DFFs and integration circuits. However, by increasing the number of the combination of DFFs and integration circuits, the increase/decrease of chromatic dispersion can be detected in multiple-stages and the detection accuracy of chromatic dispersion can be further improved.

Next, the third preferred embodiment of the automatic dispersion compensating system of the present invention is described.

Figure 16:
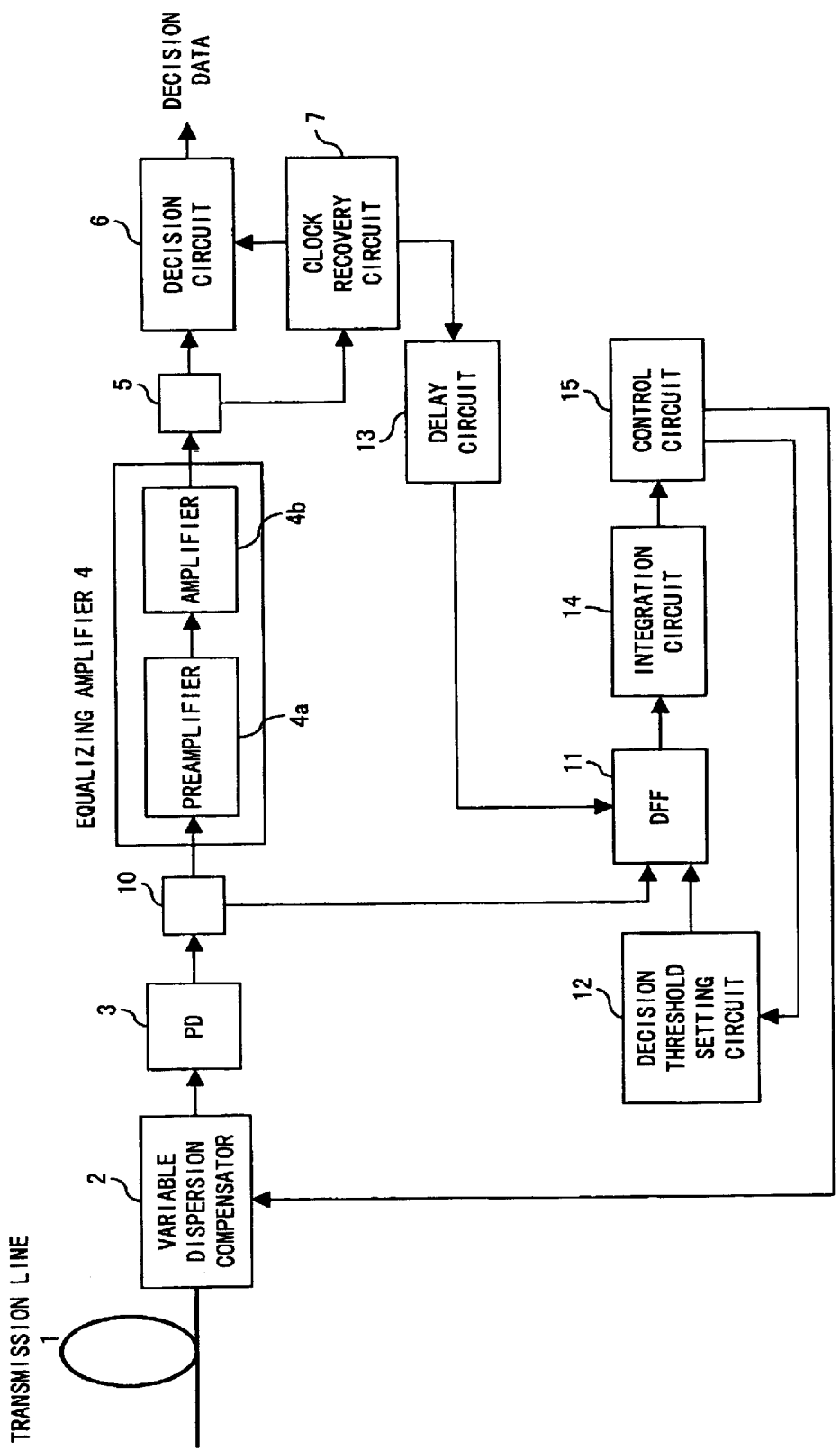
FIG. 16 shows the operation of the third preferred embodiment of the automatic dispersion compensating system of the present invention.

FIG. 16 shows the configuration of the automatic dispersion compensating system in the third preferred embodiment.

The configuration of the automatic dispersion compensating system in the third preferred embodiment shown in FIG. 16 differs from that of the first preferred embodiment shown in FIG. 7 only in that the level of a decision threshold set by the decision threshold setting circuit 12 can be changed and controlled based on a control signal outputted from the control circuit 15, and its remaining configuration is the same as that of the first preferred embodiment. In this case, the control circuit 15 is provided with the function of a threshold control unit.

In the automatic dispersion compensating system having such a configuration, as shown in FIGS. 17 through 20, for example, the decision process of a monitor signal in the DFF11 is performed by gradually changing a decision threshold against the timing of a fixed decision phase T, and chromatic dispersion caused in a transmission line is determined based on the result of the decision.

Figure 21:
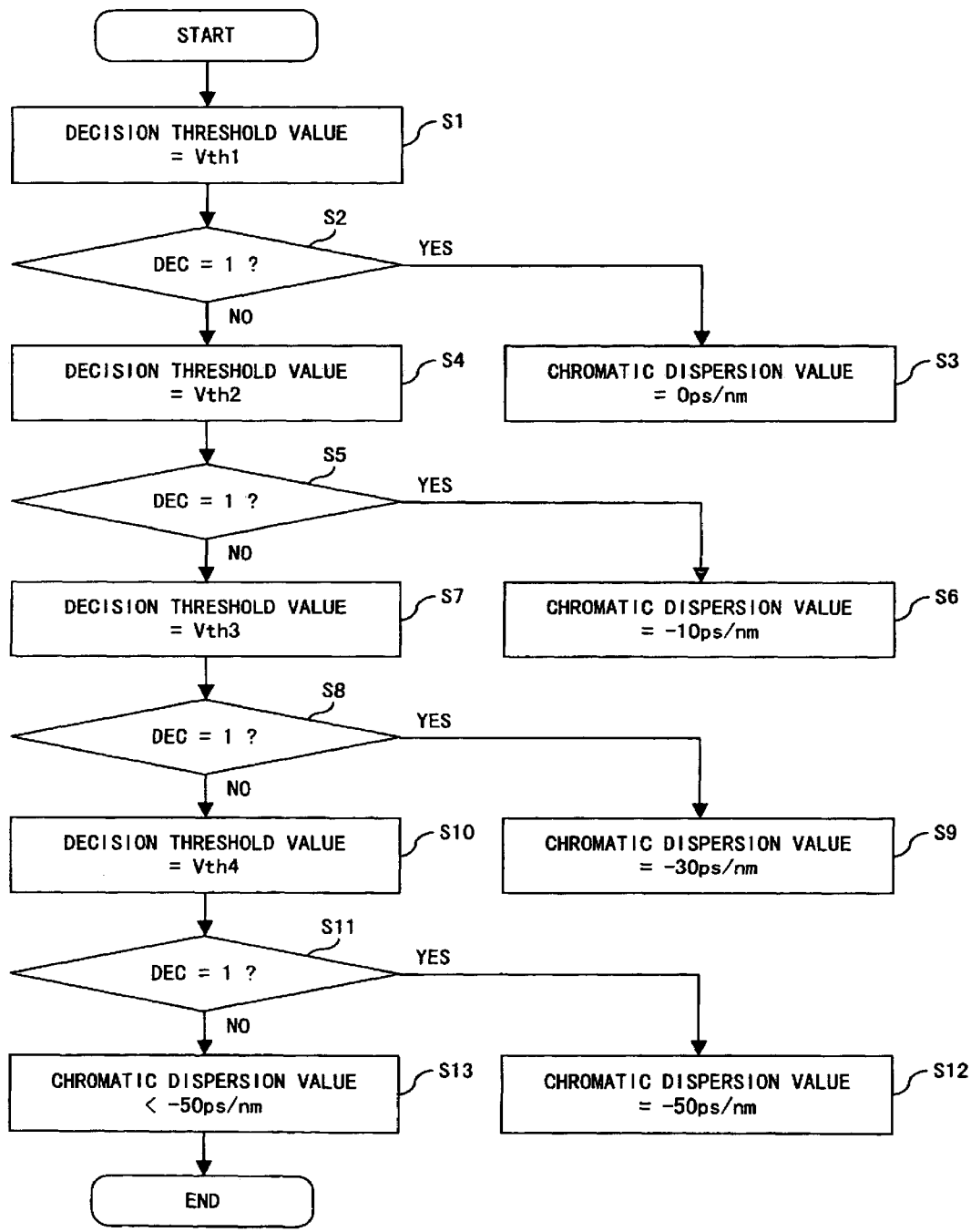
FIG. 21 is a flowchart showing an algorithm for monitoring chromatic dispersion in the third preferred embodiment.

FIG. 21 is a flowchart showing an algorithm for monitoring chromatic dispersion in the third preferred embodiment. Here, the detailed description is made assuming a case where chromatic dispersion values of 0, −10, −30, −50 ps/nm or −50 ps/nm or less is detected by performing a decision process changing a decision threshold in four steps (Vth1 through Vth4).

Figure 17:
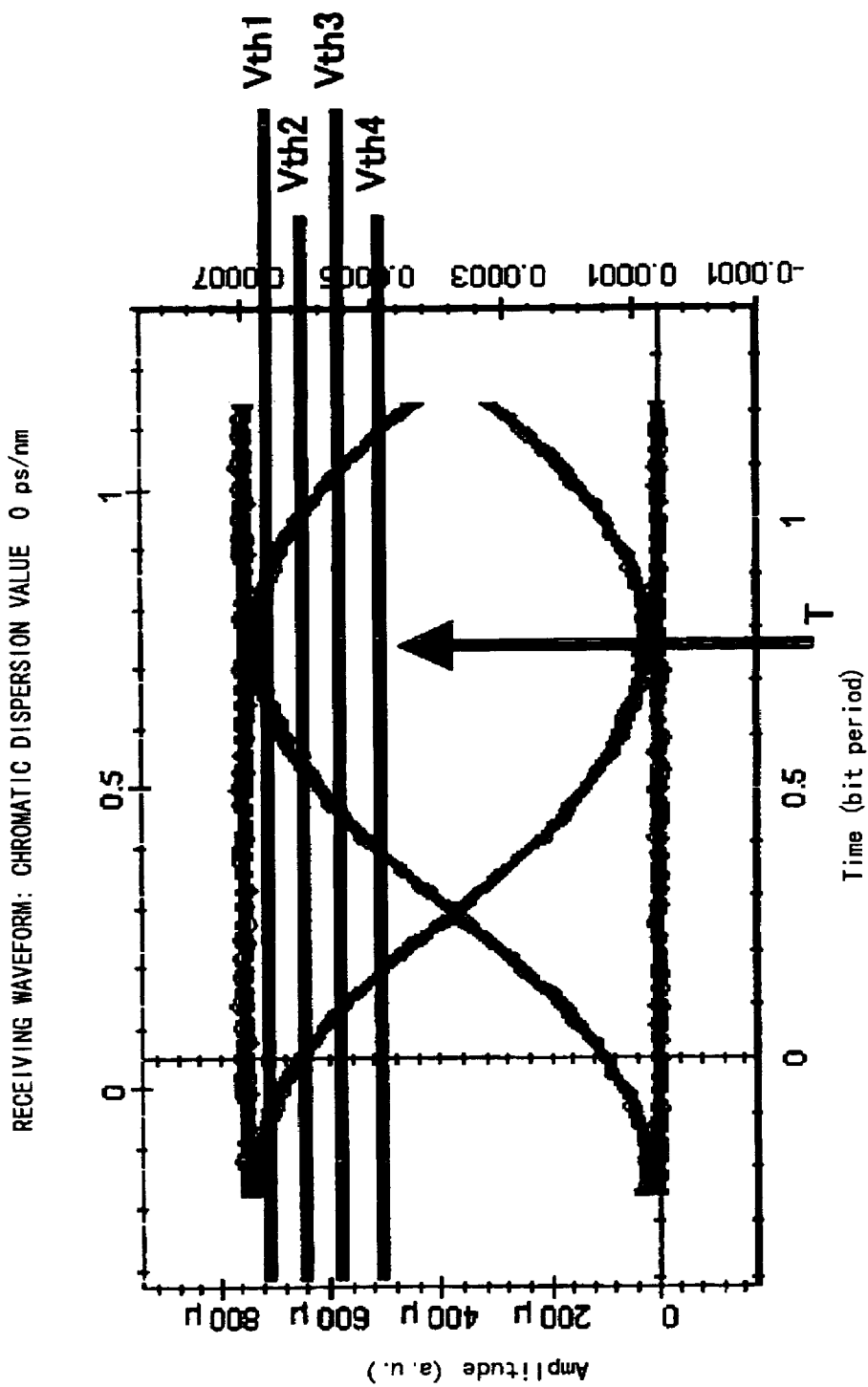
FIG. 17 shows a relationship between a decision threshold and a decision phase of the received waveform whose chromatic dispersion value is 0 ps/nm, that are set in a DFF in the third preferred embodiment.
Figure 18:
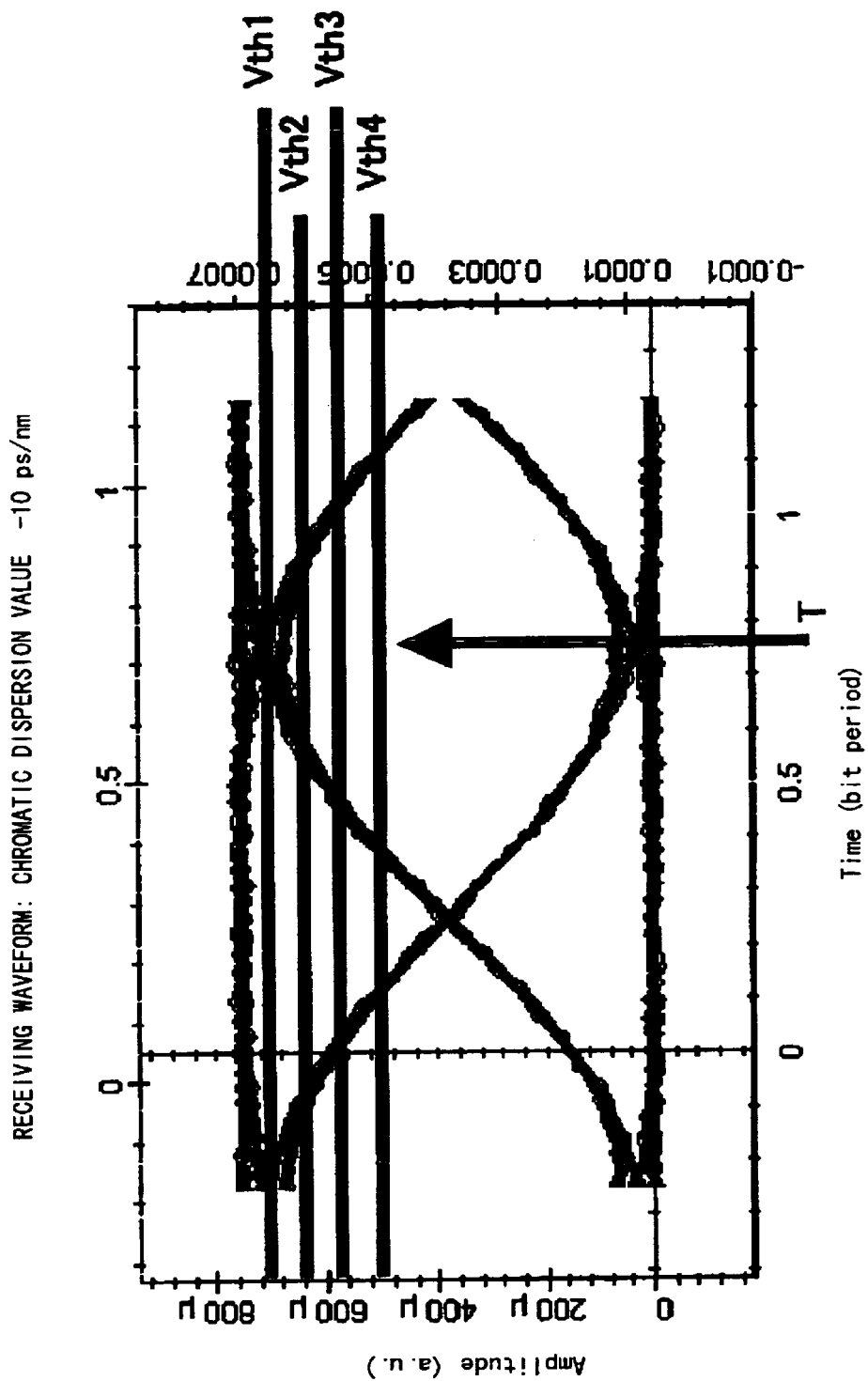
FIG. 18 shows a relationship between a decision threshold and a decision phase of the received waveform whose chromatic dispersion value is −10 ps/nm, that are set in a DFF in the third preferred embodiment.
Figure 19:
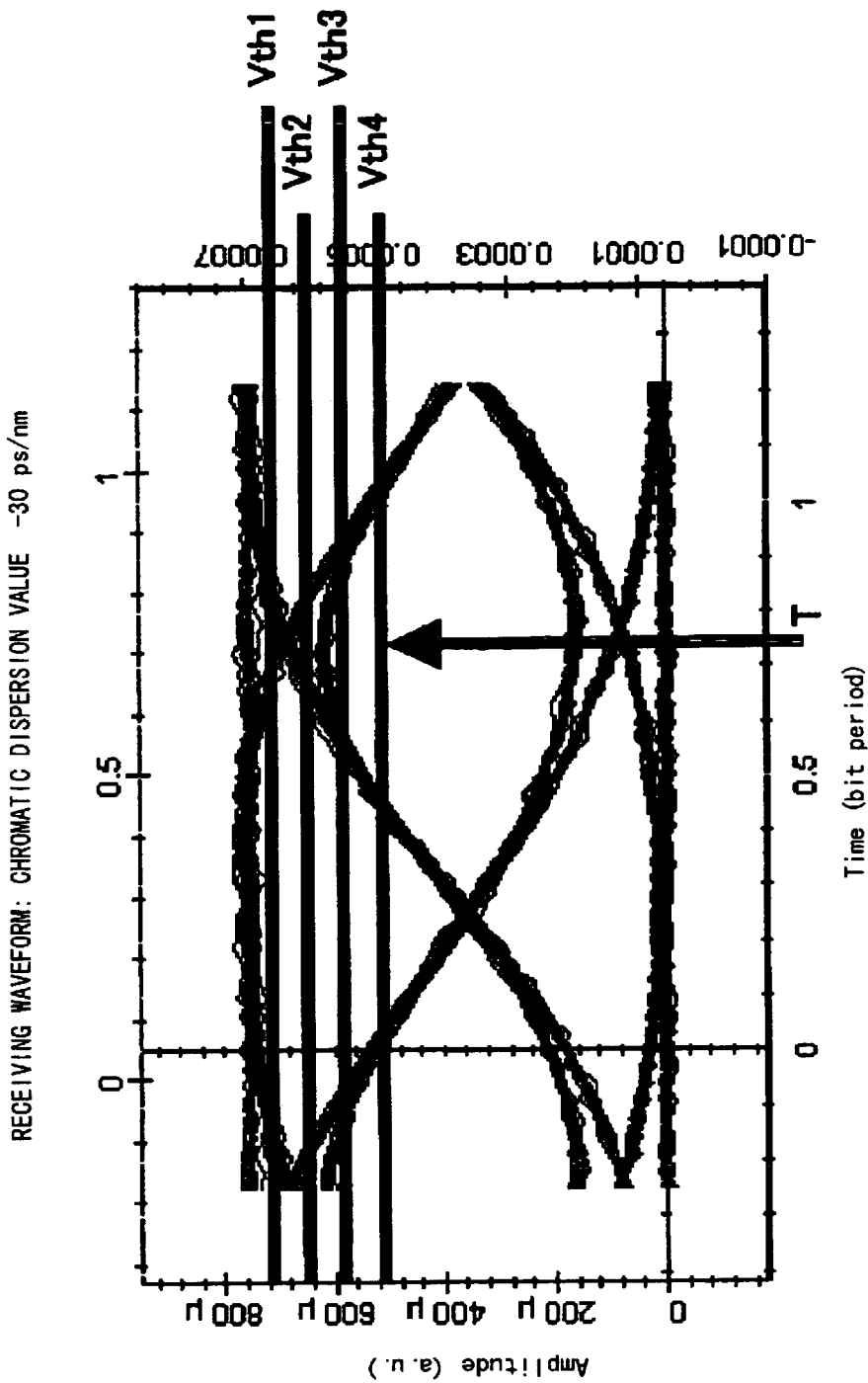
FIG. 19 shows a relationship between a decision threshold and a decision phase of the received waveform whose chromatic dispersion value is −30 ps/nm, that are set in a DFF in the third preferred embodiment.
Figure 20:
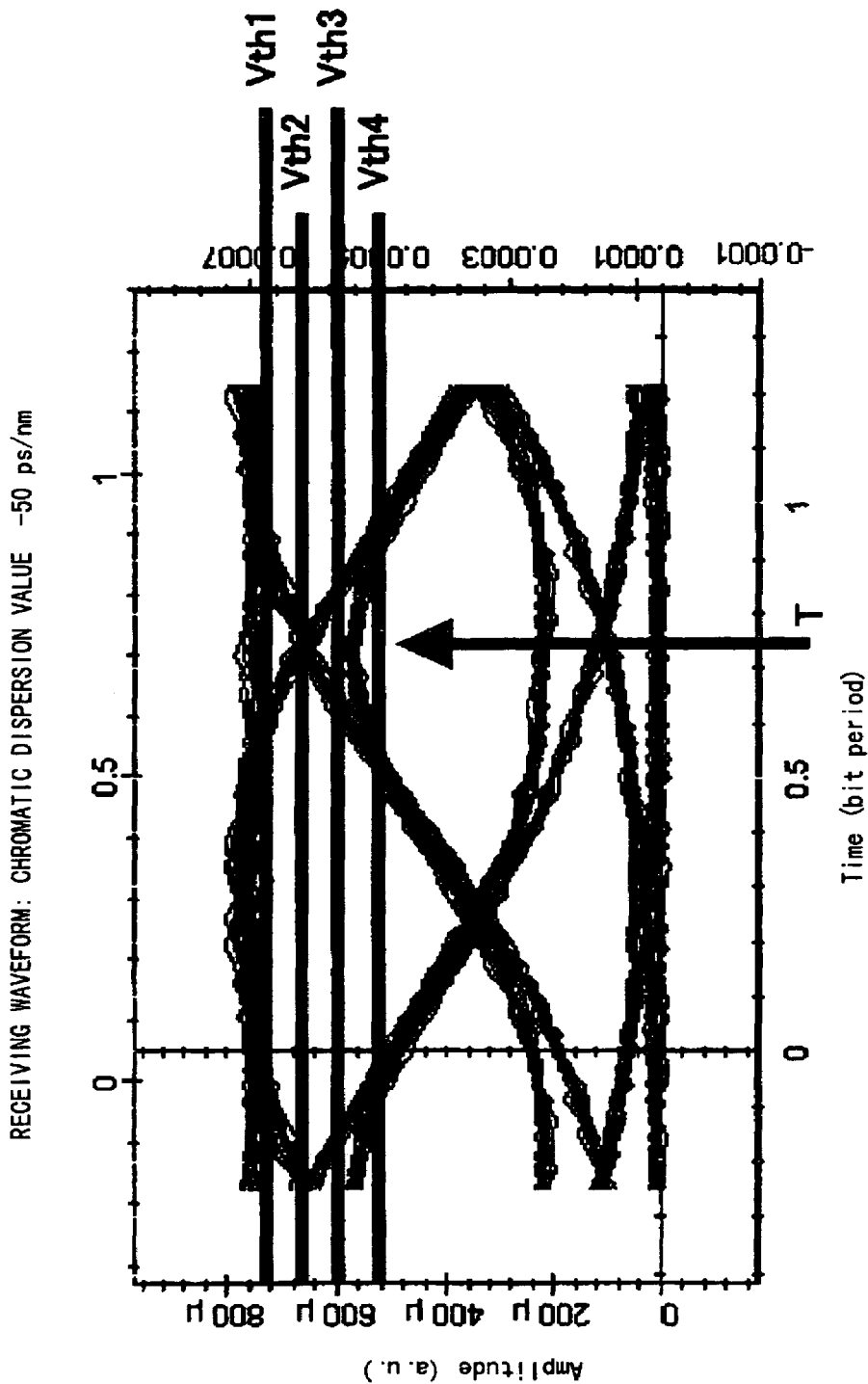
FIG. 20 shows a relationship between a decision threshold and a decision phase of the received waveform whose chromatic dispersion value is −50 ps/nm, that are set in a DFF in the third preferred embodiment.

Firstly, in step 1 of FIG. 21 (it is shown as S1 in the figure and the same is applied herein after), a decision threshold to be supplied to the DFF11 by the decision threshold setting circuit 12 is set as an initial value Vth1 (FIGS. 17 through 20). Then, in step 2, the level "1" of a monitor signal is compared with decision threshold Vth1 in the timing of a decision phase T, and it is determined whether the decision result is high (HIGH; DEC=1) or low (LOW;DEC=0). Specifically, if the decision result against the decision threshold Vth1 is high, as shown in FIG. 17, the process proceeds to step 3 and a chromatic dispersion value 0 ps/nm is detected. If the decision result against the decision threshold Vth1 is low, as shown in FIGS. 18 through 20, the process proceeds to step 4 and the setting of a decision threshold is modified to Vth2 (<Vth1 ).

Then, in step 5, as in step 2, the decision result of a monitor signal against decision threshold Vth2 is determined. In this case, if the decision result against decision threshold Vth2 is high, as shown in FIG. 18, the process proceeds to step 6 and a dispersion value −10 ps/nm is detected. If the decision result against the decision threshold Vth1 is low, as shown in FIGS. 19 through 20, the process proceeds to step 7 and the setting of a decision threshold is modified to Vth3 (<Vth2 ).

Furthermore, in step 8, the decision result of the monitor signal against decision threshold Vth3 is determined. If the decision result is high (FIG. 19), in step 9, a chromatic dispersion value −30 ps/nm is detected. If the decision result is low (FIG. 20), in step 10, the setting of a decision threshold is modified to Vth4 (<Vth3). Lastly, in step 11, the decision result of the monitor signal against decision threshold Vth4 is determined. If the decision result is high (FIG. 20), in step 12, a chromatic dispersion value −50 ps/nm is detected. If the decision result is low, in step 13, a chromatic dispersion value −50 ps/nm or less is detected.

The above-mentioned respective relationships between a chromatic dispersion value, a decision threshold and its decision result in an algorithm are collectively expressed by the following Table 1.

TABLE 1

| | | decision threshold | | | |
|---|---|---|---|---|---|
| | | Vth1 | Vth2 | Vth3 | Vth4 |
| wavelength | 0 | HIGH | HIGH | HIGH | HIGH |
| dispersion | −10 | LOW | HIGH | HIGH | HIGH |
| value | −30 | LOW | LOW | HIGH | HIGH |
| (ps/nm) | −50 | LOW | LOW | LOW | HIGH |

As described above, according to the automatic dispersion compensating system in the third preferred embodiment, a change in chromatic dispersion can be detected with higher accuracy by changing a decision threshold set in the DFF11 in multiple-steps according to the decision result of a monitor signal. Thus, the configuration of a monitor system can be simplified and the automatic compensation of chromatic dispersion can be surely executed.

Although in the above-mentioned third preferred embodiment, chromatic dispersion is detected by changing a decision threshold in four steps, a decision threshold to be supplied to the DFF11 can be set in an arbitrary number of steps according to the required detection accuracy of chromatic dispersion. The case where when a waveform is expanded, the decrease of chromatic dispersion is detected by gradually reducing the decision threshold has been described above. However, when the waveform is compressed, the increase of chromatic dispersion can be detected with high accuracy by gradually increasing the decision threshold.

Next, the fourth preferred embodiment of the automatic dispersion compensating system of the present invention is described.

Figure 22:
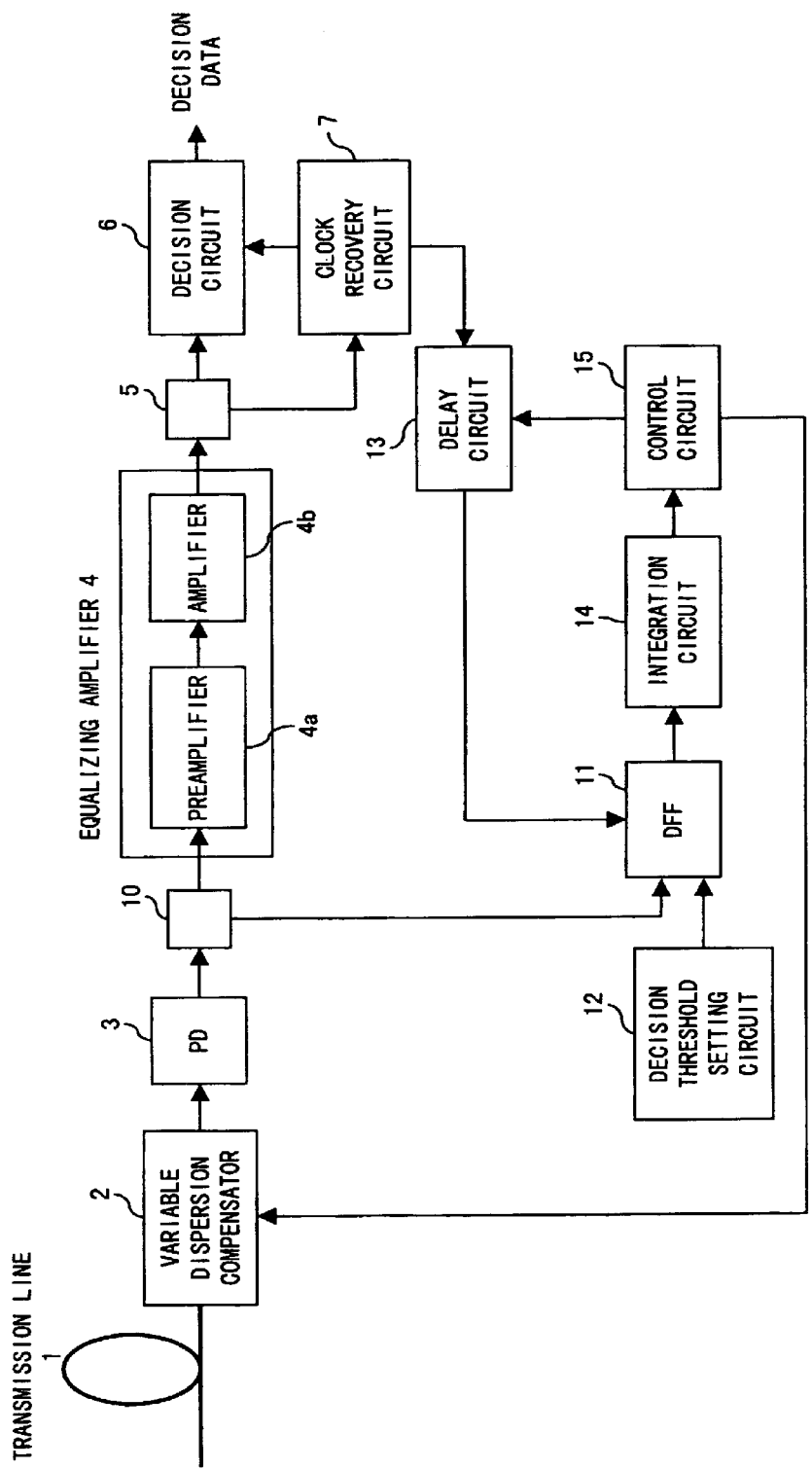
FIG. 22 shows the operation of the fourth preferred embodiment of the automatic dispersion compensating system of the present invention.

FIG. 22 shows the configuration of the automatic dispersion compensating system in the fourth preferred embodiment.

The configuration of the automatic dispersion compensating system in the fourth preferred embodiment shown in FIG. 22 differs from that of the first preferred embodiment shown in FIG. 7 only in that the amount of delay of a clock signal in the delay circuit 13 can be changed and controlled based on a control signal outputted from the control circuit 15, and its remaining configuration is the same as that of the first preferred embodiment. In this case, the control circuit 15 is provided with the function of a phase control unit.

In the automatic dispersion compensating system having such a configuration, for example, as shown in FIGS. 23 through 26, the decision process of a monitor signal in the DFF11 is performed by gradually changing a decision phase against a fixed decision threshold Vth, and chromatic dispersion caused in the transmission line 1 is determined on the result of the decision.

Figure 27:
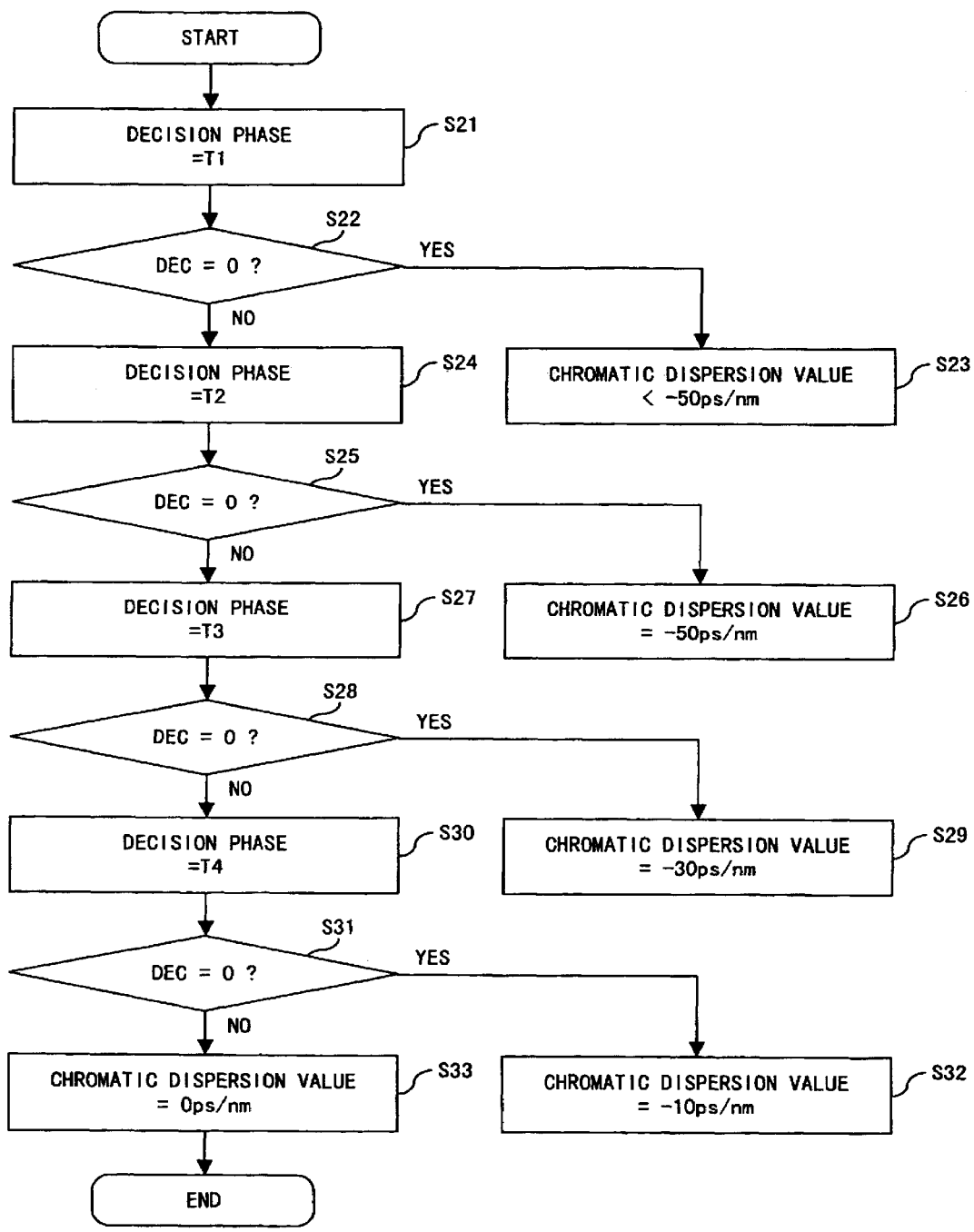
FIG. 27 is a flowchart showing an algorithm for monitoring chromatic dispersion in the fourth preferred embodiment.

FIG. 27 is a flowchart showing an algorithm for monitoring chromatic dispersion in the fourth preferred embodiment. Here, the detailed description is made assuming a case where chromatic dispersion of 0, −10, −30, −50 ps/nm or −50 ps/nm or less is detected by performing a decision process by changing a decision phase in four steps (T1 through T4).

Firstly, in step 21 of FIG. 27, a decision phase to be supplied to the DFF11 in synchronization with a clock signal delayed by the delay circuit is set as an initial value T1 (FIGS. 23 through 26). Then, in step 22, the level "1" of a monitor signal is compared with decision threshold Vth in the timing of decision phase T1, and it is determined whether the decision result is high (HIGH; DEC=1) or low (LOW; DEC=0). Specifically, since the decision result is high in each of the received waveforms shown in FIGS. 23 through 26, the process proceeds to step 24 and the amount of delay in the delay circuit 13 is modified so that the decision phase is set to T2 (<T1). If the decision result is low in the timing of decision phase T1, in step 23, a chromatic dispersion −50 ps/nm or less is detected.

Figure 23:
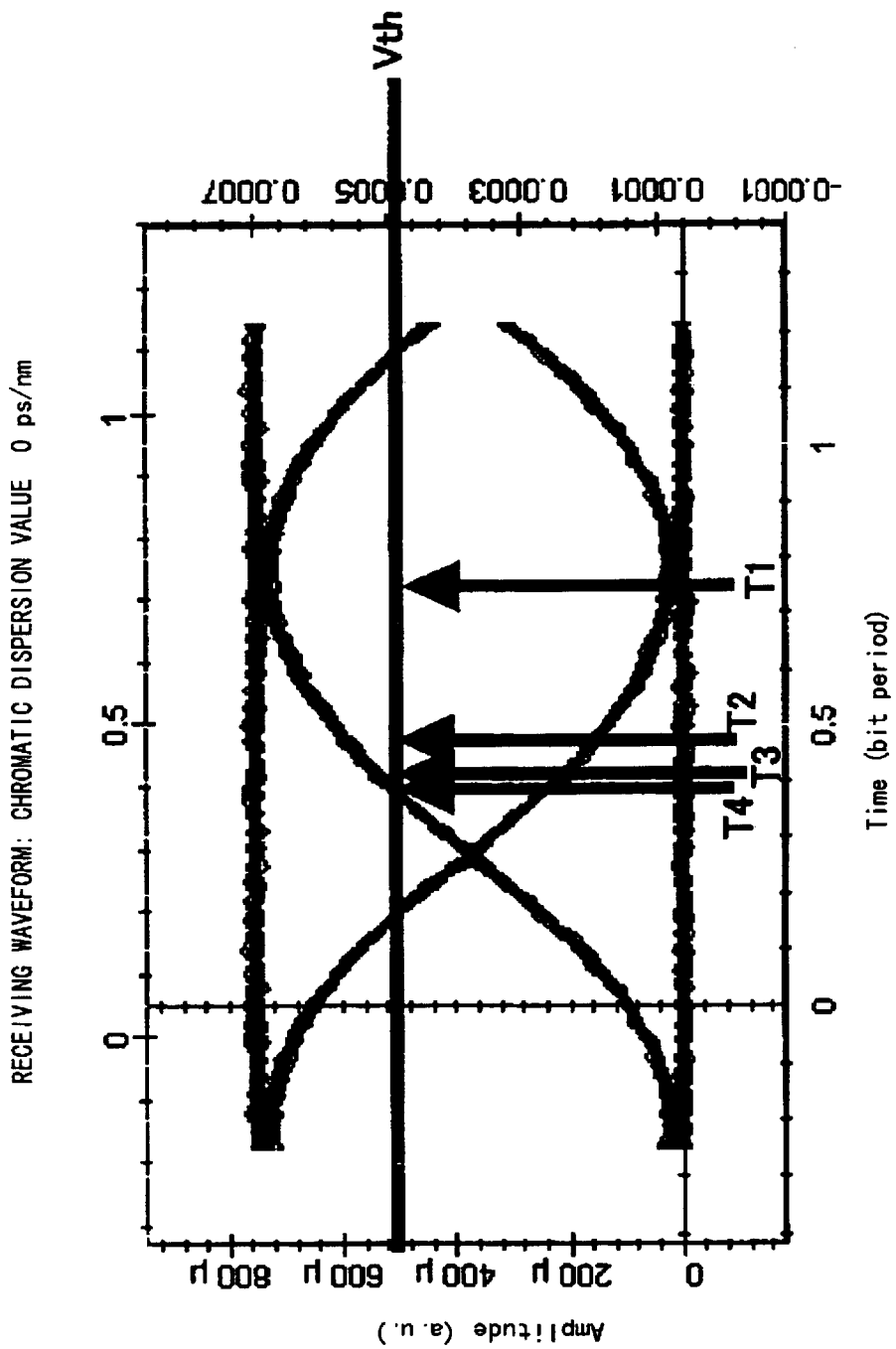
FIG. 23 shows a relationship between a decision threshold and a decision phase of the received waveform whose chromatic dispersion value is 0 ps/nm, that are set in a DFF in the fourth preferred embodiment.
Figure 24:
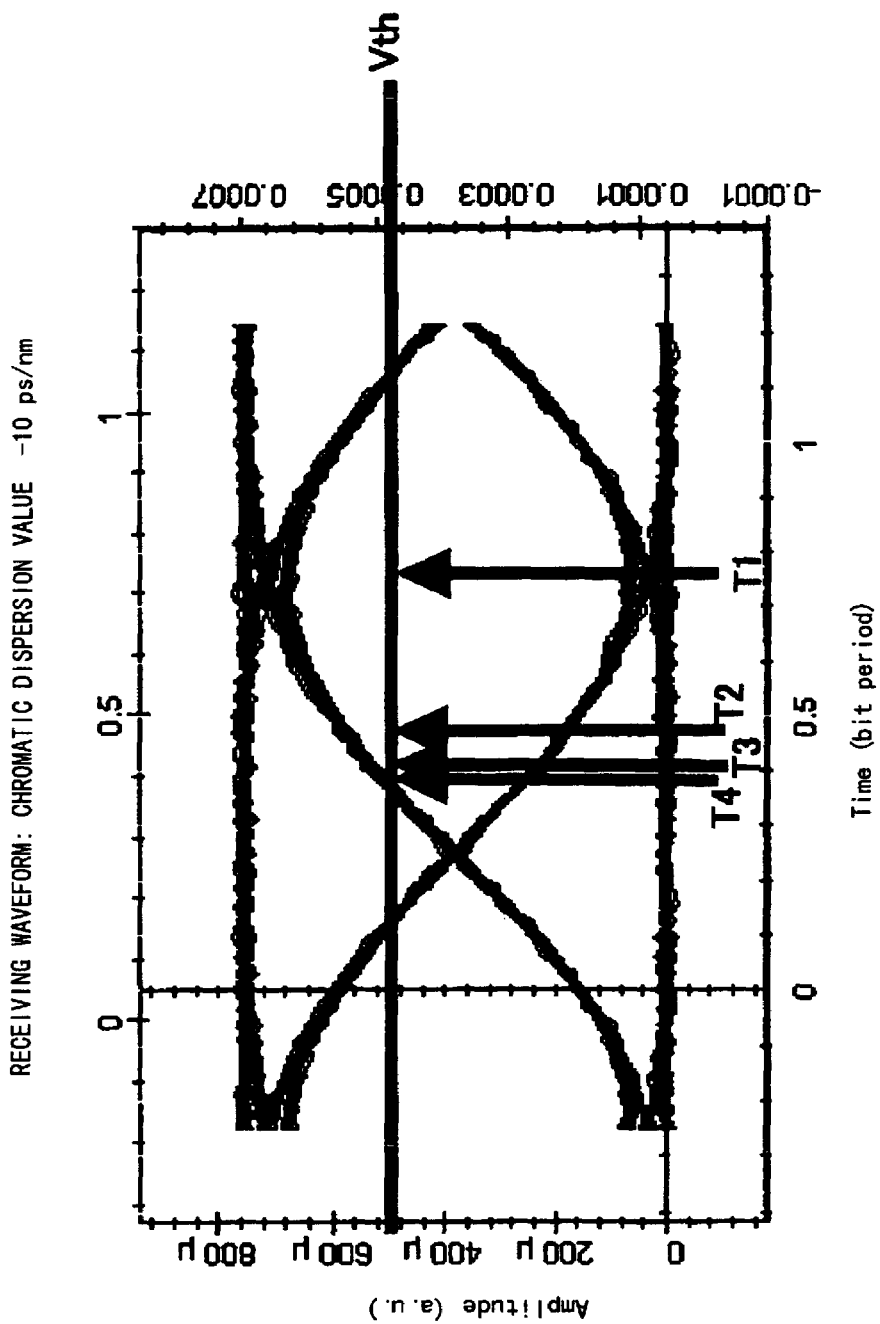
FIG. 24 shows a relationship between a decision threshold and a decision phase of the received waveform whose chromatic dispersion value is −10 ps/nm, that are set in a DFF in the fourth preferred embodiment.
Figure 25:
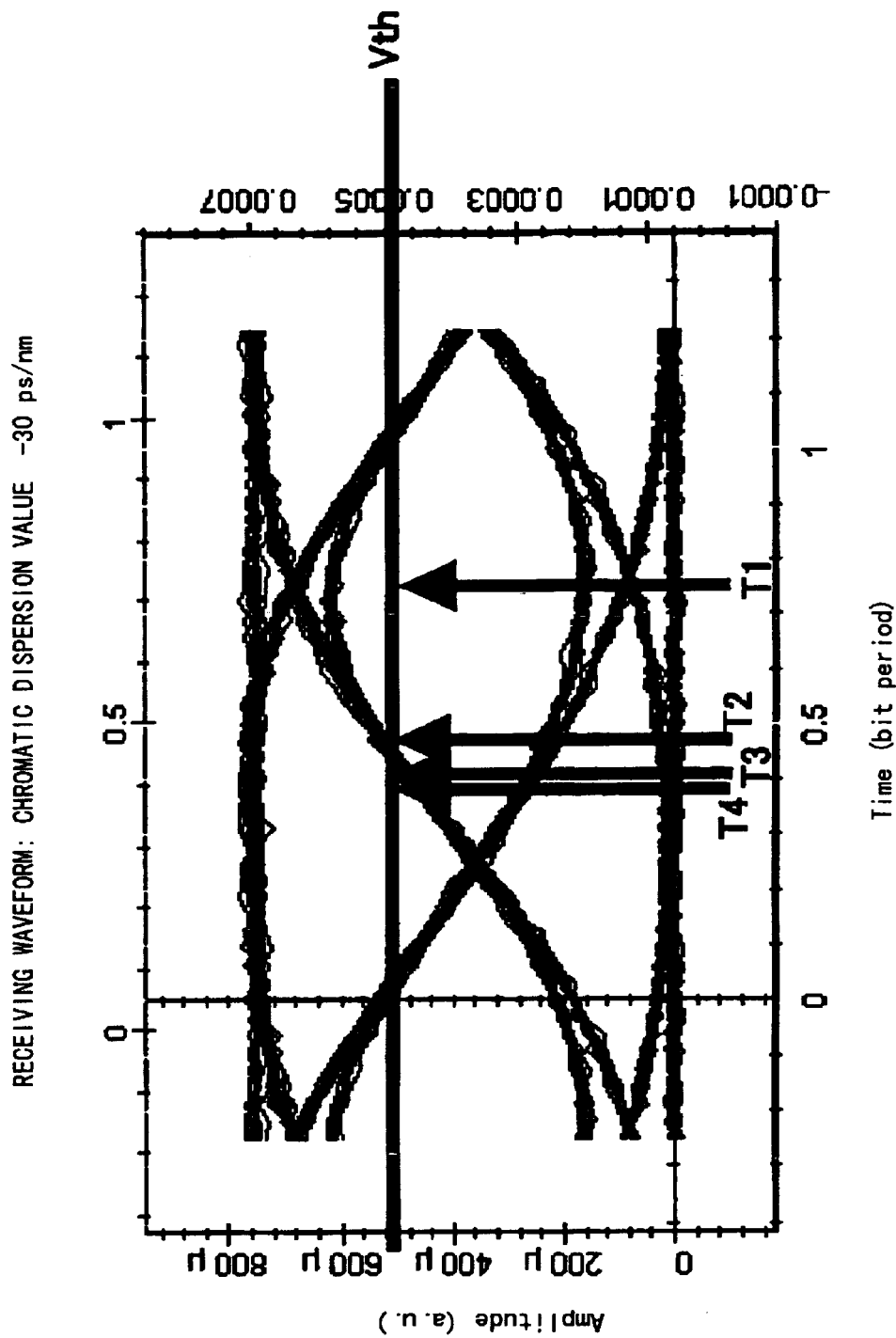
FIG. 25 shows a relationship between a decision threshold and a decision phase of the received waveform whose chromatic dispersion value is −30 ps/nm, that are set in a DFF in the fourth preferred embodiment.
Figure 26:
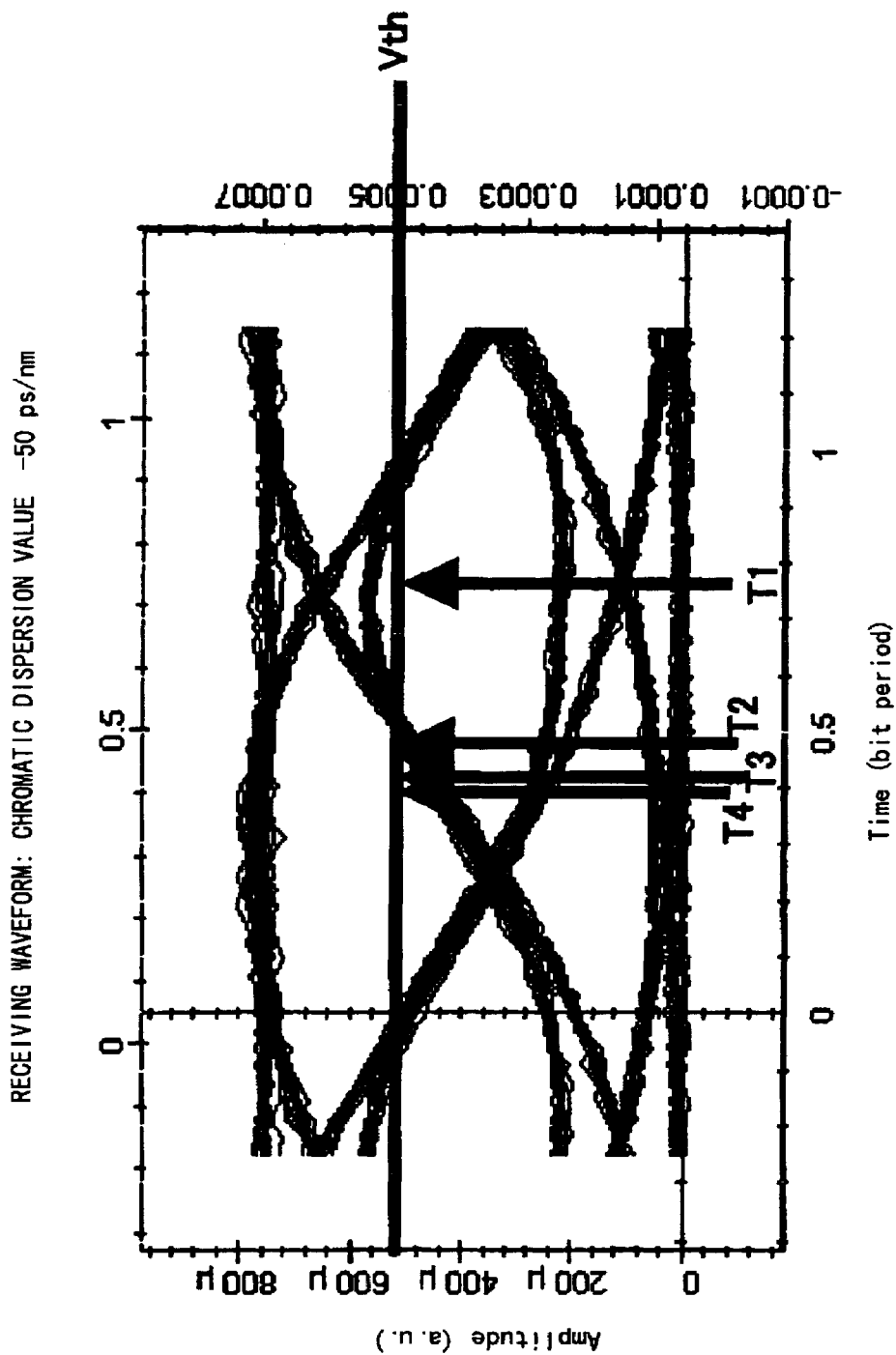
FIG. 26 shows a relationship between a decision threshold and a decision phase of the received waveform whose chromatic dispersion value is −50 ps/nm, that are set in a DFF in the fourth preferred embodiment.

Then, in step 25, as in step 22, the decision result of the monitor signal is determined in the timing of decision phase T2. In this case, if the decision result is low, as shown in FIG. 26, the process proceeds to step 26 and chromatic dispersion −50 ps/nm is detected. However, if the decision result is high, as shown in FIGS. 23 through 25, the process proceeds to step 27 and the amount of delay in the delay circuit 13 is modified so that the decision phase is set to T3 (<T2).

Furthermore, in step 28, the decision result of the monitor signal is determined in the timing of decision phase T3. If the decision result is low (FIG. 25), in step 29, chromatic dispersion −30 ps/nm is detected. If the decision result is high (FIGS. 23 and 24), in step 30, the amount of delay in the delay circuit 13 is modified so that the decision phase is set to T4 (<T3). Lastly, in step 31, the decision result of the monitor signal is determined in the timing of a decision phase T4. If the decision result is low (FIG. 24), in step 32, chromatic dispersion −10 ps/nm is detected. If the decision result is high (FIG. 23), in step 33, chromatic dispersion 0 ps/nm is detected.

The above-mentioned respective relationships between a chromatic dispersion value, a decision threshold and its decision result in an algorithm are collectively expressed by the following Table 2.

TABLE 2

| | | decision phase | | | |
|---|---|---|---|---|---|
| | | T1 | T2 | T3 | T4 |
| wavelength dispersion value (ps/nm) | 0 | HIGH | HIGH | HIGH | HIGH |
| | −10 | HIGH | HIGH | HIGH | LOW |
| | −30 | HIGH | HIGH | LOW | LOW |
| | −50 | HIGH | LOW | LOW | LOW |

As described above, according to the automatic dispersion compensating system in the fourth preferred embodiment, a change in chromatic dispersion can also be detected with higher accuracy by changing a decision phase set in the DFF11 in multiple-steps according to the decision result of a monitor signal. Thus, the configuration of a monitor system can be simplified and the automatic compensation of chromatic dispersion can be surely executed.

Although in the above-mentioned fourth preferred embodiment, chromatic dispersion is detecting by changing a decision phase in four steps, a decision phase to be supplied to the DFF11 can be set in an arbitrary number of steps according to the required detection accuracy of chromatic dispersion. In the above-described case, where when a waveform is expanded, the increase of negative chromatic dispersion is detected by gradually changing the decision phase. However, when the waveform is compressed, a change in chromatic dispersion can also be detected with high accuracy by appropriately controlling the setting of the decision phase.

Figure 28:
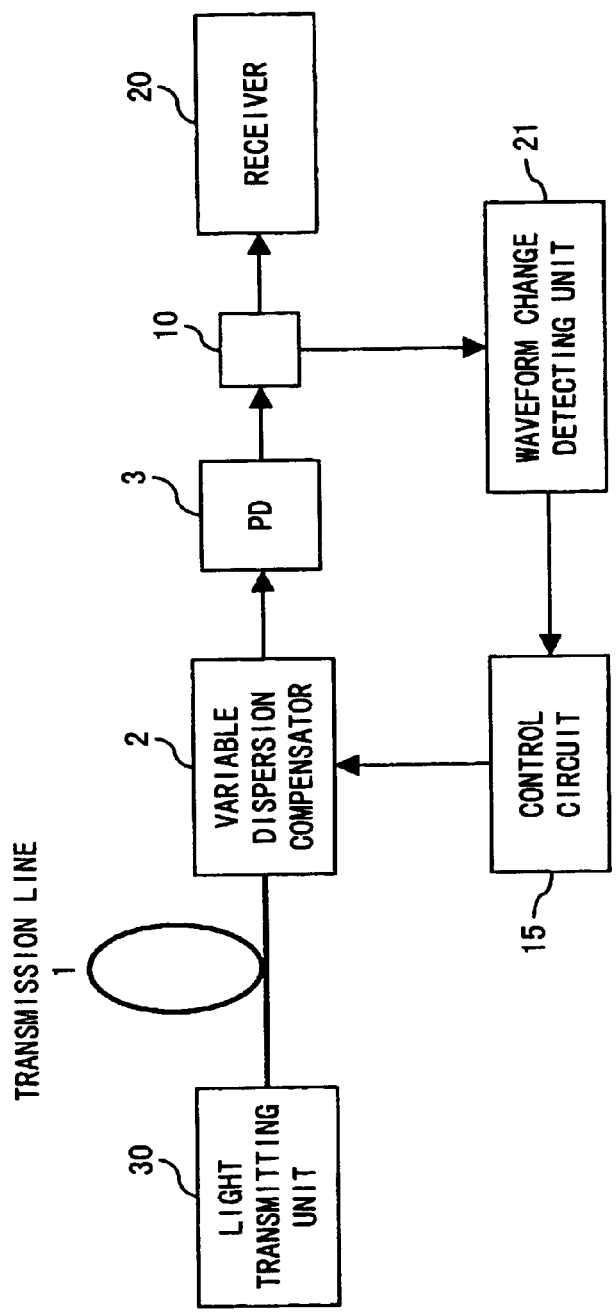
FIG. 28 shows the basic configuration of an entire optical communication system in the first through fourth preferred embodiments.

Although in the above-mentioned first through fourth preferred embodiments, as shown in the basic system configuration of FIG. 28, chromatic dispersion caused in optical signal transmitted from a light transmitting unit 30 through the transmission line 1 is automatically compensated at the receiving end, the configuration of the automatic dispersion compensating system of the present invention is not limited to this. The waveform change detection unit 21 shown in FIG. 28 is a functional block including the DFF11, decision threshold setting circuit 12, delay circuit 13 and integration circuit 14 that have been described in the above-mentioned first through fourth preferred embodiments, and the receiver 20 is a functional block including the equalizing amplifier 4, demultiplexer 5, decision circuit 6 and clock recovery circuit 7 that have been described in the above-mentioned first through fourth preferred embodiments.

Figure 29:
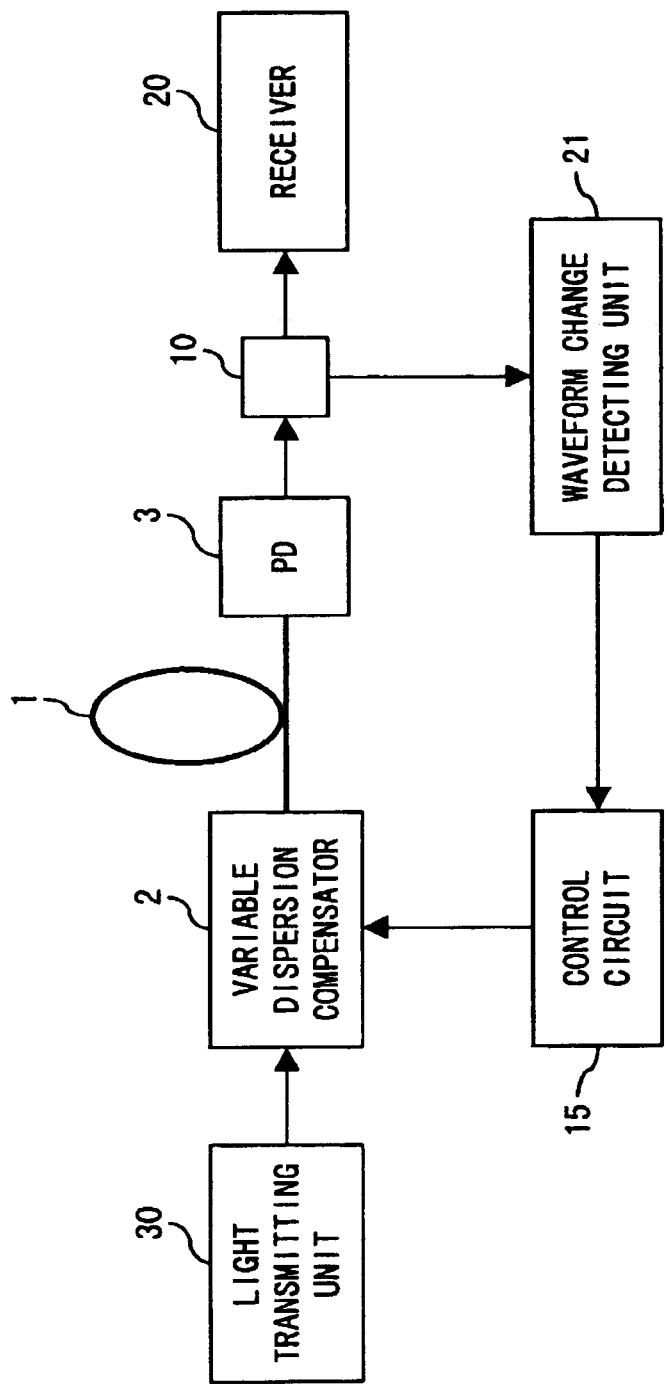
FIG. 29 shows a configuration for executing automatic dispersion compensation at a transmitting end in connection with FIG. 28.
Figure 30:
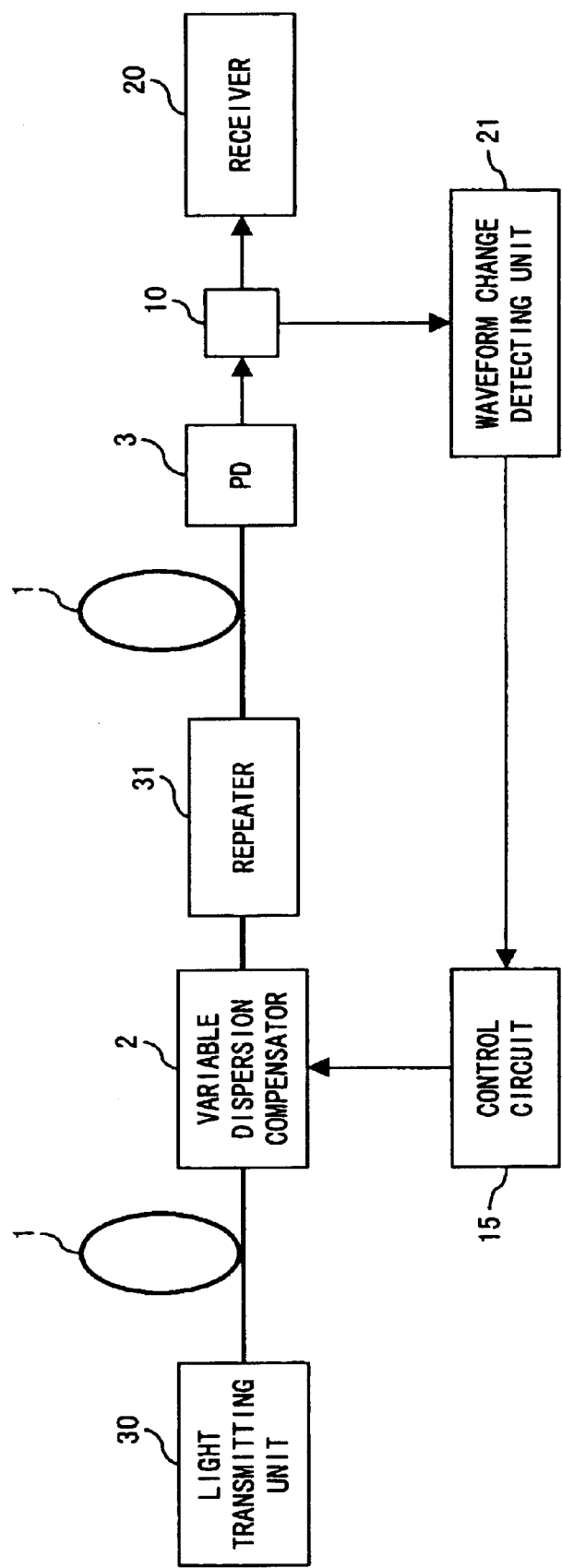
FIG. 30 shows a configuration for executing automatic dispersion compensation in a repeater span in connection with FIG. 28.

Specifically, in another configuration related to the automatic dispersion compensating system in the first through fourth preferred embodiments, for example, as shown in FIG. 29, chromatic dispersion can also be automatically compensated at the transmitting end of the transmission line 1 by disposing a variable dispersion compensator 2 between the light transmitting unit 30 and the transmitting end and feedback-controlling the variable dispersion compensator 2, based on chromatic dispersion monitored at the receiving end. For example, as shown in FIG. 30, if optical signal is relayed and transmitted through the transmission line 1 with a repeater 31, chromatic dispersion in repeater spans can also be automatically compensated by providing a variable dispersion compensator 2 in the middle of the repeater span and feedback-controlling the variable dispersion compensator 2, based on chromatic dispersion monitored at the receiving end.

Figure 31:
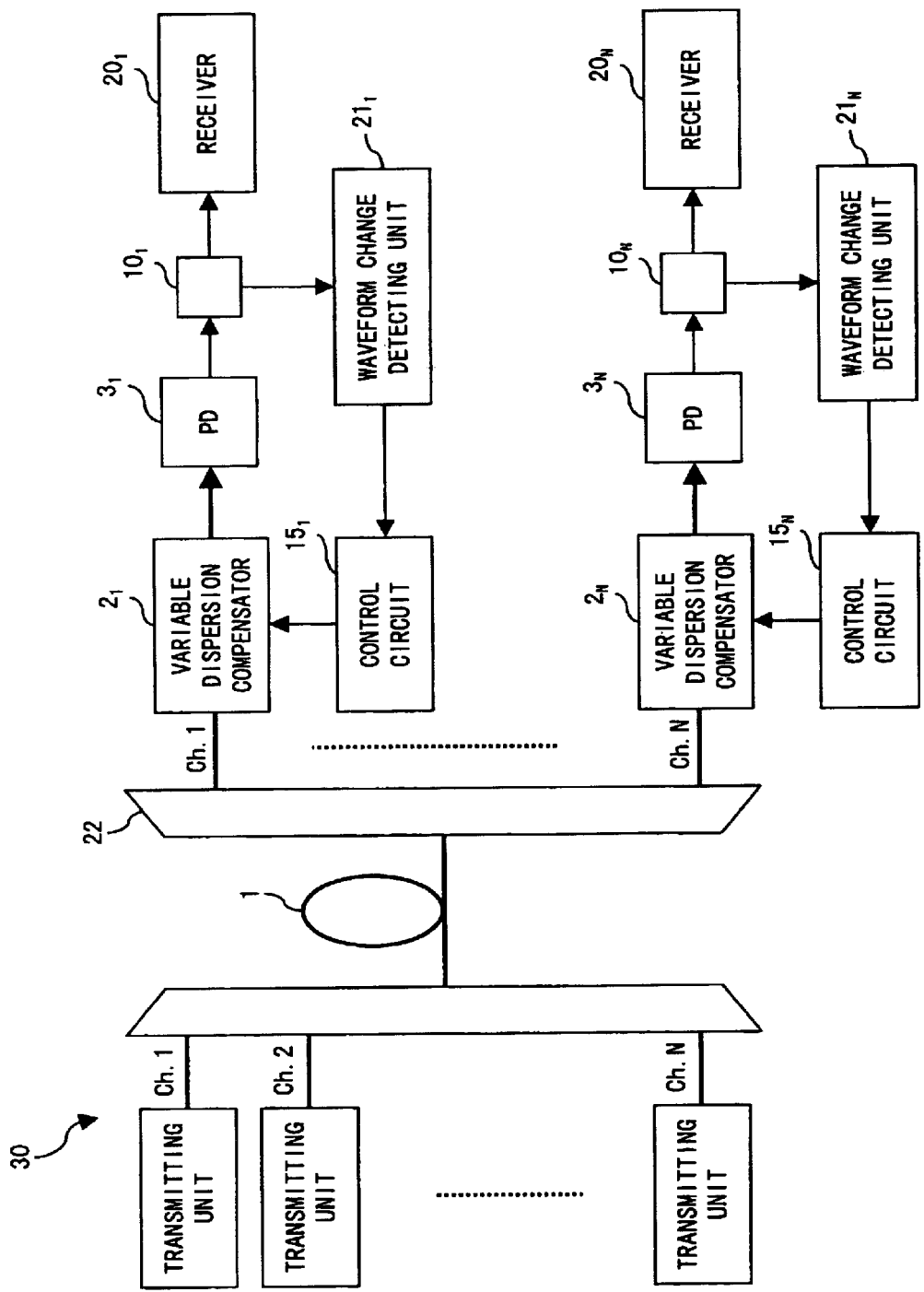
FIG. 31 shows a configuration obtained when the fourth preferred embodiment of the automatic dispersion compensating system is applied to a WDM optical communication system in connection with FIG. 28.
Figure 32:
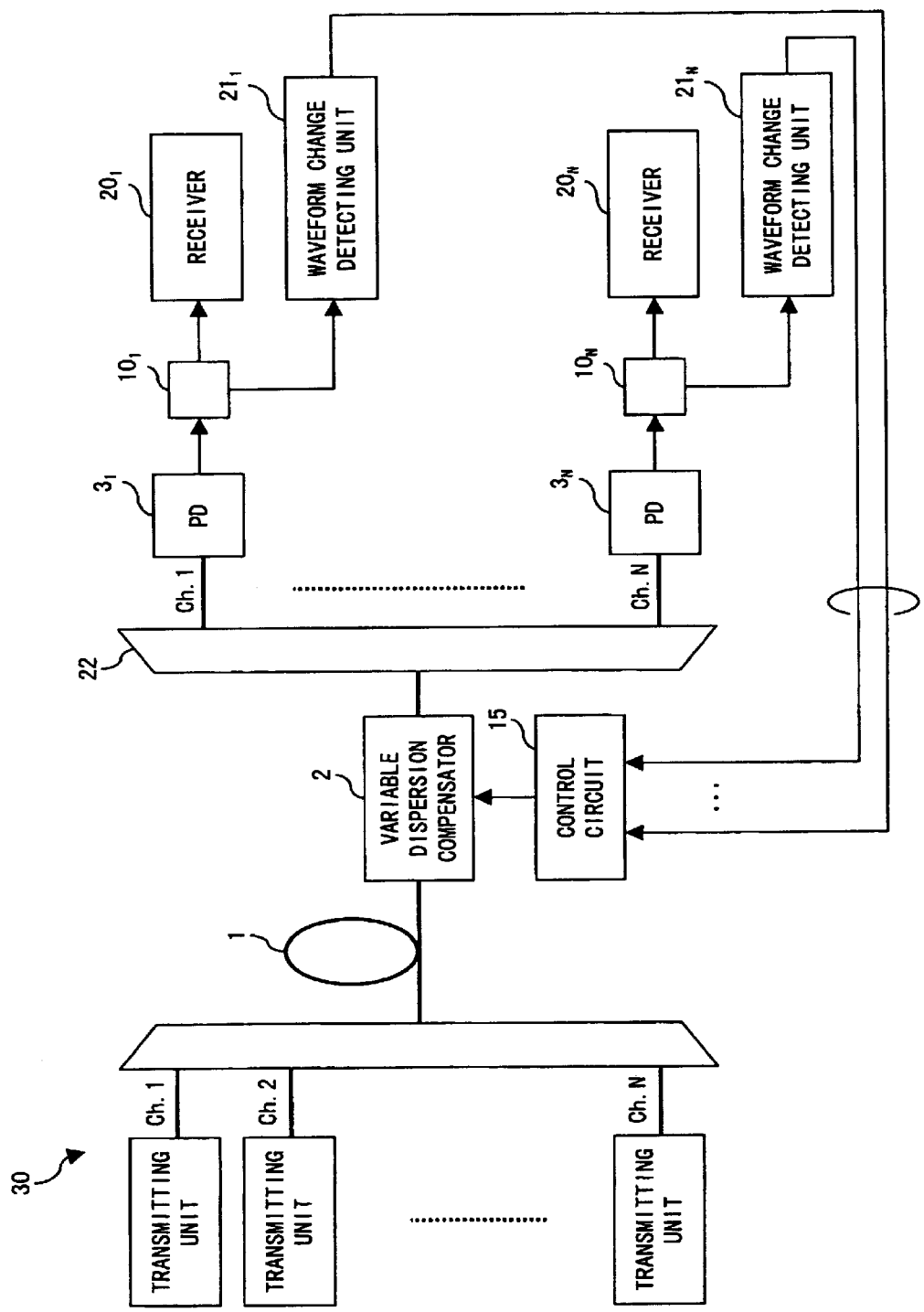
FIG. 32 shows other configurations related to FIG. 31.

Furthermore, as shown in FIG. 31, for example, if in the case of a WDM optical communication system wavelength-division multiplexing and transmitting a plurality of waves of channel light each with a different wavelength (in FIG. 31, N waves of channel light), chromatic dispersion can also be automatically compensated for each wave of channel light by disposing variable dispersion compensators $2_1$-$2_N$, waveform change detection units $21_1$-$21_N$ and control circuits $15_1$-$15_N$ in correspondence with a plurality of waves of channel light Ch.1-Ch.N demultiplexed for each wavelength by the demultiplexer 22 of the optical receiver unit. For example, as shown in FIG. 32, a plurality of segments of chromatic dispersion corresponding to a plurality of wavelengths can also be automatically compensated by disposing a variable dispersion compensator 2 before the demultiplexer 22 of the optical receiver unit.

Next, the fifth preferred embodiment of the automatic dispersion compensating system of the present invention is described. As to the fifth preferred embodiment, an application in which the feedback control of a variable dispersion compensator can be surely performed even if chromatic dispersion caused in the entire system is unknown at the time of system activation, etc., is described.

Figure 33:
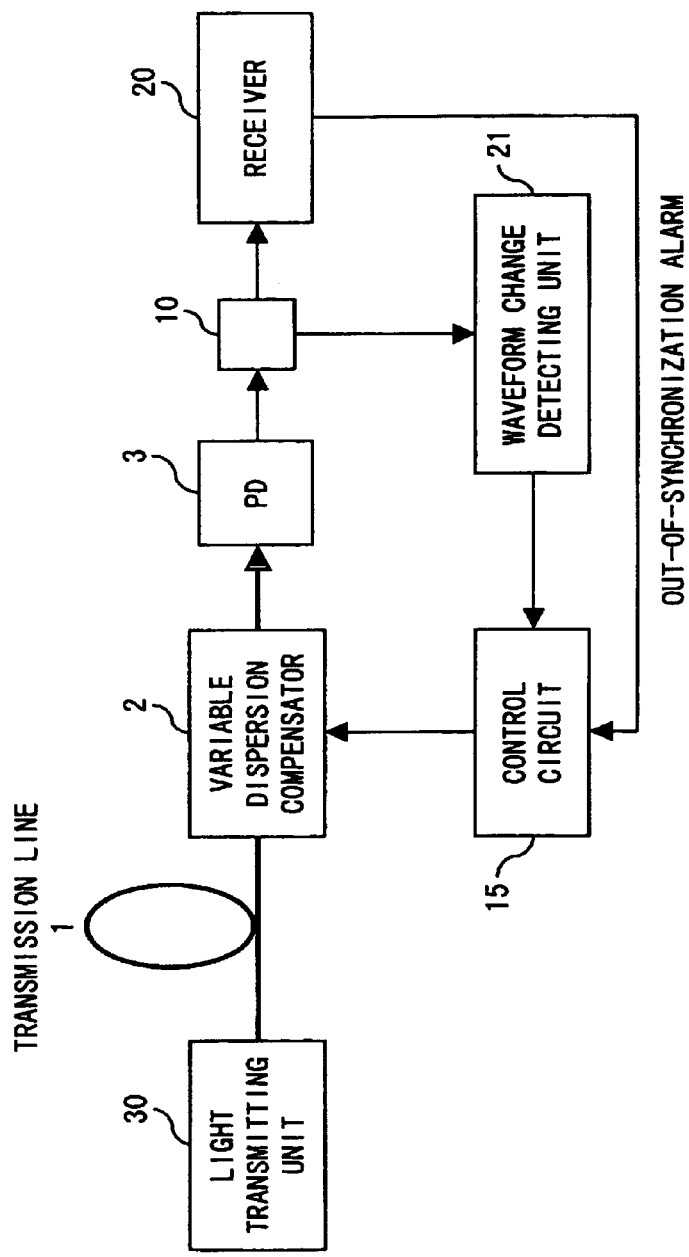
FIG. 33 shows the configuration of the fifth preferred embodiment of the automatic dispersion compensating system of the present invention.

FIG. 33 shows the configuration of the automatic dispersion compensating system in the fifth preferred embodiment.

Figure 34:
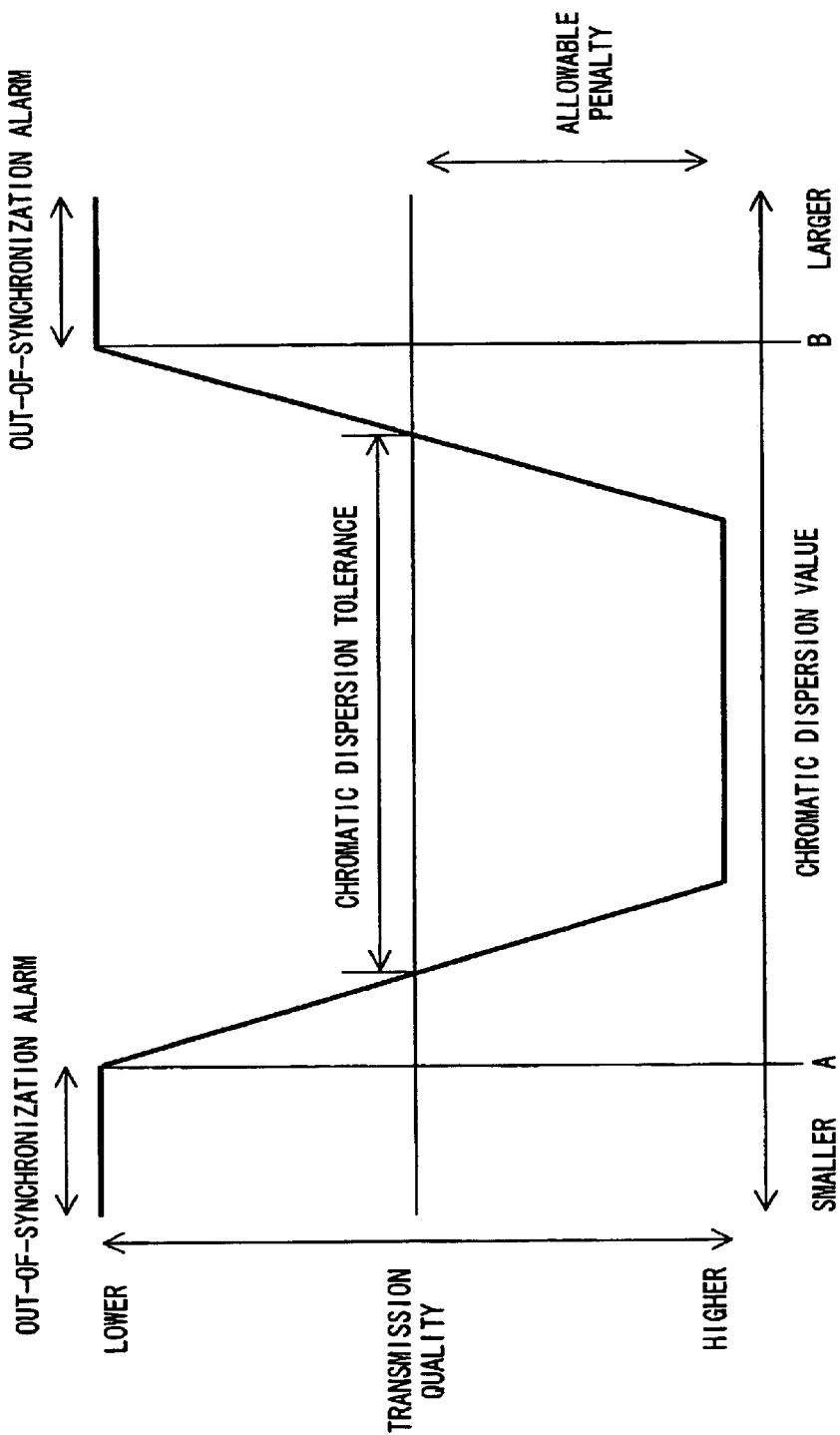
FIG. 34 shows the initial setting operation of a variable dispersion compensator in the fifth preferred embodiment.

The system configuration shown in FIG. 33 is, for example, characterized in that the initial setting operation of the variable dispersion compensator 2 is executed using an out-of-synchronization alarm outputted from a receiver 20. Specifically, if the receiver 20 enters an out-of-synchronization state when performing the data decision process of a main signal, an out-of-synchronization alarm is supplied to the control circuit 15. The control circuit 15 sweeps the amount of dispersion compensation of the variable dispersion compensator 2 across a part of its changeable range or its entire changeable range at the time of system activation, etc., and sets the initial value of the amount of dispersion compensation in a range where synchronization can be established at least at the time of feedback control (in a tracking mode). Specifically, for example, as shown in FIG. 34, if it is detected that there is no out-of-synchronization alarm in a range between A and B of the amount of dispersion compensation, the middle point of the range is computed and it is designated as the initial setting value of the amount of dispersion compensation.

Figure 35:
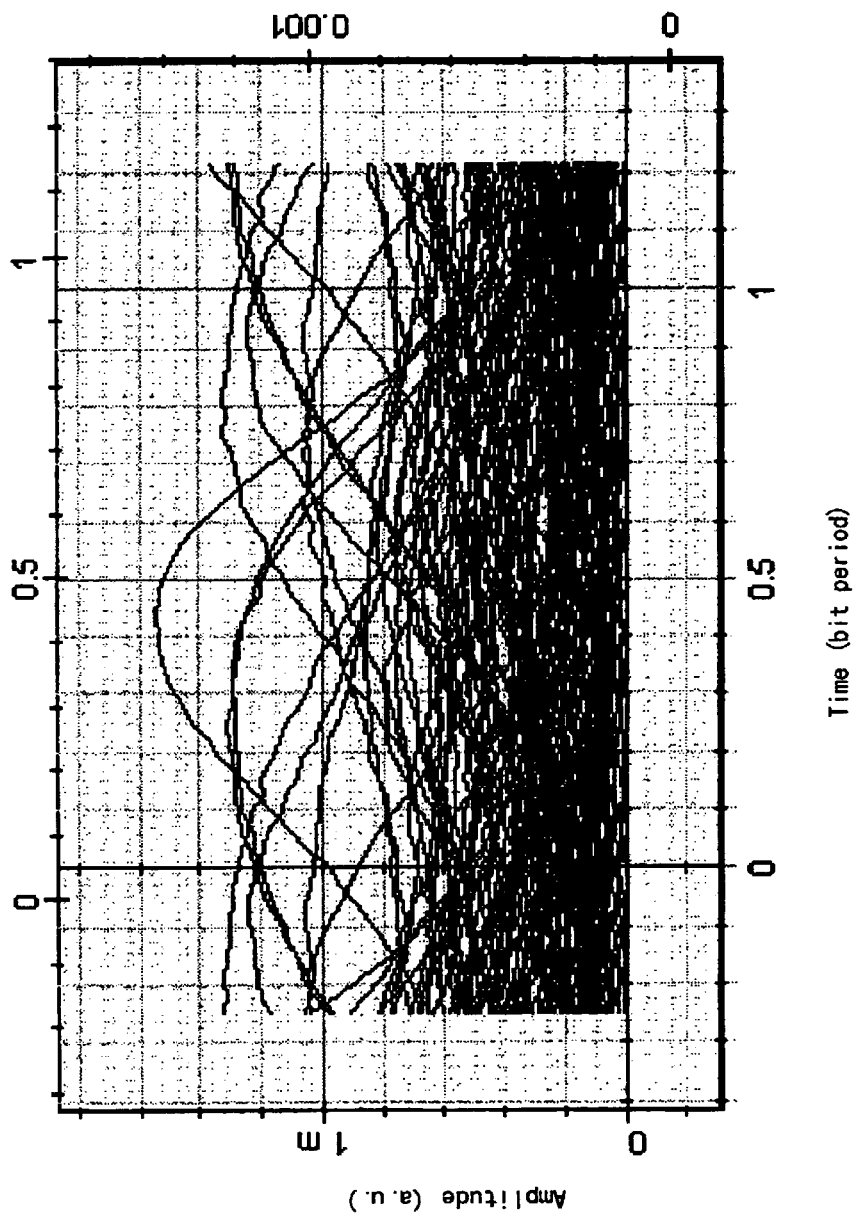
FIG. 35 shows the simulation result of a received waveform whose chromatic dispersion value is 1,700 ps/nm.

By executing the initial setting operation of the variable dispersion compensator 2 using an out-of-synchronization alarm thus, the amount of dispersion compensation of the variable dispersion compensator 2 can be automatically initially set within a synchronization-possible range even if so large deviation of chromatic dispersion from dispersion tolerance is caused at the time of system activation, etc., the distortion of a received waveform remarkably increases (for example, see the simulation result of a received waveform obtained when the chromatic dispersion shown in FIG. 35 is +1,700 ps/nm) and the synchronization between a received signal and a clock signal cannot be established. Thus, chromatic dispersion can be surely monitored using a DFF11 that presumes the establishment of the synchronization between a received signal and a clock signal, thus automatically and stably compensating for chromatic dispersion caused in the transmission line 1.

Although in the above-mentioned fifth preferred embodiment, the initial setting operation of the variable dispersion compensator 2 is executed using an out-of-synchronization alarm outputted from the receiver 20, for example, the amount of dispersion compensation of the variable dispersion compensator 2 can also be set within a synchronization-possible range using, for example, transmission quality information, such as an error rate, a Q factor, a byte B1 (in the case of SONET/SDH signal) and the like, instead of the out-of-synchronization alarm.

Although in the above-mentioned first through fifth preferred embodiments, a change in chromatic dispersion caused in the transmission line 1 is detected using the monitoring technology of the present invention, a change in polarization mode dispersion (PMD) can be similarly monitored. In this case, polarization mode dispersion caused in a transmission line can be automatically and dynamically compensated by feedback-controlling the amount of compensation in publicly known polarization mode dispersion, based on the monitored amount of polarization mode dispersion compensation. The present invention is also effective as a dispersion monitor in a system in which both chromatic dispersion and polarization mode dispersion are automatically and simultaneously compensated.

As described above, according to the dispersion monitoring device and method of the present invention, by detecting the change in a level of a received waveform by the combination of a data flip-flop and an integration circuit and monitoring a change in dispersion caused in an optical communication system, the dispersion characteristic of a system can be detected with high accuracy by a simple configuration using a circuit with lower speed than the transfer rate of optical signal. According to the automatic dispersion compensating system adopting such a dispersion monitoring technology of the present invention, the amount of dispersion compensation of a variable dispersion compensator can be feedback-controlled based on a monitored change in dispersion. Therefore, dispersion caused in optical signal that is transmitted through a transmission line can be automatically and surely compensated.

FIG. 36 shows the basic configuration of a chromatic dispersion compensation controlling system according to the preferred embodiment of the present invention.

An optical signal transmitted from a transmitter 10 is transmitted through a transmission line 11 and is inputted to a variable dispersion compensator 13. The variable dispersion compensator 13 compensates for the dispersion of the optical signal, and an optical/electric converter 14 converts the optical signal into an electric signal. The converted electric signal is inputted to both a chromatic dispersion change sign monitor 21 and a receiver 15. After the receiver 15 receives the signal, a chromatic dispersion change amount monitor 20 detects the amount of change in chromatic dispersion. To a control unit 16, a sign indicating the direction of change in chromatic dispersion is inputted from the chromatic dispersion change sign monitor 21, and also the amount of the change in chromatic dispersion is inputted from chromatic dispersion change amount monitor 20. The control unit 16 controls a variable dispersion compensator 13, based on these segments of data to compute an optical amount of chromatic dispersion compensation.

In this preferred embodiment of the present invention, a fixed dispersion compensator, whose amount of dispersion compensation is fixed, can be used together with a variable dispersion compensator, if necessary. An optical amplifier can be also disposed at the transmitting end of the transmission line or before the variable dispersion compensator, if necessary.

In this preferred embodiment of the present invention, by combining a chromatic dispersion change a mount monitor monitoring the absolute value of the amount of a change in chromatic dispersion by a change in transmission line quality, such as an error rate, etc., with a chromatic dispersion change sign monitor, both the increase/decrease and amount of transmission line chromatic dispersion can be detected when there is a change in chromatic dispersion. Thus, the high-speed control of a variable chromatic dispersion compensator can be realized.

Figure 37:
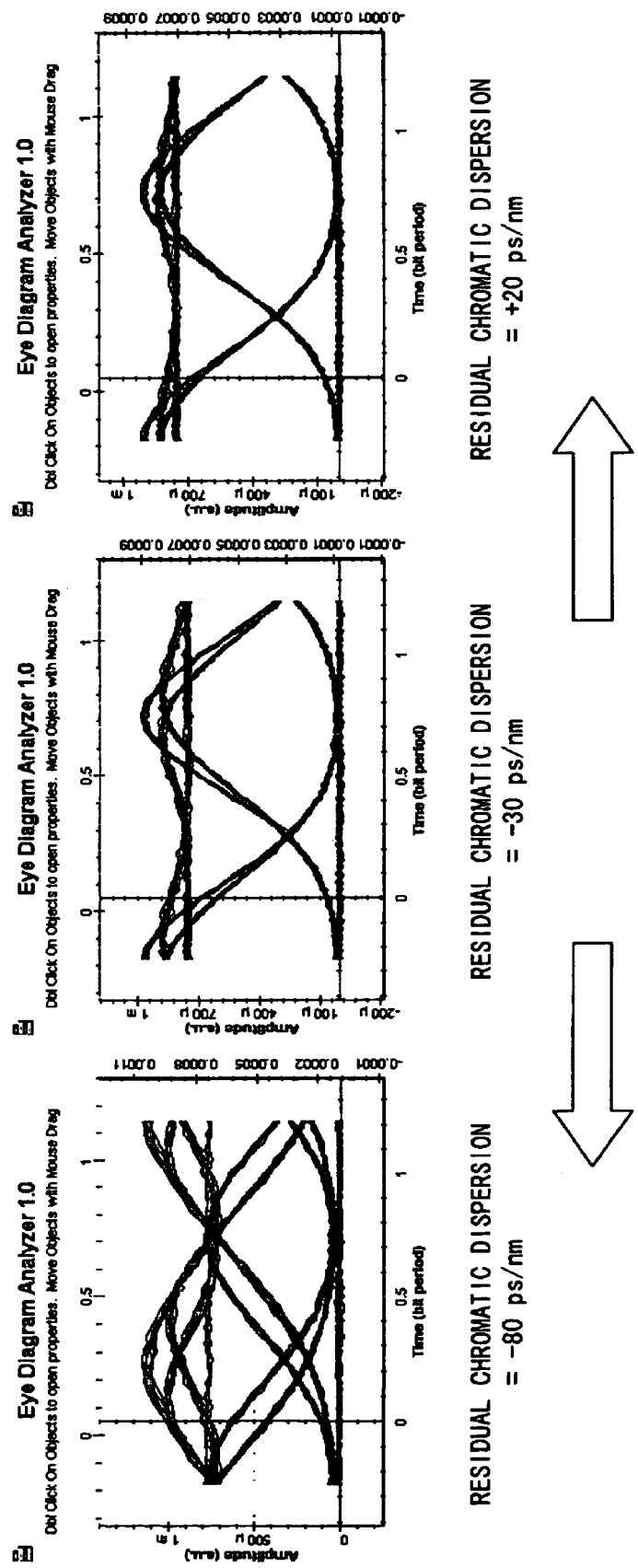
FIG. 37 shows the basic principle of a chromatic dispersion change sign monitor according to the preferred embodiment of the present invention.

FIG. 37 shows the basic principle of a chromatic dispersion change sign monitor according to the preferred embodiment of the present invention.

FIG. 37 is an eye diagram showing a change in a waveform caused when residual chromatic dispersion changes. In FIG. 37, all the signal levels of arrow-marked parts are the same. FIG. 37 shows the simulation result of a received waveform, obtained when residual dispersion changes by ±50 ps/nm in a 40 Gb/s NRZ modulation system with $\alpha=1$ (chirping parameter $\alpha$ is positive). As shown in FIG. 37, if residual dispersion decreases and waveform compression progresses overshoot beyond a peculiar high level increases. If a waveform is broadened, conversely the overshoot decreases. Therefore, by detecting this change, that is, the peak value of a waveform, the increase/decrease of chromatic dispersion can be detected. In other words, if a chirping parameter is set positive, by viewing the peak value of a waveform, the increase/decrease of residual chromatic dispersion can be known.

Figure 38:
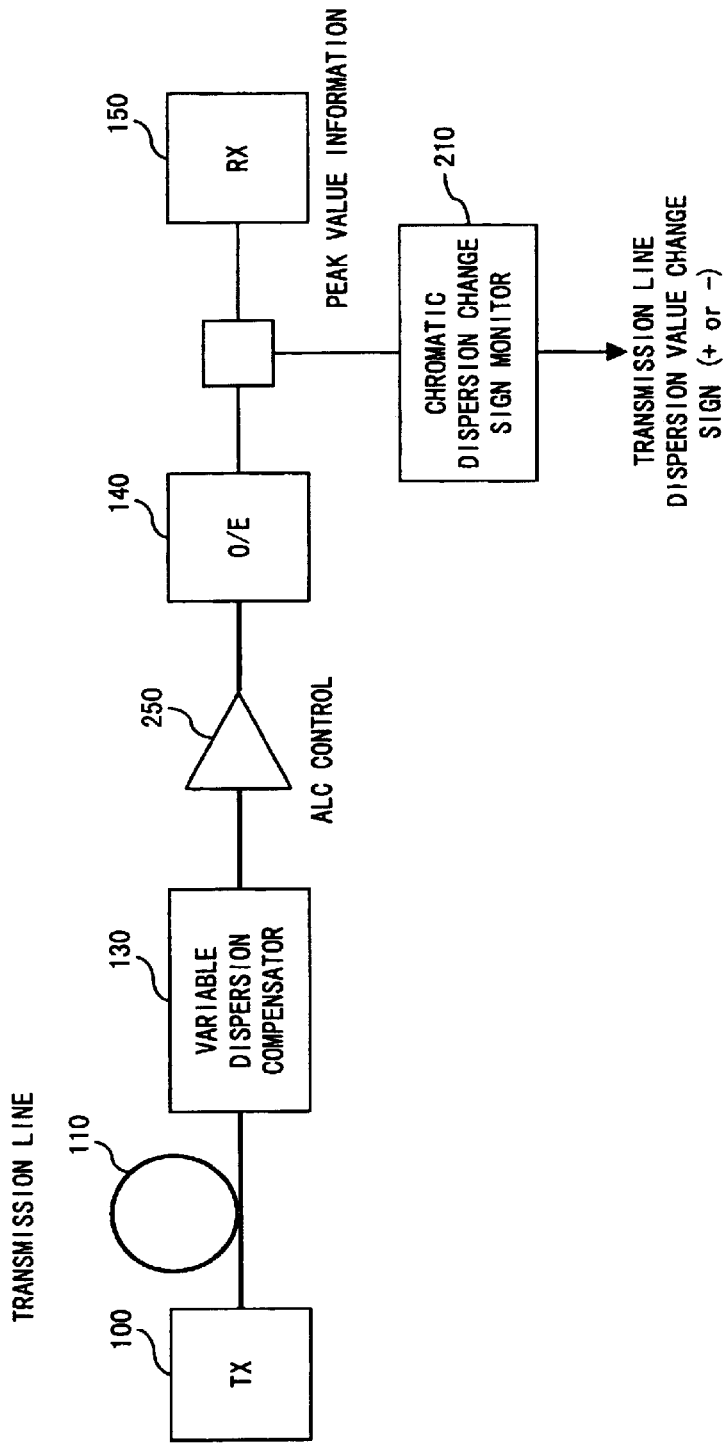
FIG. 38 shows the basic configuration of the major part of the preferred embodiment of the present invention.

FIG. 38 shows the basic configuration of the major part of this preferred embodiment of the present invention. FIG. 39 shows the configuration of its receiving unit.

The simulation shown in FIG. 37 performs constant output power control (ALC control) by disposing an optical amplifier 25 before a PD (optical/electric converter 14), as shown in FIG. 38. As a result, high/low levels are stabilized, and in the simulation of FIG. 37, high level is almost 760μ (a.u.) and low level is almost 0 (a.u.), in all residual chromatic dispersion. The peak voltage is as follows:

In case the amount of chromatic dispersion is −80 ps/nm: 1,150μ (a.u.)

In case the amount of chromatic dispersion is −30 ps/nm: 980μ (a.u.)

In case the amount of chromatic dispersion is +20 ps/nm: 900μ (a.u.)

If the amount of residual chromatic dispersion=−30 ps/nm is used as a reference, the increase of the amount of residual chromatic dispersion can be detected by the increase of the peak voltage, and conversely, the increase of the residual chromatic dispersion can be detected by the decrease of the peak voltage.

In the configuration of the receiving unit shown in FIG. 39, after being converted into an electric signal by the PD 140 and being amplified by a pre-amplifier 250, the output of the variable dispersion compensator 130 is inputted to both a peak detection circuit 280 and an equalizer 260. The output of the equalizer 260 is inputted to a clock/data restoration unit restoring a clock and data, and data restoration is applied to the output. Then, the output proceeds to a subsequent signal process. The peak detection circuit 280 detects the peak of the signal and notifies the control circuit 160 of the peak value, based on the height of the peak. The control circuit 160 determines whether residual dispersion increases or decreases, based on the peak value, and optimizes the amount of compensation by controlling the variable dispersion compensator 130.

Figure 40:
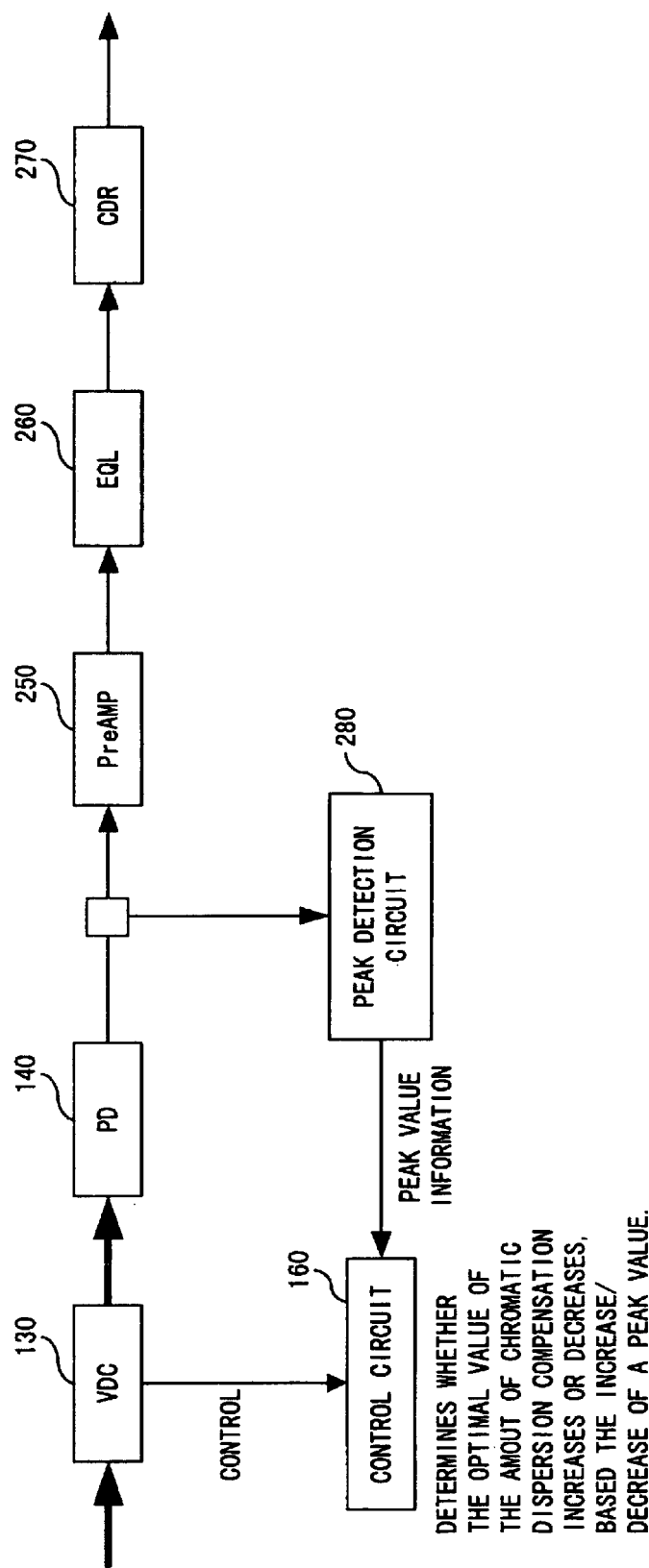
FIG. 40 shows another configuration of a receiving unit according to the preferred embodiment of the present invention.

FIG. 40 shows another configuration of the receiving unit according to this preferred embodiment of the present invention.

FIG. 40 shows a configuration in which the peak detection circuit 280 is connected to the output of the pre-amplifier 250. Since the waveform of a received signal can also be computed thus, a peak can be detected. Therefore, the increase/decrease of residual dispersion can be notified to a control circuit.

Figure 41:
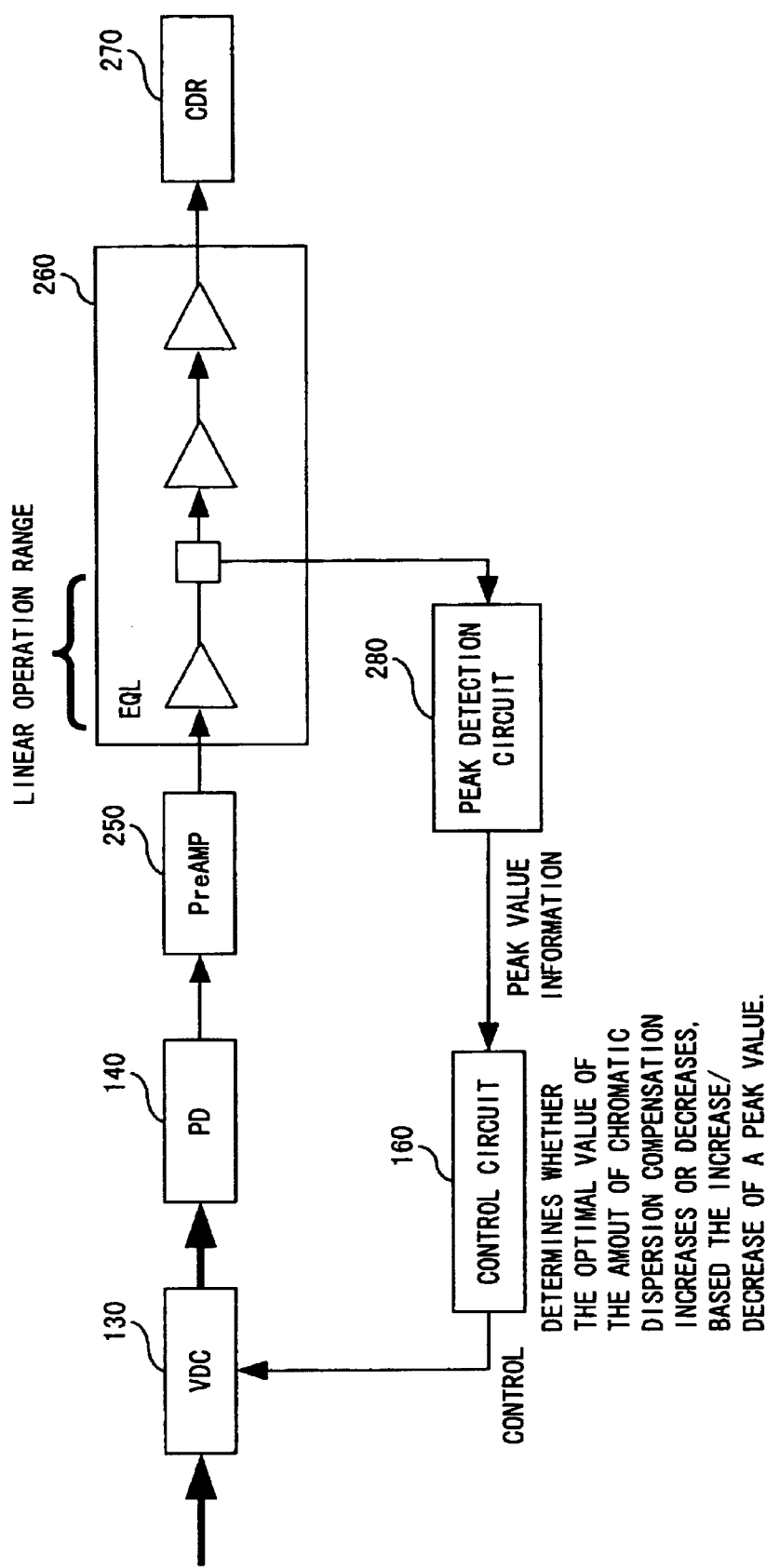
FIG. 41 shows another configuration of a receiving unit according to the preferred embodiment of the present invention.

FIG. 41 shows another configuration of a receiving unit according to this preferred embodiment of the present invention.

As shown in FIG. 41, since in an equalizer, a signal is amplified, a limiter voltage restricts its upper/lower limits. If there remains sufficient received waveform information in a linear operation range before this restriction, the peak detection circuit can be located in any place of the receiving unit.

Figure 42:
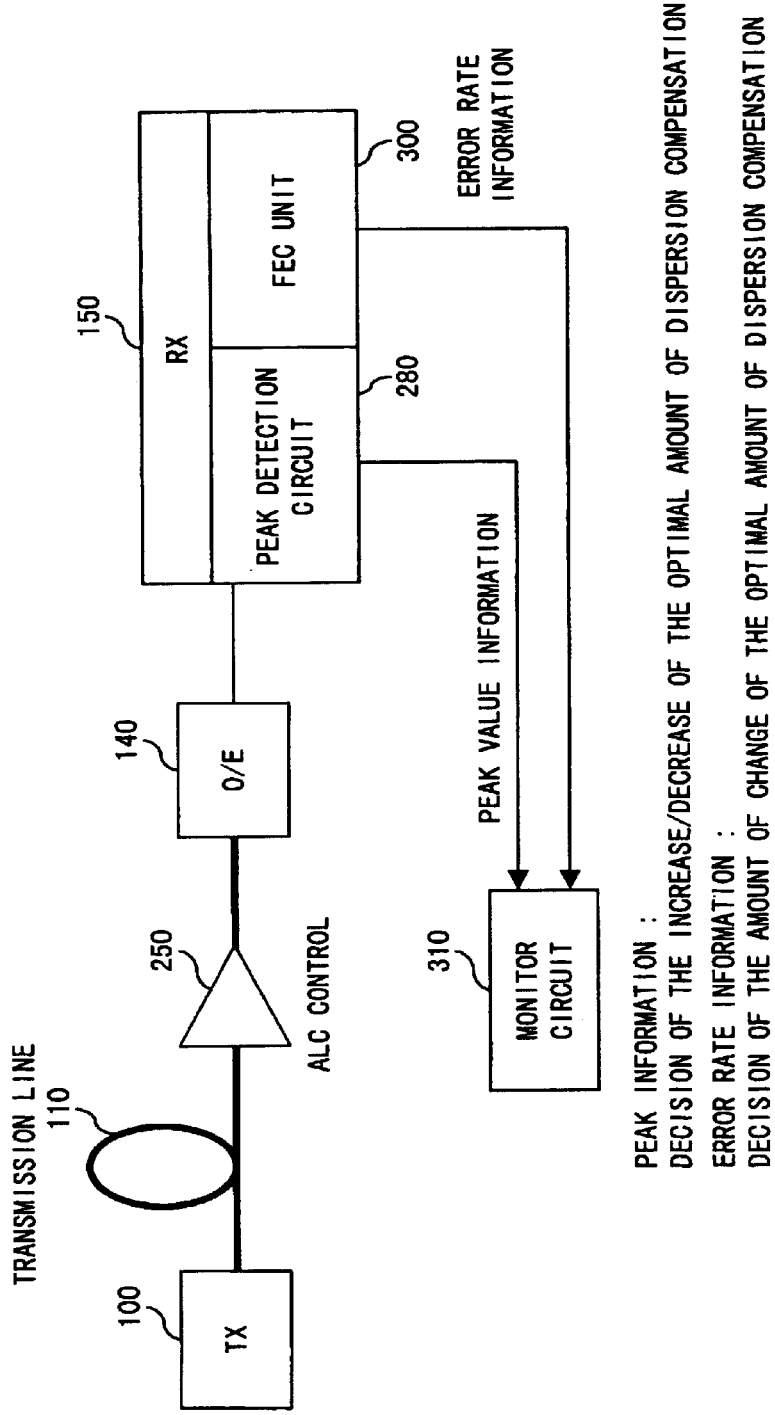
FIG. 42 shows another configuration of the chromatic dispersion monitor according to the preferred embodiment of the present invention.
Figure 43:
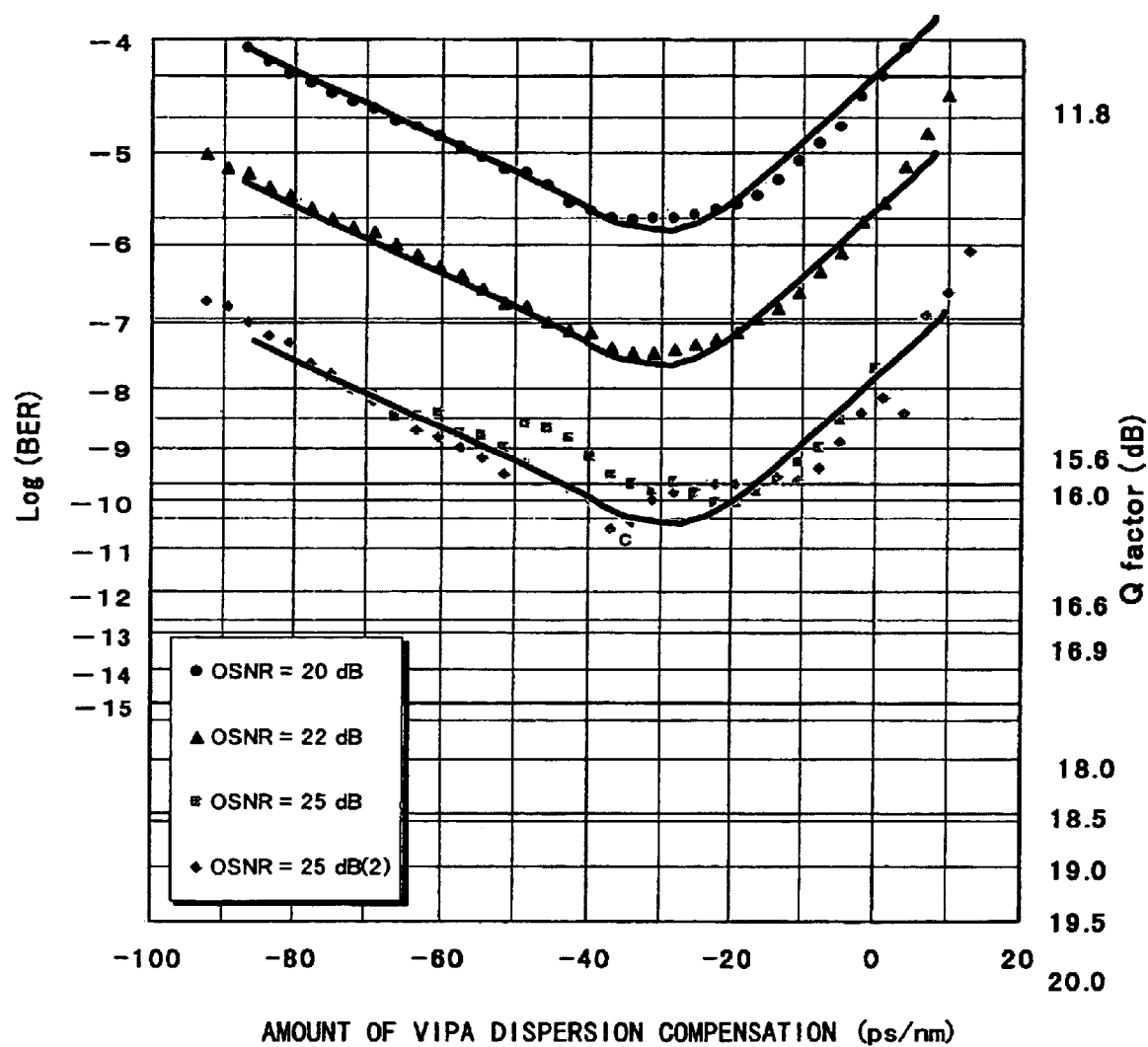
FIG. 43 shows a measurement of the chromatic dispersion tolerance of each receiving OSNR in a 43.02 Gb/s NRZ modulation system, using a variable chromatic dispersion compensator.
Figure 44:
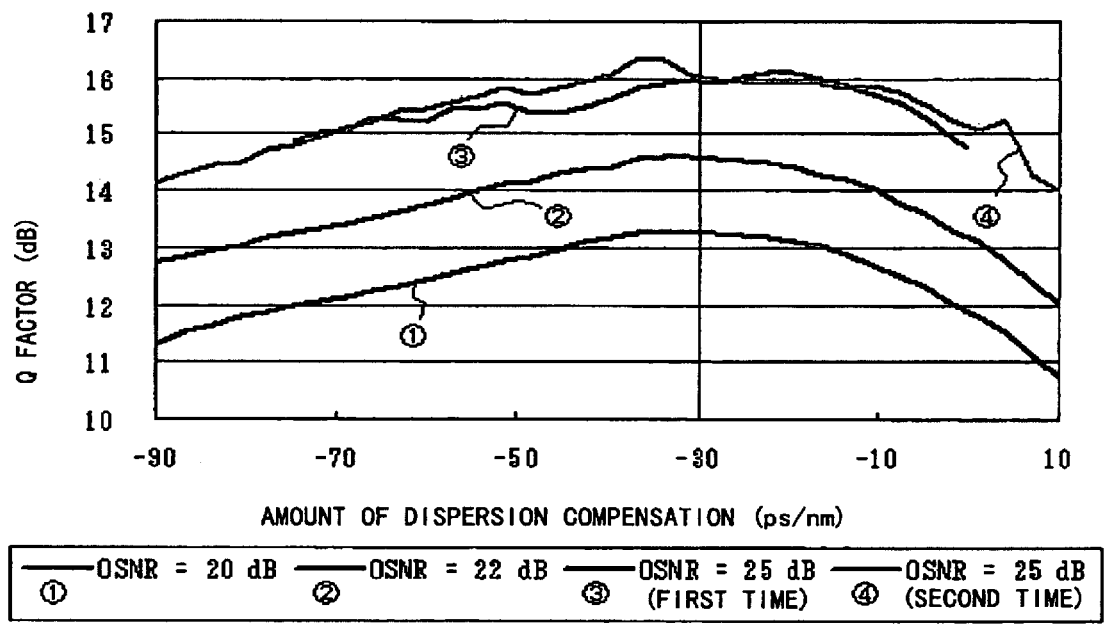
FIG. 44 corresponds to FIG. 43 where Q factors are used for the vertical axis.

FIG. 42 shows another configuration of the receiving unit according to this preferred embodiment of the present invention. FIG. 43 shows one measurement of the chromatic dispersion tolerance of each received OSNR in a 43.02 Gb/s NRZ modulation system, using a variable chromatic dispersion compensator. FIG. 44 corresponds to FIG. 43 for whose vertical axis a Q factor is used.

In FIG. 42, a receiver 150 comprises a peak detection circuit 280 and an FEC unit 300 computing error rate information. FEC (forward error correction) is an error correction block using an error correction code, and FEC-IC having this function generally has a function to compute information similar to an error rate, such as the number of error correction, etc. A peak value detected by the peak detection circuit 280 and error rate information detected by the FEC unit 300 are inputted to a monitor circuit 310 and is used to generate a control signal to a variable dispersion compensator, which is not shown in FIG. 42.

As clear from FIGS. 43 and 44, even if OSNR changes, there is no change in the shape of a chromatic dispersion tolerance curve. Therefore, the amount of change in optimal chromatic dispersion can be similarly computed by the amount of change in an error rate from its optical point (magnitude of a Q factor penalty). In other words, if the shape of a chromatic dispersion tolerance curve changes, the amount of dispersion compensation to be changed varies with the change of the OSNR even against the same amount of change of an error rate. However, in this case, no such thing happens. The chromatic dispersion tolerance curve can be obtained, for example, by sweeping the chromatic dispersion changeable range of a variable dispersion compensator at the time of system initial setting, and if there is a change in transmission line chromatic dispersion and a change in transmission quality, the amount of change can be computed from a generated penalty.

The configuration shown in FIG. 42 assumes a system using FEC and uses error rate information detected by the FEC unit 30. However, if it is information about transmission quality, such as byte B1 in a SONET/SDH signal, etc., this preferred embodiment of the present invention could be used as a chromatic dispersion monitor.

Figure 45:
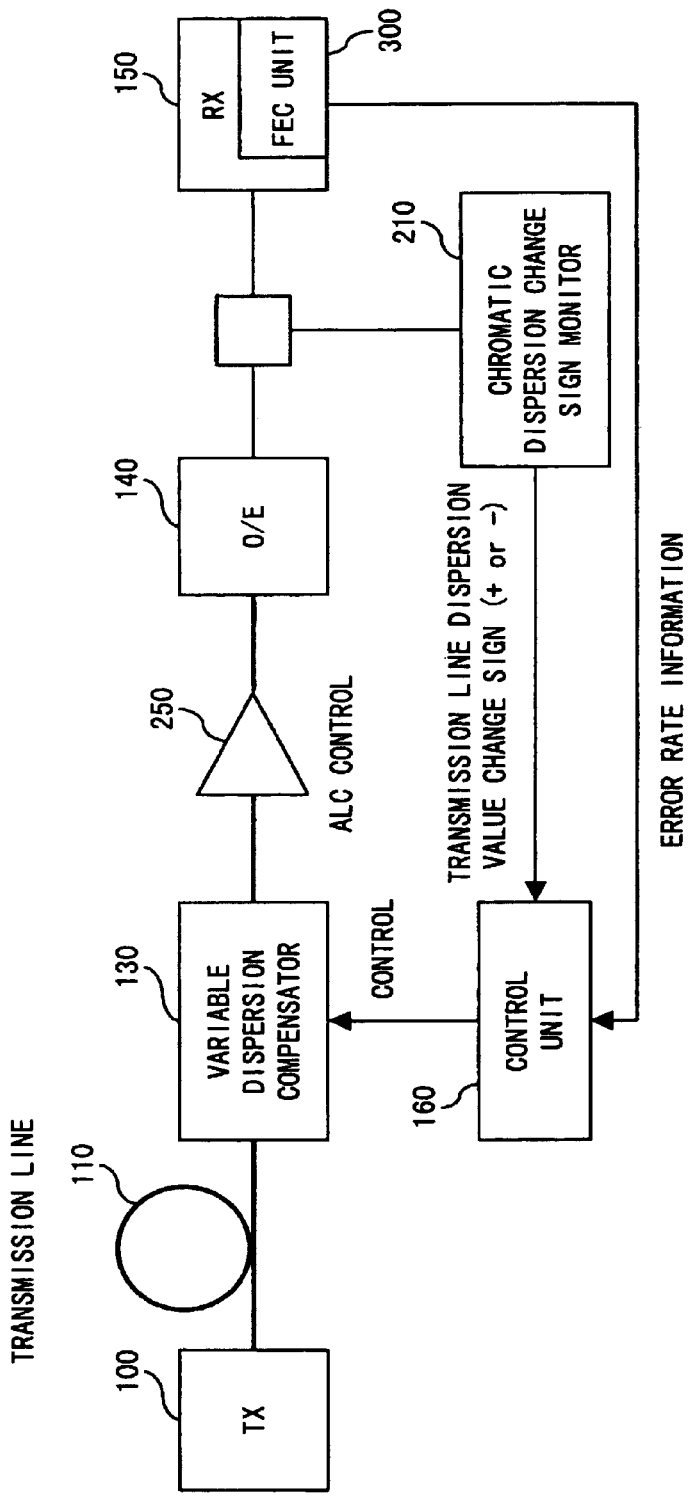
FIG. 45 shows another configuration of a chromatic dispersion compensation controlling system according to the preferred embodiment of the present invention (No. 1)
Figure 46:
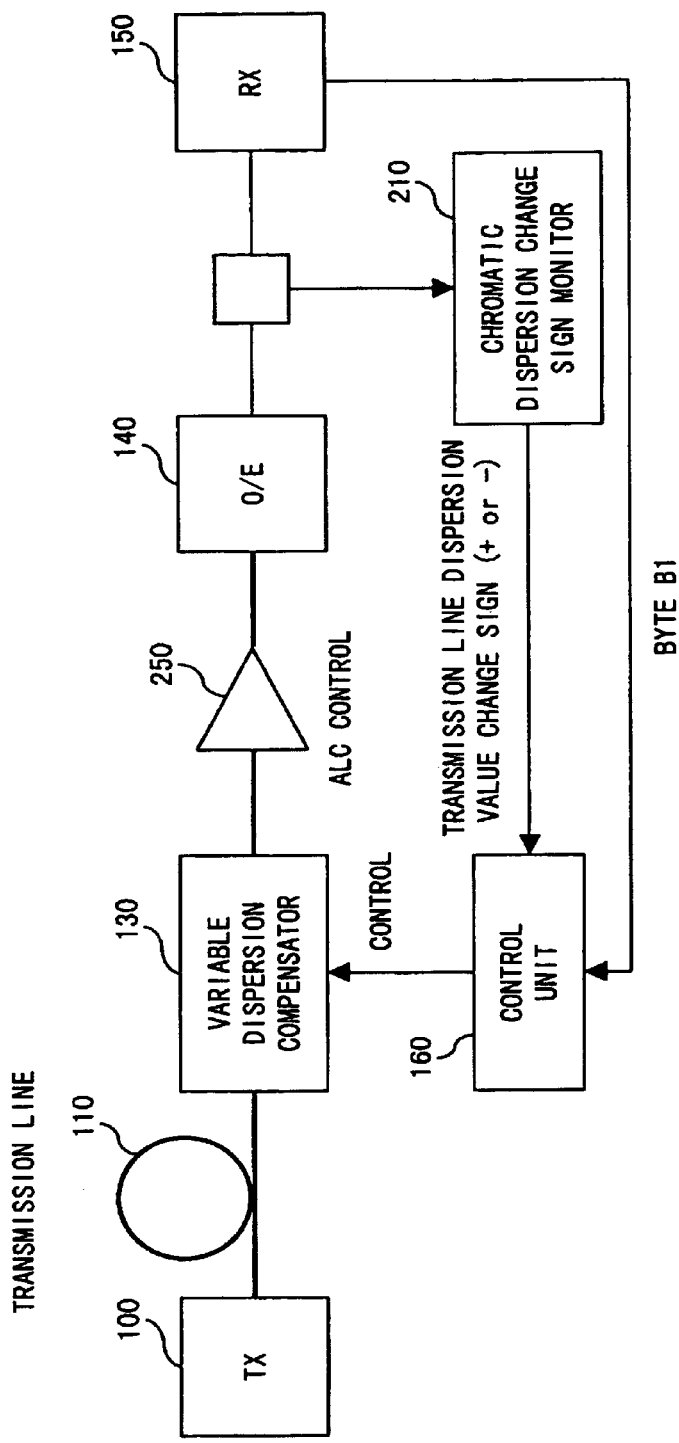
FIG. 46 shows another configuration of a chromatic dispersion compensation controlling system according to the preferred embodiment of the present invention (No. 2)

FIGS. 45 and 46 shows other configurations of the receiving unit according to this preferred embodiment of the present invention.

FIG. 45 shows a system using FEC, which uses error rate information detected by the FEC unit 30. FIG. 46 shows a system using the byte B1 of a SONET/SDH signal. In FIG. 46, the receiver 150 processes the overhead of a SONET/SDH signal, extracts byte B1 information and transmits the information to the control unit 160. Besides, if it is information about transmission quality, such as a Q factor, etc., this preferred embodiment of the present invention could be used as a chromatic dispersion monitor.

Figure 47:
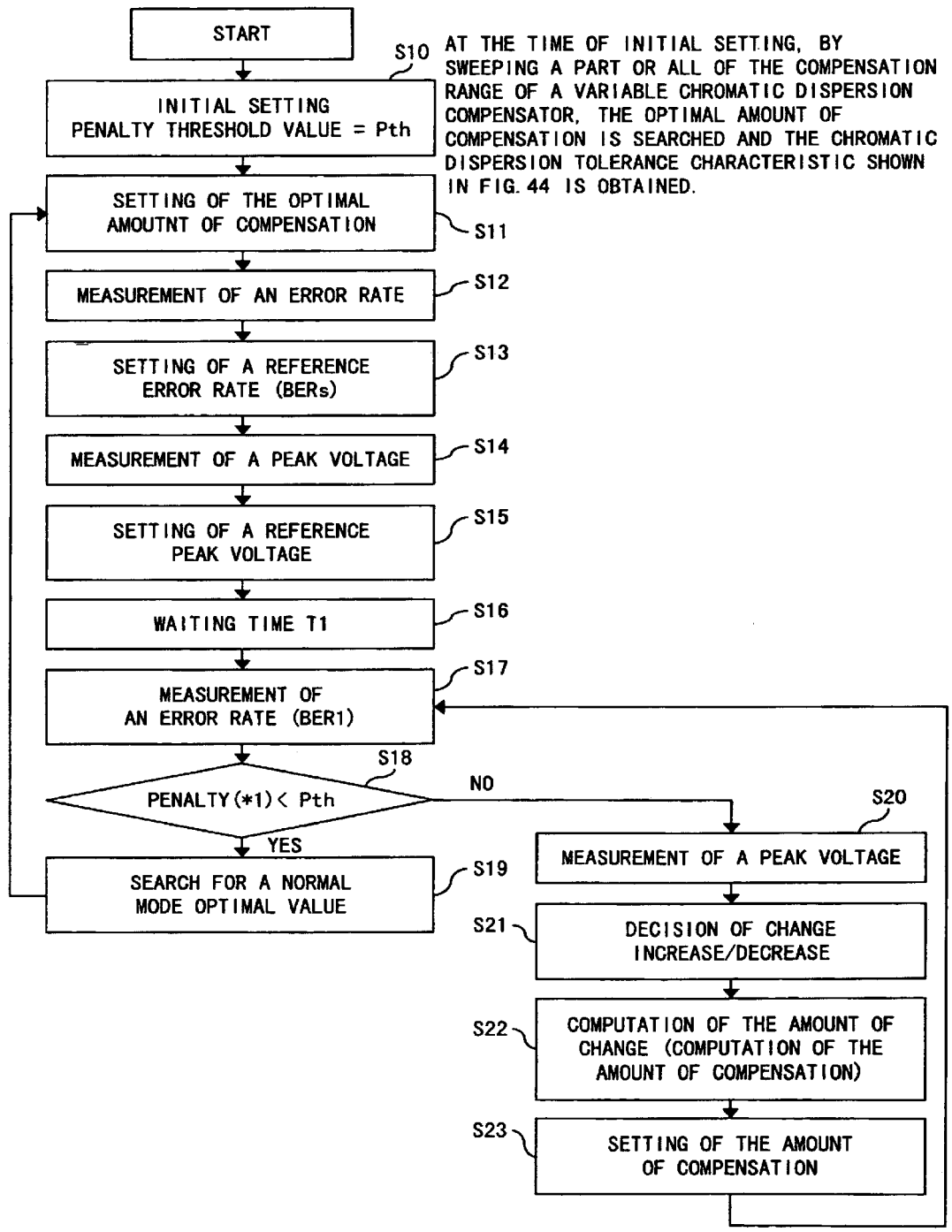
FIG. 47 is a flowchart of the basic operation of the chromatic dispersion compensation controlling system according to the preferred embodiment of the present invention (no. 1)

FIGS. 47 and 48 are flowcharts showing the basic operation of the chromatic dispersion compensation controlling system.

FIG. 47 is a flowchart showing the basic operation of the chromatic dispersion compensation controlling system in which an error rate is used as a means for detecting the amount of change in the amount of optimal chromatic dispersion compensation, and FIG. 48 is a flowchart showing the basic operation of the chromatic dispersion compensation controlling system in which a peak voltage according to this preferred embodiment of the present invention is used.

For example, since a change per unit time in transmission line chromatic dispersion accompanying a change in a transmission line installation ambient temperature is small, it is preferable to apply a high-accuracy chromatic dispersion control to it using the prior art. Therefore, in this case, the process shown in FIG. 47 should be applied.

A sudden change per unit time in the optimal amount of chromatic dispersion compensation due to the influence of higher-order PMD must be followed at high speed. Therefore, in this case, the process shown in FIG. 48 should be applied.

As clear from the chromatic dispersion tolerance curves shown in FIGS. 43 and 44, if there is a rapid change in the optimal amount of chromatic dispersion compensation within a unit time, the degradation of transmission quality, such as an error rate, etc., is large. Therefore, the largeness/smallness of the width of change in the optical amount of chromatic dispersion compensation can be detected by the amount of change per unit time of transmission quality, such as, an error rate, etc.

Therefore, if the amount of change per unit time of chromatic dispersion is equal to or less than a specific threshold, high-accuracy optimal value search is conducted using a down-hill method, etc. If it exceeds the specific threshold, as described above, the optimal amount of dispersion compensation is controlled at high speed by detecting the increase/decrease of the amount of change in the optimal amount of chromatic dispersion compensation by the largeness/smallness of a change in a peak value, and computing and setting a dispersion tolerance characteristic obtained at the time of initial setting and the width of deviation in the amount of dispersion compensation from a detected penalty, and after suppressing the optimal amount of dispersion compensation to a level equal to or less than an allowable penalty, the process is shifted to a normal high-accuracy control mode.

In FIG. 47, firstly, in step S10, initial setting is made. Specifically, a penalty threshold Pth is set. In step S11, the optimal amount of compensation is set. In step S12, an error rate is measured. In step S13, a reference error rate BERs is set and in step S14, a peak voltage is measured. In step S15, a reference peak voltage is set, and in step S16, the process waits for a waiting time T1. In step S17, an error rate BER1 is measured. In step s18, it is determined whether a penalty is small than Pth. In this case, if a Q factor specifying BERs and one corresponding to BER1 are assumed to be Qs and Q1, respectively, a penalty is computed as follows:

Penalty=$Qs-Q1$

If the determination in step S18 is yes, in step S19, optimal value search is conducted in a normal mode. This normal mode uses optimal value search using the down-hill method or dithering method, which have been described in Description of the Related Art. After the process in step S19 is completed, the process returns to step S11. If the determination in step S18 is no, the process proceeds to step S20, and a peak voltage is measured. In step S21, the increase/decrease of the change is determined, and in step S22, the amount of change is computed. That is, the amount of compensation is computed. In step S23, the amount of compensation is set, and the process returns to step S17.

In FIG. 48, in step S30, initial setting is made. Specifically, a part of the compensation range or the entire compensation range of a variable chromatic dispersion compensator is swept and optimal compensation amount search is conducted. Simultaneously, the chromatic dispersion tolerance characteristics shown in FIGS. 43 and 44 are computed. Then, the compression and broadening amounts of a peak voltage threshold difference are set as Vth1 and Vth2, respectively. In step S31, the optimal amount of compensation is set, and in step S32, an error rate is measured. In step S33, a reference error rate BERs is set. Then, in step S34, a peak voltage is measured, and in step S35, a reference peak voltage Pst is set. Then, in step S36, the process waits for waiting time T1, and in step S37, a peak voltage Pm is measured. In step S38, it is determined whether Pm−Pst is smaller than Vth1 or larger than Vth2.

If the determination in step S38 is yes, the process proceeds to step S39, and optimal value search (prior art) is conducted in a normal mode. Then the process returns to step S31. If the determination in step S38 is no, in step S40, the increase/decrease of a change is decided, and in step S41, an error rate BER1 is measured. In step S42, the amount of a change (amount of compensation) is computed. Then, in step S43, the amount of compensation is set, and in step S44, optical value search is conducted in a normal mode. Then, the process returns to step S31.

Figure 49:
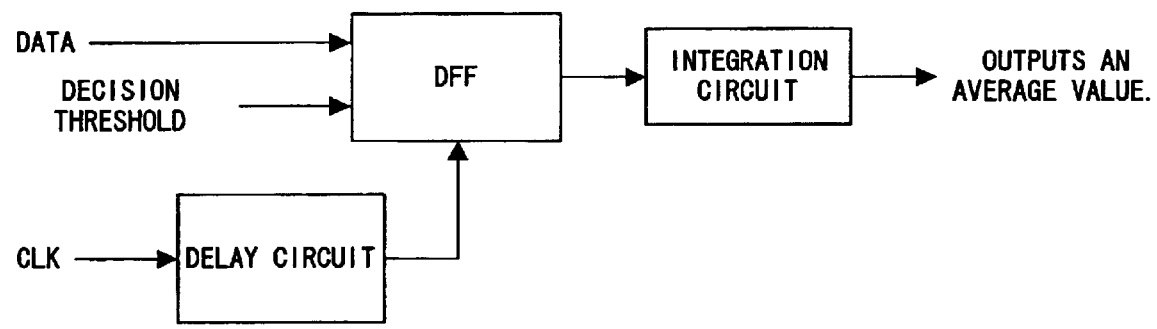
FIG. 49 shows a configuration of a peak detection circuit.

FIG. 49 shows a configuration of the peak detection circuit.

For this circuit, a D flip-flop is used. To the D flip-flop, data, a decision threshold and a clock whose timing is adjusted by a delay circuit are inputted. The D flip-flop stores and outputs a difference obtained by comparing the data with the decision threshold. An integration circuit integrates the output of the D flip-flop and outputs their average.

FIGS. 50 and 51A through C show other configurations of the chromatic dispersion compensation controlling system.

Figure 50:
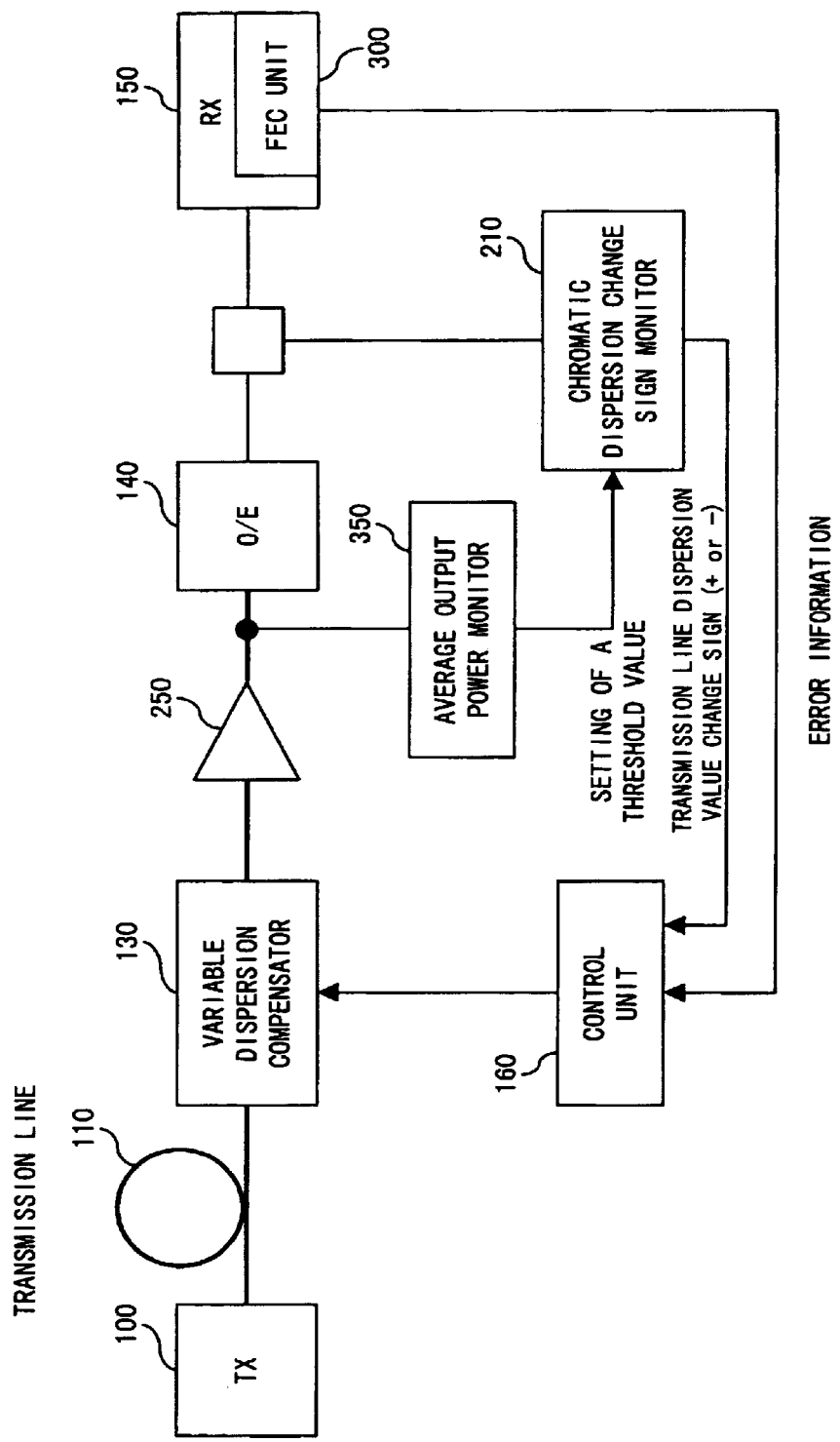
FIG. 50 shows the configuration of another preferred embodiment of the chromatic dispersion compensation controlling system of the present invention (No. 1)

In FIG. 50, an average output power monitor 350 is provided. In the preferred embodiment described earlier, the output power in the high level of an optical signal is maintained constant by ALC-controlling an optical amplifier 250. Thus, the peak of the optical signal is detected, and by comparing the peak with a predetermined threshold, the increase/decrease of residual dispersion can be decided. In this preferred embodiment, by monitoring the average output of an optical amplifier assuming there is no change in the modulation method, mark ratio, duty, etc., of a received optical signal and controlling the threshold based on the change, the increase/decrease of residual dispersion can be decided and 0.0045 (a.u.).

Firstly, at the time of initial setting (FIG. 51B), the average output is designated as a reference value. Then, if the average output drops to a half (FIG. 51A), the decision threshold is reduced to a half in proportion to the change in the average output, and in the case of FIG. 51A, it is set to 2.25×10$^{-3}$ a.u. (arbitrary unit) If the average output doubles (FIG. 51C), the decision threshold is doubled in proportion to the change in the average output, and is set to 9.0×10$^{-3}$ a.u. A chromatic dispersion change sign monitor 21 determines the direction of the change in residual dispersion using the decision threshold thus set.

FIGS. 52 through 56 show the simulation results of confirming the effectiveness of this preferred embodiment of the present invention.

Figure 52:
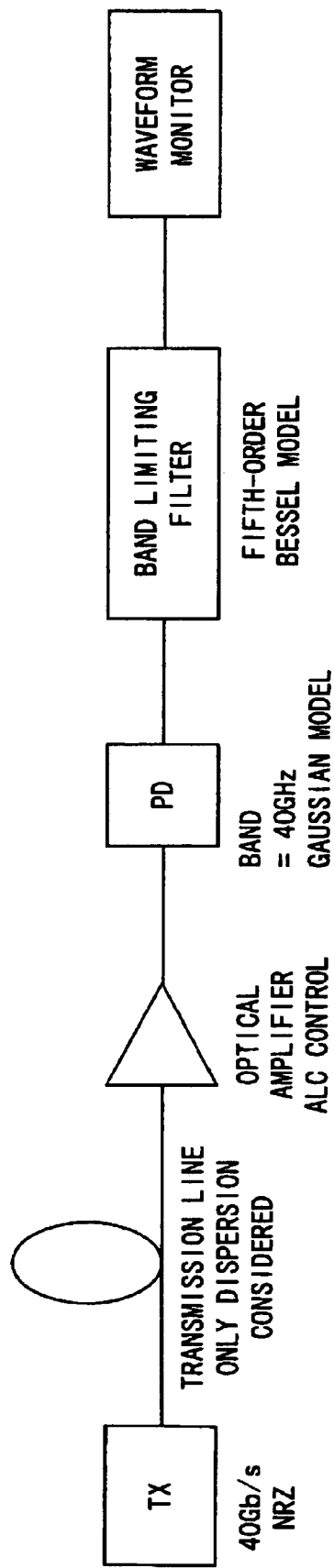
FIG. 52 shows the simulation for confirming the effectiveness of the preferred embodiment of the chromatic dispersion compensation controlling system of the present invention (No. 1)

FIGS. 53 and 54 show the result of computing a change in a peak voltage accompanying a change in chromatic dispersion in the case of α=1, using the simulation model shown in FIG. 52 and using the NF of an optical amplifier and the transmission band of a band limiting filter as parameters. FIG. 53 is a graph showing the relationship between residual chromatic dispersion and peak voltage established when the transmission band of the band limiting filter is 30 GHz and the NF (noise figure) of an optical amplifier is 0 dB or 30 dB. FIG. 54 is a graph showing the relationship between residual chromatic dispersion and peak voltage established when the transmission band of the band limiting filter is 30 GHz or 40 GHz and the NF (noise figure) of the optical amplifier is 30 dB.

As shown in FIGS. 53 and 54, if there is a great change in chromatic dispersion, the increase/decrease of chromatic dispersion can be detected using the increase/decrease of a peak voltage except in the neighborhood of ~40 ps/nm where a penalty is a minimum regardless of both OSNR and a filtering band.

Figures 55A, 55B, 55C:
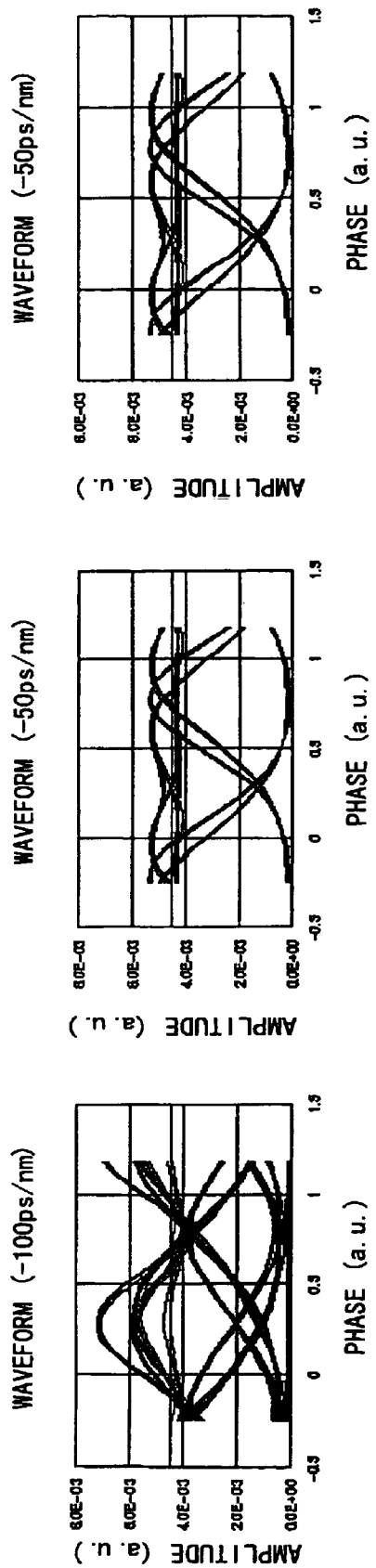
FIGS. 55a, 55b and 55c show the simulation for confirming the effectiveness of the preferred embodiment of the chromatic dispersion compensation controlling system of the present invention (No. 4)

FIG. 55 shows simulated waveforms at each chromatic dispersion value. The following average outputs are obtained when the threshold of each waveform (128 bit each) is 0.0045 (a.u.):

−100 ps/nm=0.198 (a.u.)

−50 ps/nm=0.119 (a.u.)

0 ps/nm=0 (a.u.)

By comparing the average with the threshold, the increase/decrease of chromatic dispersion in a transmission line can be decided.

Figure 56:
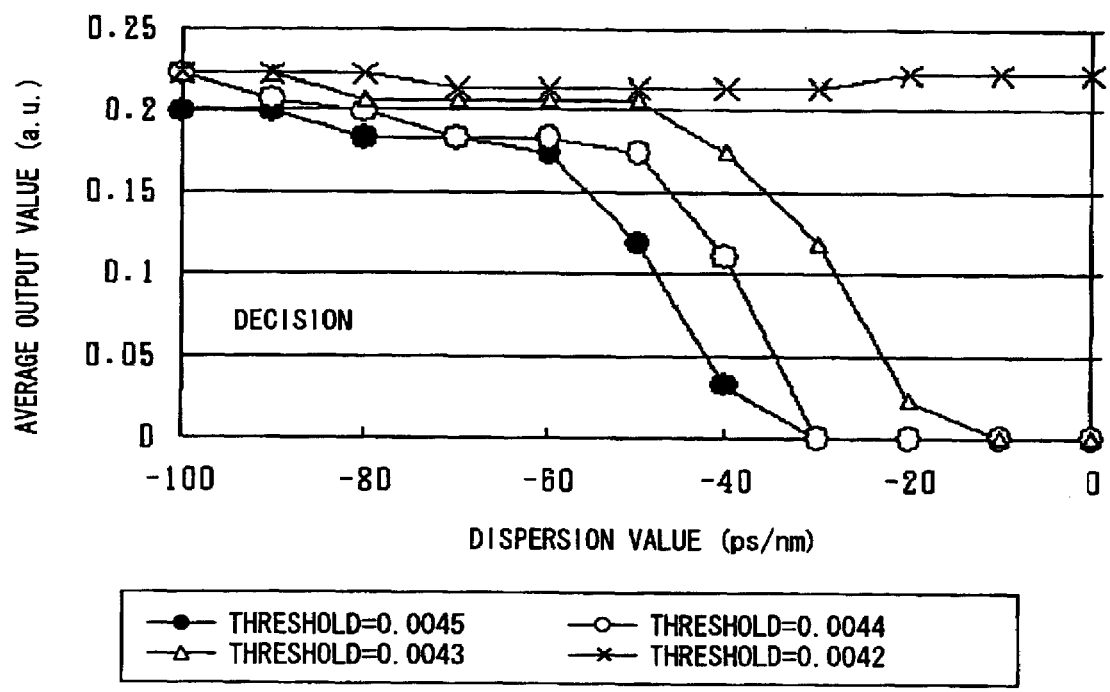
FIG. 56 shows the simulation for confirming the effectiveness of the preferred embodiment of the chromatic dispersion compensation controlling system of the present invention (No. 5).

FIG. 56 is a graph showing the average output obtained when the threshold is between 0.0042 (a.u.) and 0.0045 (a.u.).

Since the chromatic dispersion change sign monitor of this preferred embodiment of the present invention aims to decide the sign of a change, there is no difference in average outputs when the threshold is 0.0042 and chromatic dispersion deviates from −40 ps/nm, being the optimal amount of dispersion compensation. Therefore, the monitor fails to function as a monitor. If the threshold is between 0.0043 and 0.0045, an average output definitely increases when the dispersion decreases. Therefore, the increase/decrease of dispersion in the transmission line can be detected by the existence/non-existence of the increase of the average output. Particularly, in the case of the threshold 0.0044, the average output greatly changes when dispersion changes from −40 ps/nm, being the optimal amount of dispersion compensation, by ±10 ps/nm, which is the most preferable condition.

As an example, a case where in a system using the error rate shown in FIG. 45 or 46 as a chromatic dispersion monitor, OSNR=22 dB and a chromatic dispersion tolerance characteristic is as shown in FIG. 45 or 46, is considered.

In a normal operation state where chromatic dispersion per unit time in a transmission line is below the threshold, an optimal point searching algorithm, such as a down-hill method, etc., follows and controls the optimal amount of chromatic dispersion compensation with high accuracy. The threshold is set, for example, to ±10 ps/nm. In the examples shown in FIG. 45 or 46, the amount of chromatic dispersion compensation is controlled to approximately −30 ps/nm and the error rate becomes $3.5 \times 10-8$. In this case, if the chromatic dispersion in a transmission line changes for some reason and the error rate measured as a chromatic dispersion monitor rapidly drops to $1.0 \times 10-8$, the amount of chromatic dispersion compensation is controlled with priority given to speed using the chromatic dispersion change sign monitor of this preferred embodiment of the present invention. Then, by using the characteristic shown in FIG. 43, which has been obtained at the time of initial setting, a change of +15 ps/nm or −15 ps/nm in the chromatic dispersion of the transmission line due to the amount of change in the error rate can be computed. Furthermore, since the increase/decrease of chromatic dispersion can be decided by the information of the peak detection circuit, the amount of chromatic dispersion compensation can be led in within an allowable penalty (tolerance) by one operation.

According to the present invention, a chromatic dispersion compensation controlling system which can follow chromatic dispersion that changes at high speed and compensates dispersion, can be realized.

What is claimed is:

1. A chromatic dispersion compensation controlling system for compensating for chromatic dispersion caused when an optical signal is transmitted through a transmission line, comprising:
   a peak detection unit detecting a peak value of a receiving signal: and
   a control unit determining whether chromatic dispersion caused in an optical signal is excessive in a positive direction or in a negative direction, by comparing the peak value with a predetermined threshold and supplying a variable chromatic dispersion compensator with a control signal;
   a transmission quality detection unit detecting transmission quality information of a receiving signal,
   wherein said control unit
      supplies the variable chromatic dispersion compensator with a control signal, using a positive/negative sign of excessive chromatic dispersion obtained by detecting a peak value and an absolute value of an amount of chromatic dispersion to be compensated that is obtained from the transmission quality information;
      sets a threshold of an amount of change in optimal chromatic dispersion compensation,
      controls the chromatic dispersion compensation by one of a down-hill method and a dithering method, responsive to an amount of change being equal to or less than the threshold, and
      controls the chromatic dispersion using a positive/negative sign of residual chromatic dispersion obtained from a peak value and an absolute value of an amount of chromatic dispersion to be compensated responsive to the amount of change exceeding the predetermined threshold.

2. A chromatic dispersion compensation controlling method for compensating for chromatic dispersion caused when an optical signal is transmitted through a transmission line, comprising:
   detecting a peak value of a receiving signal: and
   determining whether chromatic dispersion caused in an optical signal is excessive in a positive direction or in a negative direction, by comparing the peak value with a predetermined threshold and supplying a variable chromatic dispersion compensator with a control signal; said determining comprising:
      supplying a control signal to said variable chromatic dispersion compensator, using a positive/negative sign of excessive chromatic dispersion obtained by a detection of a peak value and an absolute value of an amount of chromatic dispersion compensation to be compensated from the transmission quality information;
   setting a threshold of an amount of change in optimal chromatic dispersion compensation
   controlling chromatic dispersion compensation by one of a down-hill method and a dithering method, responsive to an observed amount of change being equal to or less than the threshold; and
   controlling chromatic dispersion using a positive/negative sign of residual chromatic dispersion obtained from a peak value and an absolute value of an amount of chromatic dispersion to be compensated, responsive to the amount of change exceeding the predetermined threshold.

* * * * *

UNITED STATES PATENT AND TRADEMARK OFFICE
CERTIFICATE OF CORRECTION

| | |
|---|---|
| PATENT NO. | : 7,389,049 B2 |
| APPLICATION NO. | : 10/784989 |
| DATED | : June 17, 2008 |
| INVENTOR(S) | : Tomoo Takahara et al. |

It is certified that error appears in the above-identified patent and that said Letters Patent is hereby corrected as shown below:

Column 25, Line 52, change "signal:" to --signal;--.

Column 26, Line 29, change "signal:" to --signal;--.

Signed and Sealed this

Seventh Day of October, 2008

JON W. DUDAS
*Director of the United States Patent and Trademark Office*